United States Patent [19]
Mizuno et al.

[11] Patent Number: 4,834,205
[45] Date of Patent: May 30, 1989

[54] APPARATUS FOR CONTROLLING STEERING OF WHEELS OF A VEHICLE

[75] Inventors: Masahiko Mizuno, Nagoya; Yasushi Amano, Aichi; Eiichi Yasuda, Seto; Shunichi Doi, Nagoya; Yasutaka Hayashi, Seto; Hiroyuki Yamaguchi, Aichi, all of Japan

[73] Assignee: Kabushiki Kaisha Toyota Chuo Kenkyusho, Aichi, Japan

[21] Appl. No.: 151,881

[22] Filed: Feb. 3, 1988

[30] Foreign Application Priority Data

Feb. 3, 1987 [JP] Japan .................................. 62-23261
Nov. 10, 1987 [JP] Japan ................................ 62-284046

[51] Int. Cl.⁴ ............................................. B62D 5/00
[52] U.S. Cl. .................................... 180/141; 180/142; 180/79.1; 74/388 PS; 364/424.05
[58] Field of Search ...................... 180/141, 142, 79.1; 74/388 P; 364/424

[56] References Cited

U.S. PATENT DOCUMENTS 4,666,013  5/1987  Shibahata ........................... 364/424
4,720,790  1/1988  Miki .................................... 364/424

Primary Examiner—Andrew J. James
Assistant Examiner—David Soltz
Attorney, Agent, or Firm—Roberts, Spiecens & Cohen

[57] ABSTRACT

An apparatus for controlling steering of wheels of a vehicle comprises a control means, a driving means, and an actuator means. The control means comprises a feed forward signal operating means, a feed back signal operating means for generating signals for variables representing vehicle behaviors and output from a vehicle behavior sensor, and a control signal operating means for calculating a difference or sum of the signals output from the feed forward and feedback signal operating means. The feed forward signal operating means comprises a steering angle signal circuit, a steering angular velocity signal operating circuit, a steering angle signal operating circuit having a first coefficient circuit for multiplying a steering angle signal with a coefficient, and an adder for adding the outputs from the steering angle signal circuit, the steering angle signal operating circuit, and the steering angular velocity operating circuit. A behavior correction capacity against a side wind or disturbance is very high, and a steering system can be controlled to shorten the response time for changes in vehicle behaviors with respect to a steering input, thereby providing optimal steering. The control means further comprises a gain changing means to supply optimal coefficients to the feed forward and feedback signal operating means.

18 Claims, 33 Drawing Sheets

——— : MEASURED VALUE

----- : ESTIMATED VALUE

●, x, △ : PEAK VALUE

Pi : MAGNITUDE OF PEAK VALUE

Tp : PHASE DIFFERENCE BETWEEN PEAK VALUES $$fo = \frac{1}{2\pi T_1} (Hz)$$

APPARATUS FOR CONTROLLING STEERING OF WHEELS OF A VEHICLE

BACKGROUND OF THE INVENTION

I. Field of the Invention

The present invention relates to an apparatus for controlling steering of wheels of a vehicle and, more particularly, to an apparatus for controlling steering of wheels of a vehicle in which a high correction capability of variables representing vehicle behavior is provided against disturbances such as side and gusty winds, and high response for changes in vehicle behavior in response to a steering input such as rapid steering or vehicle turning with a large radius.

II. Description of the Prior Art

Traveling performance and steering stability of a vehicle primarily depend on a yaw rate (i.e., angular velocity generated around the center of gravity when the vehicle is viewed from the top) of the vehicle responding to a steering input, i.e., a steering wheel operation, or a lateral acceleration (i.e., an acceleration acting on the center of gravity of the vehicle in a direction perpendicular to the vehicle traveling direction, i.e., an acceleration parallel to the traveling direction of the vehicle).

It is ideal to guarantee safety for causing the vehicle to travel straight according to the will of a driver without being influenced by disturbances such as a side wind or a road surface friction coefficient when the vehicle is to quickly respond to the steering input or is to be driven straight.

In order to provide both dynamic characteristics and stability described above, Japanese Laid-Open Patent Publication 60-161266 describes an apparatus obtained by combining feed forward control and feedback control. In this apparatus, the following two methods are used. The first method is to control traveling performance and stability by a value obtained such that a differential value of a difference obtained by subtracting a coefficient multiple of a yaw rate or a lateral acceleration from a steering wheel angle is added to the difference, as shown in FIG. 2. The second method is practiced as follows, as shown in FIG. 3. A value is obtained by multiplying a coefficient with a differential value of a steering wheel angle and is added to the steering angle to obtain a sum. The sum is used as a feed forward signal for auxiliary steering of the rear wheels, and the vehicle behavior is used as a negative feedback signal for auxiliary steering of the front wheels. The drawback of feedback control is canceled with that of feedback control.

In the auxiliary steering apparatus described above, when a driver rapidly turns the steering wheel in order to avoid an obstacle, auxiliary variables representing vehicle behavior are rapidly increased by a control value influenced by the differential value, and the vehicle is rapidly turned. Heavy mental load imposed on the driver is caused by rapid vehicle turning. In the worst case, the driver excessively turns the steering wheel, the vehicle loses stability, and a traffic accident may occur. When the vehicle travels along a curved road having a relatively large radius (e.g., a highway), the differential value is rarely influenced by the vehicle behavior. The feed forward signal is decreased, and understeering in the vehicle is caused as a whole. As a result, traveling performance of the vehicle is degraded. When an external force acts on the vehicle due to a side wind, ruts, or steps, the driver tends to turn the steering wheel with a guess so as to respond to accidental disturbances. Such steering increases the differential value, and oversteering may be caused to leading to unexpected vehicle behavior.

The above disadvantage of the conventional auxiliary steering apparatus is caused by feed forward control using a steering wheel angle and a value obtained by multiplying a differential value of the steering wheel angle with a coefficient. The influence of the differential value is increased as compared with the normal steering apparatus, and desired control cannot be performed. When the coefficient multiplied with the differential value is decreased, a total gain is reduced and the control system in the vehicle is substantially the same as that of feedback control. Optimal control cannot be performed by the above-mentioned auxiliary steering apparatus.

In the auxiliary steering apparatus shown in FIG. 3, independent control operations are performed for the front and rear wheels. Behavior of the front and rear wheels is independently performed and the required control apparatus is complicated, thus increasing the overall weight and the like of the vehicle and hence failing to obtain the desired control effect.

SUMMARY OF THE INVENTION

It is an object of the present invention to achieve optimal steering wherein a steering system is controlled to provide a high behavior correction capacity for a side wind or other disturbance and to shorten the response time for vehicle behavior changes responding to a steering input.

It is another object of the present invention to cause a steering control system having a high behavior correction capacity for a side wind or other disturbance and a short response time for vehicle behavior changes responding to a steering input to perform optimal steering corresponding to changes in inside and outside environmental situations associated with the vehicle.

The disadvantage of the prior art is based on simple use of two values, i.e., the steering wheel angle and the value obtained by multiplying the coefficient with the differential value of the steering wheel angle in feed forward control. In order to eliminate this disadvantage, the present inventors also took values as coefficient multiples of the steering wheel angle into consideration in addition to the above-mentioned two values in feed forward control. The present inventors found that a combination of feed forward control and feedback control provided better traveling performance and stability.

When the driver rapidly turns the steering wheel, rapid changes in vehicle behavior are restricted by values of coefficient multiples of the steering wheel angle in addition to use of the differential value of the steering wheel angle in order to prevent a rapid change in vehicle traveling direction. The mental load imposed on the driver can be reduced and hence the vehicle can be safely driven. The vehicle wheels quickly respond at only the initial period upon turning of the steering wheel.

Understeering of the vehicle can be reduced by the values of coefficient multiples of the steering wheel angle when the vehicle is turning with a large radius. Stability in feed forward control can be assured without degrading the dynamic characteristics of the vehicle.

Auxiliary vehicle steering having high resistance to disturbance and a short response time can be achieved.

When the driver turns the steering wheel with a guess against an external force such as a side or gusty wind blown against the vehicle, the influence of the differential value can be suppressed by the coefficient multiple of the steering wheel angle. As a result, stable traveling can be achieved.

In the prior art described above, response to the changes in a friction value ($\mu$) between the road surface and the vehicle wheels is insufficient. The present inventors paid attention to realization of optimal steering corresponding to changes in inside and outside environmental situations associated with the vehicle by changing coefficients (gains) of coefficient circuits in feedback and/or feed forward control system in accordance with a change in friction value $\delta$ between the road surface and the vehicle wheels and by determining coefficients of the coefficient circuits on the basis of the friction value $\mu$ estimated by the vehicle travel state variables with the vehicle travel behavior.

Even if the vehicle wheels do not slip on the road, the steering control system can be operated to suppress changes in vehicle behavior. For example, the magnitudes of signals for state variables representing vehicle behavior are compared with respect to the steering angles on rough and smooth road surfaces. Friction values $\mu$ are estimated by the above comparison operations, and the gains of the yaw rate feedback system are controlled using the estimated friction values. The changes in vehicle behaviors such as the yaw rate can be therefore decreased. In addition, by detecting road surface conditions, even if a large noise component tends to be mixed in state variables as in a rough road or when operation failure of sensors occurs, the gains of the coefficient circuits in the feedback and/or feed forward control system are reduced to eliminate the influences of the above-mentioned problems.

As shown in FIG. 1, an apparatus for controlling steering of wheels of a vehicle, or controlling variables representing vehicle behavior comprises: a steering sensor I for detecting a steering angle of a steering wheel; vehicle behavior sensor II for detecting the variables representing vehicle behavior; a control means III comprising a feed forward signal operating means $III_1$, a feedback signal operating means $III_2$, and a control signal operating means $III_3$, the feed forward signal operating means $III_1$ being provided with a steering angle signal circuit $III_{11}$ for outputting a steering angle signal output from the steering sensor without processing, a steering angle signal operating circuit $III_{13}$, a steering angular velocity signal operating circuit $III_{16}$, an adder $III_{17}$ for adding signals output from the steering angle signal circuit $III_{11}$, the steering angle signal operating circuit $III_{13}$, and the steering angular velocity signal operating circuit $III_{16}$, and the steering angle signal operating circuit $III_{13}$ being further provided with a first coefficient circuit $III_{12}$ for multiplying the steering angle signal with a coefficient $G_1$, and the steering angular velocity signal operating circuit $III_{16}$ being further provided with a differentiator $III_{14}$ for calculating the steering angular velocity signal from the steering angle signal and a second coefficient circuit $III_{15}$ for multiplying the steering angular velocity signal with a coefficient $G_2$, the feedback signal operating means $III_2$ being provided with a vehicle behavior state variable signal operating circuit $III_{22}$ having a third coefficient circuit $III_{21}$ for multiplying the signals for variables representing the vehicle behaviors, which is output from the vehicle behavior sensor, with a coefficient $G_3$ and being adapted to generate a signal output from the vehicle behavior state variable signal operating circuit $III_{22}$ as a feedback control signal, the control signal operating means $III_3$ being provided with an adder/subtractor $III_{31}$ for performing an addition or a subtraction of signals output from the feed forward signal operating means $III_1$ and the feedback signal operating means $III_2$ to produce a steering control signal; a driving means IV for amplifying the steering control signal as an output from the control means III, and an actuator means V to provide an optimal steering angle to front wheels or rear wheels on the basis of an amplified output from the driving means IV.

The above-mentioned apparatus for controlling steering of wheels of a vehicle has the following functions and effects. In the steering sensor I, the steering angle of the steering wheel is converted into an electrical signal corresponding to the steering angle. In the vehicle behavior sensor II, the variables representing the vehicle behavior are converted into electrical signals. In order to optimize the vehicle behavior responding to the steering angle, the electrical signals output from the steering sensor I and the vehicle behavior sensor II are processed in the control means III. In the control means III, vehicle controllability for steering is improved by generating a signal representing a control steering angle exceeding the measured steering angle. This signal is generated by the feed forward signal operating means $III_1$ The feed forward signal operating means $III_1$ comprises the steering angular velocity signal operating circuit $III_{16}$ provided with the differentiator $III_{14}$ and the second coefficient circuit $III_{15}$ to differentially increase or decrease the steering angle, the steering angle operating circuit $III_{13}$ provided with the first coefficient circuit $III_{12}$ to correct the magnitude (coefficient $G_1$) of the measured steering angle, and the steering angle signal circuit $III_{11}$ for supplying the steering angle to the control means without processing. When the variables representing the vehicle behaviors are rapidly changed, these changes are suppressed by the feedback signal operating means $III_2$ The feedback signal operating means $III_2$ comprises the vehicle behavior signal operating circuit $III_{22}$ provided with the third coefficient circuit $III_{21}$ for multiplying the coefficient $G_3$ for determining the feedback amount with the signal from the vehicle behavior sensor II for detecting the variables representing the vehicle behavior. Therefore, stability of the vehicle can be improved.

A steering angle $\delta$ of the steering wheel is converted into a feed forward signal having a value of $\delta+G_1.\delta+G_2.\dot\delta$ by the feed forward signal operating means $III_1$ The feed forward signal and the signal generated by the feedback signal operating means are subjected to an addition or subtraction in the control signal operating means $III_3$, thereby generating the steering control signal.

The driving means IV amplifies the steering control signal into an actuator drive signal for driving the actuator. The actuator drive signal is used to drive the actuator in the actuator means V so as to apply an optimal steering angle to at least one of the front and rear wheels.

In the conventional technique, the feed forward signal is obtained by multiplying the differential value $\dot\delta$ of the steering wheel angle with the coefficient $G_2$ When the driver abruptly turns the steering wheel, the steering wheel angle δ and a differential value δ̇ of the steering wheel angle are output. The vehicle is rapidly turned to cause an unexpected behavior. The driver must turn the steering wheel in a complicated manner. For this reason, according to the present invention, the influence of the differential value δ̇ is canceled by a value of a coefficient multiple of the steering wheel angle δ, thereby assuring steering stability.

By using the apparatus for controlling steering of wheels of a vehicle, as described above, the value of the multiple of the steering wheel angle coefficient can be subtracted in addition to an addition of the differential value of the steering wheel angle so as to prevent abrupt turning of the vehicle when the driver abruptly turns the steering wheel. Abrupt behavior of the vehicle can be suppressed. As a result, the mental load on the driver can be reduced, and safe driving can be assured. In addition, the apparatus can be quickly operated in only the initial period of abrupt turning.

As for vehicle turning with a large radius, the value of a coefficient multiple of the steering wheel angle can be added. Understeering of the vehicle can be reduced and safety can be assured under feed forward control without degrading the dynamic characteristics of the vehicle. Therefore, auxiliary steering of the vehicle which is substantially free from disturbance and highly responsive can be performed.

When the driver turns the steering wheel with a guess against an accidental disturbance after an external force acts on the vehicle, the value of the coefficient multiple of the steering wheel angle is subtracted to reduce the influence of the differential value, thereby assuring a safe behavior of the vehicle.

BRIEF DESCRIPTION OF THE DRAWINGS

FIGS. 19 to 21 show a first embodiment of the present invention, in which FIG. 19 is a diagram showing the entire system, FIG. 20($a$) to 20($c$) are views for explaining the principle of a primary delay filter, and FIG. 21 is a flow chart for explaining the operation of a gain changing means;

FIGS. 22 and 23 show a second embodiment of the present invention, in which FIG. 22 is diagram showing the entire system and FIG. 23 is a flow chart for explaining the operation of a gain changing means;

FIGS. 25 and 26 show a third embodiment of the present invention, in which FIG. 25 is a diagram showing the entire system and FIG. 26 is a flow chart for explaining the operation of a gain changing means;

FIGS. 27 to 34 show a fourth embodiment of the present invention, in which FIG. 27 is a diagram showing the entire system, FIG. 28 is a flow chart for explaining the operation of a gain changing means, FIG. 29 is a flow chart showing a routine for selecting coefficients in the gain changing means, FIG. 30 is a graph showing correction of the $\mu$ estimation value and its weighting in FIG. 29, FIG. 31 is a graph showing classification for corrected values of FIG. 29, FIG. 32 is a graph showing correction of a slip ratio and its weighting in FIG. 29, FIG. 33 is a graph showing classification of vehicle velocities $u_0$ in FIG. 29, and FIG. 34 is a table showing a map for calculating coefficients in FIG. 29; and FIGS. 35 and 36 show a fifth embodiment of the present invention, in which FIG. 35 is a diagram showing the entire system and FIG. 36 is a flow chart for explaining the operation of a gain changing means.

DETAILED DESCRIPTION OF THE PREFERRED EMBODIMENTS

First Mode

Figure 1:
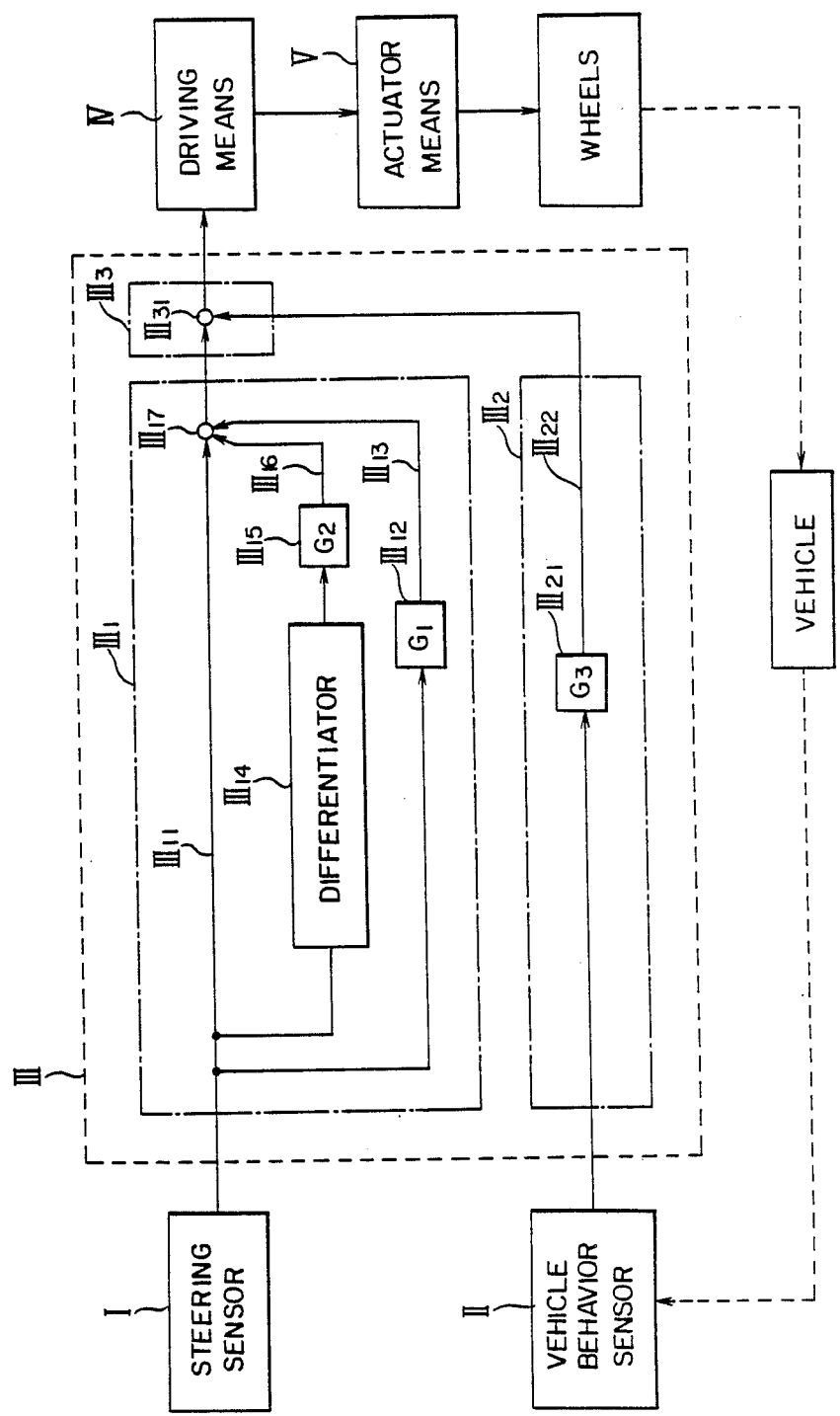
FIG. 1 is a schematic block diagram showing the principle of the present invention.
Figure 2:
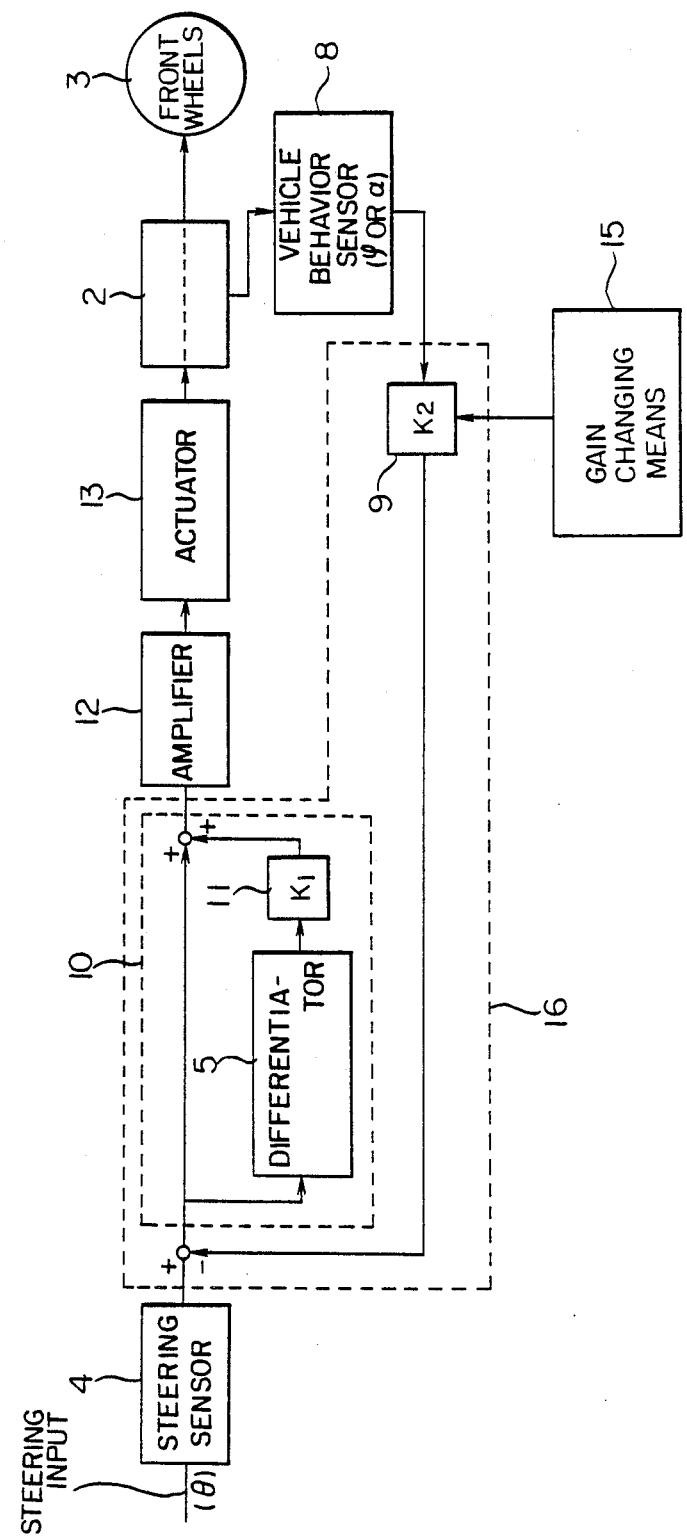
FIGS. 2 and 3 are schematic block diagrams showing the conventional steering control techniques.
Figure 3:
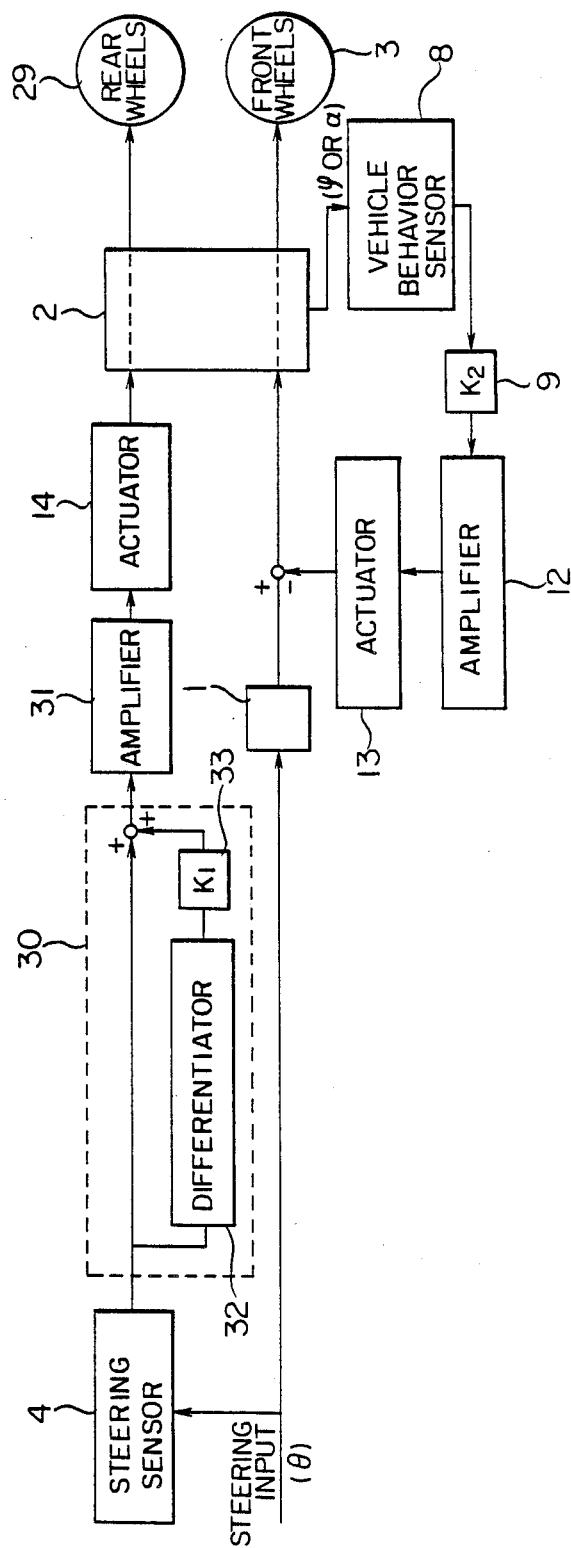
Figure 4:
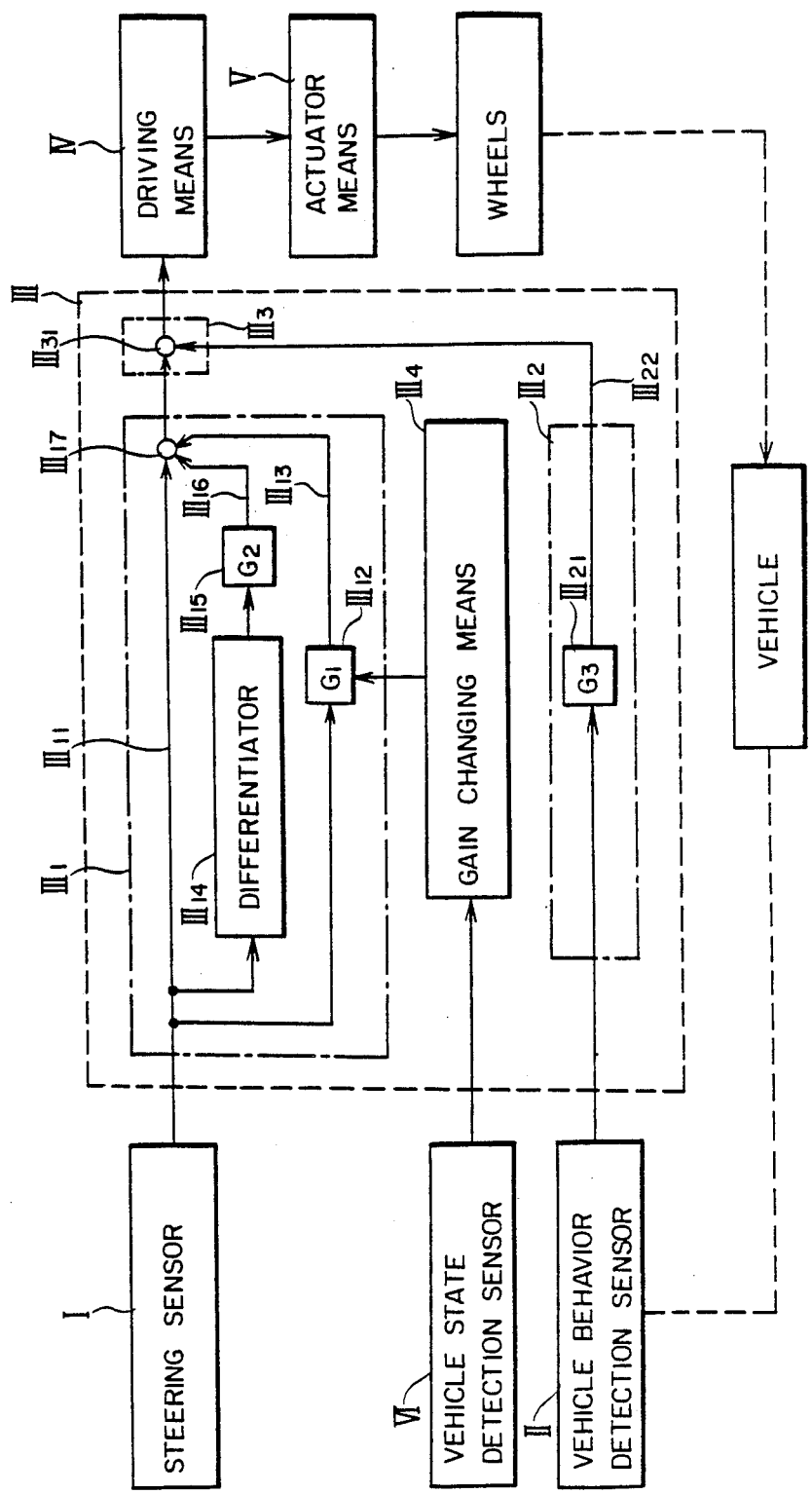
FIG. 4 is a schematic block diagram of an apparatus for controlling steering of wheels of a vehicle according to a first mode of the present invention.

The first mode of the present invention is shown in the block diagram of FIG. 4. A control means III is connected to a vehicle state detection sensor IV and a first coefficient circuit III$_{12}$. The vehicle state detection sensor VI detects vehicle travel state variable with the vehicle travel such as a vehicle velocity, a vehicle load, a wheel load, a vehicle wheel velocity, a vehicle wheel angular velocity, a road surface shape (e.g., sprung relative displacement and velocity), and so on. The control means III comprises a gain changing means III$_4$ for changing a coefficient of the first coefficient circuit III$_{12}$ on the basis of the signals for vehicle travel states.

The function and effect of the first mode having the above characteristic feature will be described below.

A steering sensor I detects a steering angle of a steering wheel and generates an electrical signal corresponding to the steering angle. A vehicle behavior sensor II detects a change in variables representing vehicle behavior and generates an electrical signal corresponding to the change. The vehicle detection sensor VI detects the vehicle travel state such as a vehicle velocity, a vehicle load, a wheel load, and a vehicle wheel velocity and generates electrical signals corresponding to these state variables.

A feed forward signal operating means $III_1$ comprises a steering angle signal circuit $III_{11}$ for outputting the steering angle without processing, a steering angle signal operating circuit $III_{13}$ provided with the first coefficient circuit $III_{12}$ for correcting a magnitude (i.e., a coefficient $G_1$) of a steering angle for the detected steering angle, and a steering angle velocity signal operating circuit $III_{16}$ provided with a differentiator $III_{14}$ for differentiating the steering angle and a second coefficient circuit $III_{15}$. In order to optimize the vehicle behavior for the steering angle and the like detected as the electrical signals output from the steering sensor I and the vehicle behavior sensor II, the feed forward signal operating means $III_1$ in the control means III converts the input steering angle $\delta$ into a feed forward signal $\delta + G_1 \cdot \delta + G_2$. $\delta$ and a steering angle exceeding the detected steering wheel angle is applied to shorten response time of the vehicle.

In a circuit $III_2$ for operating variables representing vehicle behavior, having a third coefficient circuit $III_{21}$ for multiplying a signal from the vehicle behavior sensor II with a coefficient $G_3$ for determining a feedback value, the vehicle behavior state variable $\delta$ is converted into a feedback signal $G_3 \cdot \delta$. When the variables representing the vehicle behaviors are abruptly changed, the feedback signal is used to suppress the abrupt change, thereby stabilizing traveling of the vehicle.

A difference between the feed forward signal generated by the feed forward signal operating means and the feedback signal generated by the feedback signal operating means is calculated by an adder/subtractor $III_{31}$ in the control signal operating means $III_3$ to generate a steering control signal The steering control signal is amplified by the driving means IV as an actuator drive signal for driving the actuator. The actuator drive signal is used to drive the actuator in the actuator means V so as to apply an optimal steering angle of either the front or rear wheels or both.

The gain changing means $III_4$ can change the coefficient (to be referred to as a gain G) $G_1$ of the first coefficient circuit $III_{12}$ on the basis of the signals for vehicle travel state variable with the vehicle travel, such as a vehicle velocity, a vehicle load, a wheel load, and a vehicle wheel velocity, output from the vehicle state detection sensor VI.

With the above arrangement, the gain $G_1$ of the first coefficient circuit $III_{12}$ can be changed in accordance with the vehicle states such as a vehicle velocity, a vehicle load, a wheel load, and a vehicle wheel velocity. Even if the vehicle velocity is changed, the controllability for the behavior for steering of the vehicle can be kept constant. Therefore, vehicle controllability and vehicle stability can be improved.

Second Mode

Figure 5:
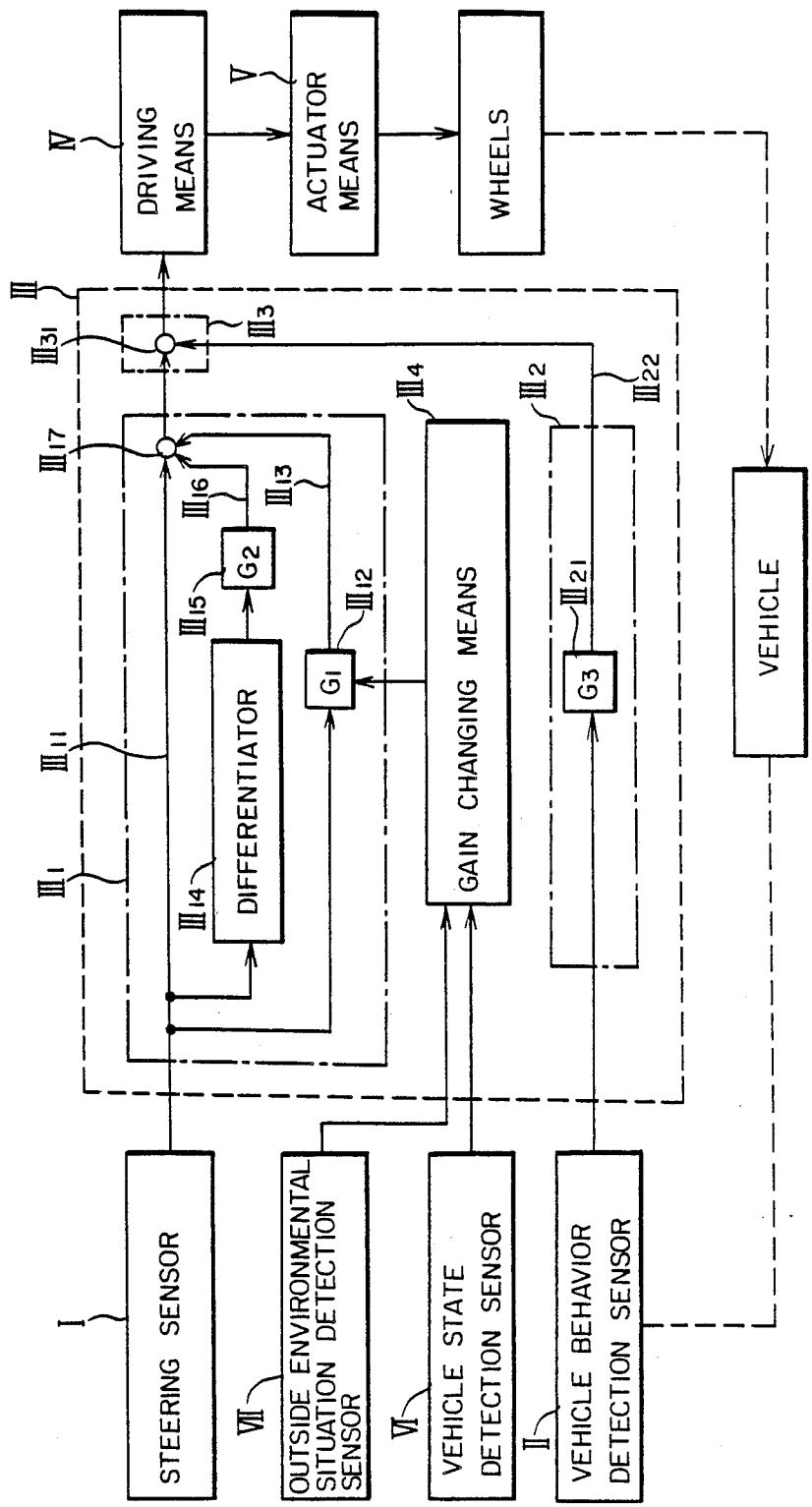
FIG. 5 is a schematic block diagram of an apparatus for controlling steering of wheels of a vehicle according to a second mode of the present invention.

The second mode of the present invention is shown in the block diagram of FIG. 5.

A control means III is connected to a vehicle state detection sensor VI for detecting vehicle travel state variable with the vehicle travel, representing the vehicle, such as a vehicle velocity and a vehicle load and/or an outside environmental situation detection sensor VII for detecting an outside environmental situation such as a road surface condition and a first coefficient circuit $III_{12}$. The control means III comprises a gain changing means $III_4$ for changing a coefficient $G_1$ of the first coefficient circuit $III_{12}$ on the basis of signals for vehicle travel state variable with the vehicle travel and output from the vehicle state detection sensor VI and/or signals for state variables representing outside environmental situations and output from the outside environmental situation detection sensor VII.

The function and effect of the second mode having the above characteristic feature will be described below.

A steering sensor I converts a steering angle of a steering wheel into an electrical signal. A vehicle behavior sensor II converts a vehicle behavior state variable into an electrical signal. These electrical signals from the steering sensor I and the vehicle behavior sensor II are processed in the control means III so as to optimize the vehicle behavior for the steering angle. More specifically, a feed forward signal operating means $III_1$ converts a steering wheel angle $\delta$ into a feed forward signal $\delta + G_1 \cdot \delta + G_2 \cdot \delta$. The feed forward signal generating means comprises a steering angular velocity signal operating circuit $III_{16}$ provided with a differentiator $III_{14}$ for differentiating the steering angle and a second coefficient circuit $III_{15}$, a steering angle signal operating means $III_{13}$ provided with the first coefficient circuit $III_{12}$ for correcting a steering angle magnitude of the detected steering angle, and a steering angle signal circuit $III_{14}$ for transmitting the steering angle without processing to the control means.

In a circuit $III_{22}$ for operating signals for variables representing vehicle behavior, having a third coefficient circuit $III_{21}$ for multiplying a signal from the vehicle behavior sensor II with a coefficient $G_3$ for determining a feedback value, the vehicle behavior state variable o is converted into a feedback signal $G_3 \cdot \delta$.

A difference between the feed forward signal generated by the feed forward signal operating means and the feedback signal generated by the feedback signal operating means is calculated by an adder/subtractor $III_{31}$ in the control signal operating means $III_3$ to generate a steering control signal.

The steering control signal is amplified by the driving means IV as an actuator drive signal for driving the actuator. The actuator drive signal is used to drive the actuator in the actuator means V so as to apply an optimal steering angle of either the front or rear wheels or both.

The gain changing means $III_4$ can change the coefficient (gain) $G_1$ of the first coefficient circuit $III_{12}$ on the basis of the signals for vehicle travel state variables with the vehicle travel, such as a vehicle velocity, a vehicle load, a wheel load, and a vehicle wheel velocity and/or the signals for state variables representing outside environmental situations such as a road surface condition. When the gain changing means $III_4$ changes the gain $G_1$ on the basis of the vehicle velocity, the vehicle load, and the road surface condition, all of which are represented by the electrical signals corresponding thereto and output from the vehicle state detection sensor VI and the outside environmental situation detection sensor VII, the response characteristics of the vehicle behaviors for steering can be kept constant event if the vehicle velocity is changed, thereby further improving vehicle controllability and vehicle stability.

Third Mode

Figure 6:
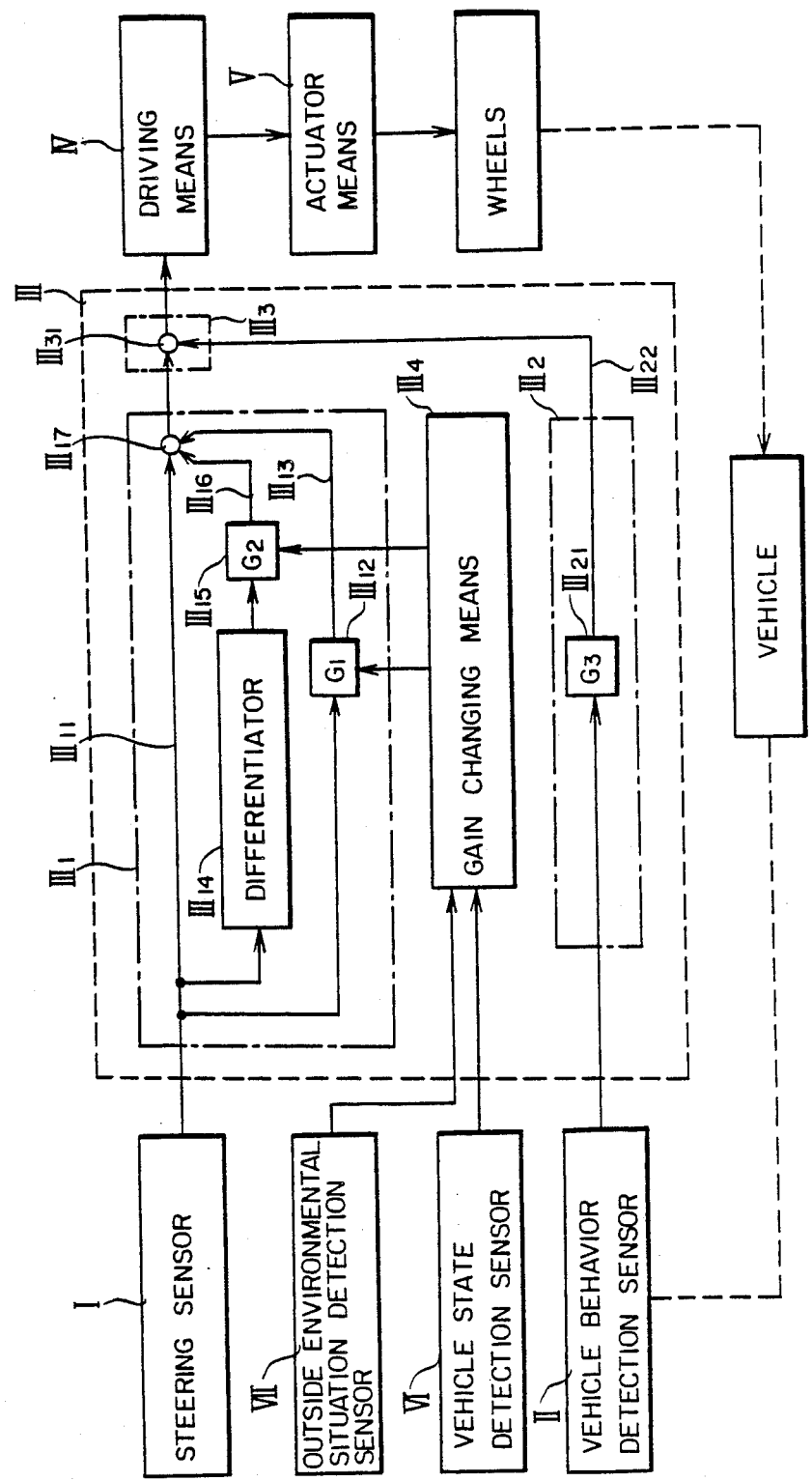
FIG. 6 is a schematic block diagram of an apparatus for controlling steering of wheels of a vehicle according to a third mode of the present invention.

The third mode of the present invention is shown in the block diagram of FIG. 6. In the arrangement of the second mode, the gain changing means $III_4$ is connected to the first coefficient circuit $III_{12}$ and the second coefficient circuit $III_{15}$ The coefficients in the first and second coefficient circuits $III_{12}$ and $III_{15}$ are changed on the basis of the signals for vehicle travel state variables with the vehicle travel and output from the vehicle state detection sensor and/or the signals for state variables representing outside environmental situations and output from the outside environmental situation detection sensor.

The function and the effect of the third mode with the above characteristic feature will be described below.

The gain $G_2$ of the second coefficient circuit $III_{15}$ included in the feed forward signal operating means $III_1$ is increased when the gain $G_1$ of the first coefficient circuit $III_{12}$ is large. However, when the gain $G_1$ of the first coefficient circuit $III_{12}$ is small, the gain $G_2$ is decreased accordingly.

With the above arrangement, the following effect is obtained when the differential value of the steering angle is small as in the case wherein the driver easily changes lanes in a wide road.

In addition to an increase in gain $G_1$ of the first coefficient circuit $III_{12}$ for correcting the magnitude of the steering angle signal, the gain $G_2$ of the second coefficient circuit $III_{15}$ for correcting the magnitude of the differential value of the steering angle is increased to reduce understeering so as not to cause degradation of the vehicle dynamic characteristics, i.e., excessive turning of the steering wheel, on the basis of the signals for the vehicle travel state variable with the vehicle travel and output from the vehicle state detection sensor VI and/or the signals for state variables representing outside environmental situations and output from the outside environmental situation detection sensor VII.

When the gains $G_1$ and $G_2$ of the first and second coefficient circuits $III_{12}$ and $III_{15}$ are kept small for the leading edges of the steep steering angle signal curve and the steep differential value curve of the steering angle signal, oversteering of the vehicle can be reduced and stable vehicle behaviors can be assured. A better control effect than that of the second mode can be obtained. Therefore, better vehicle controllability and vehicle stability can be guaranteed.

Fourth Mode

Figure 7:
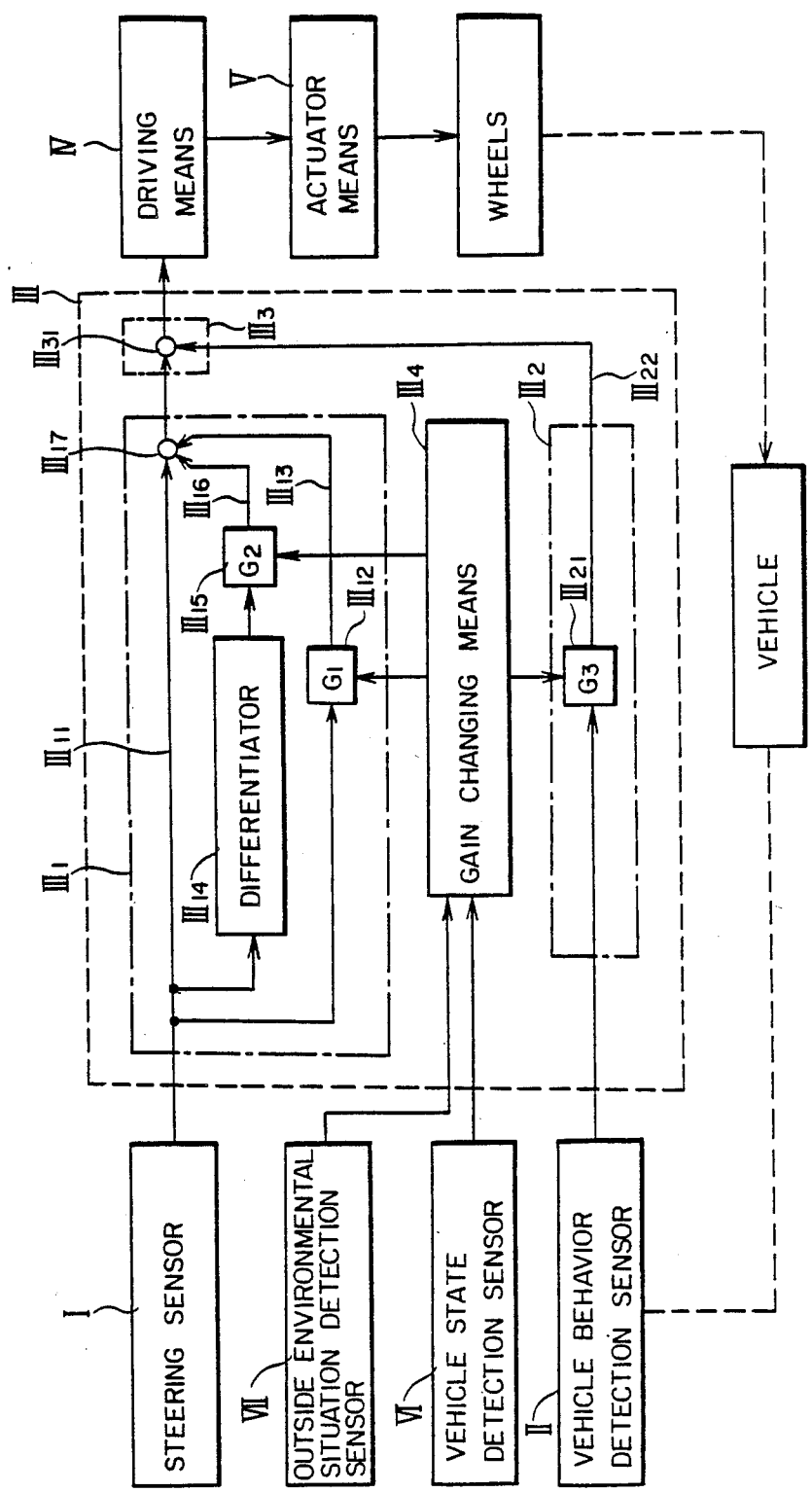
FIG. 7 is a schematic block diagram of an apparatus for controlling steering of wheels of a vehicle according to a fourth mode of the present invention.

The fourth mode of the present invention is shown in the block diagram of FIG. 7. In the arrangement of the third mode, the gain changing means $III_4$ is connected to the first, second, and third coefficient circuits $III_{12}$, $III_{15}$, and $III_{21}$. The coefficients of the first, second, and third coefficient circuits $III_{12}$, $III_{15}$, and $III_{21}$ can be changed on the basis of the signals for vehicle travel state variables with the vehicle travel and output from the vehicle travel state detection sensor and/or the signals for state variables representing outside environmental situations and output from the outside environmental state detection sensor.

The function and the effect of the fourth mode having the above characteristic feature will be described below.

The gain $G_3$ of the third coefficient circuit $III_{21}$ included in the feedback signal operating means $III_2$ is decreased when the gains $G_1$ and $G_2$ of the first and second coefficient circuits $III_{12}$ and $III_{15}$ included in the feed forward signal operating means $III_1$ are large, i.e., when the vehicle behavior response to the detected steering angle applied by the driver is high. However, when the gains $G_1$ and $G_2$ of the first and second coefficient circuits $III_{12}$ and $III_{15}$ in the feed forward signal operating means $III_1$ are small, i.e., when the vehicle behavior response to the steering angle applied by the driver is low, the gain $G_3$ of the third coefficient circuit $III_{21}$ in the feedback signal operating means $III_2$ is increased. Therefore, a better control effect than the third mode of the present invention can be obtained.

Fifth Mode

Figure 8:
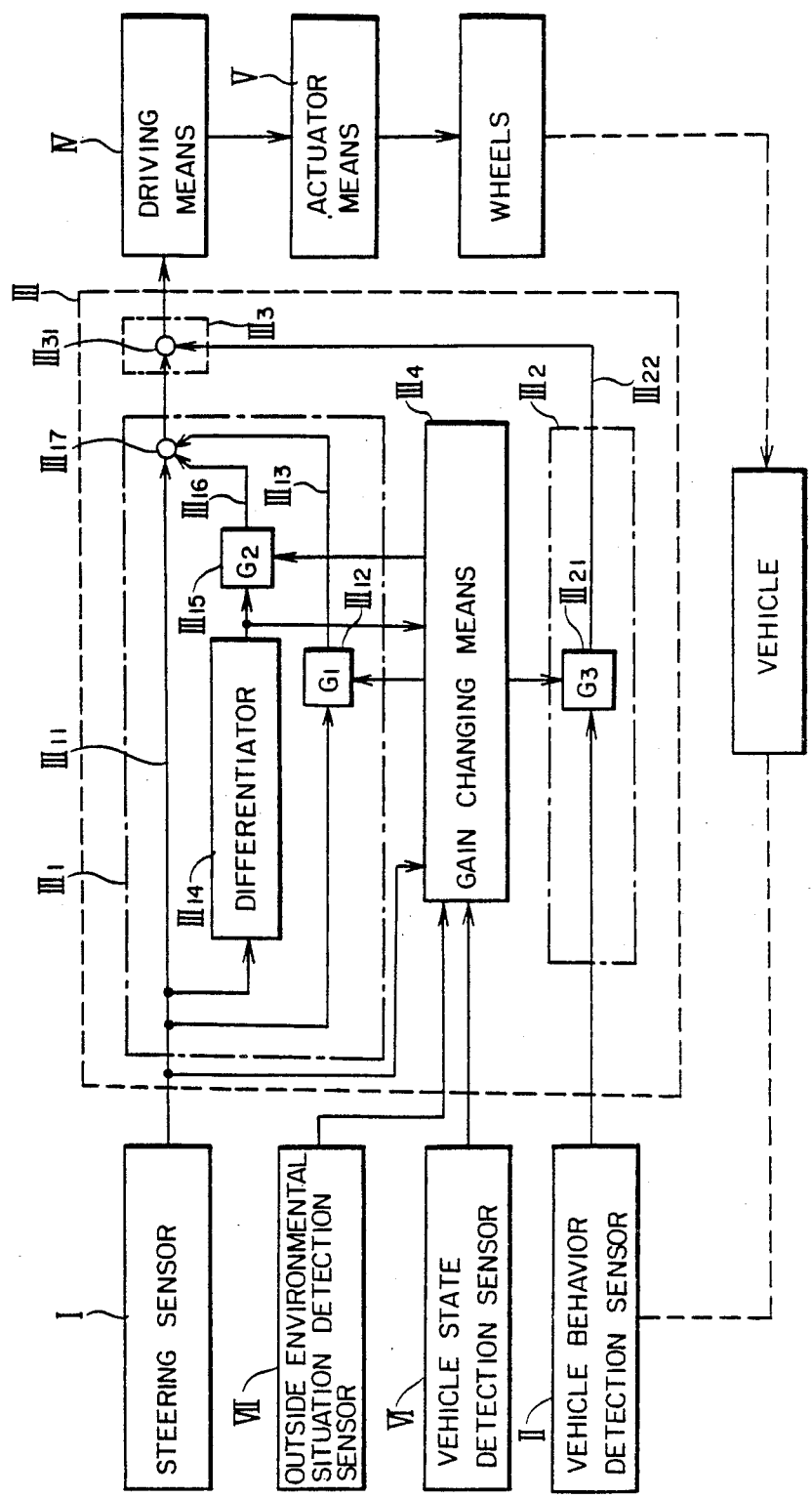
FIG. 8 is a schematic block diagram of an apparatus for controlling steering of wheels of a vehicle according to a fifth mode of the present invention.

The fourth mode of the present invention is shown in the block diagram of FIG. 8. In the arrangement of the fourth mode, the gain changing means $III_4$ is connected to the vehicle state detection sensor VI and/or the outside environmental situation detection sensor VII, and the steering sensor I and/or the steering angular velocity signal operating circuit $III_{16}$. The coefficients or gains ($G_1$ to $G_3$) of the first to third coefficient circuits can be changed on the basis of the signals for vehicle travel state variable with the vehicle travel and output from the vehicle state detection sensor VI and/or the signals for state variables representing the outside environmental situations and output from the outside environmental situation detection sensor VII, and the steering angle signal from the steering sensor I and/or the steering angular velocity signal from the steering angular velocity signal operating circuit $III_{16}$.

The function and effect of the fifth mode having the above characteristic feature will be described below.

The feed forward signal operating means $III_1$ in the control means III calculates the control signal on the basis of the steering angle of the steering wheel. The control signal calculated on the basis of the variables representing the vehicle behaviors is calculated by the feedback signal operating means $III_2$ These control signals are processed by the control signal operating means $III_{13}$, thereby generating an optimal steering angle.

The optimal gains of the first and second coefficient circuits $II12$ and $II15$ in the feed forward signal operating means $III_1$ and the third coefficient circuit $III_{21}$ in the feedback signal operating means $III_2$ are set by the gain changing means $III_4$ in the control means III.

These gains are preferably not only changed by the vehicle travel state variable with the vehicle travel such as a vehicle velocity and a vehicle load and the state variables representing the outside environmental situations such as a road surface state, but also changed by the will of the driver. More preferably, the gains are automatically changed.

The present invention provides the gain changing means $III_4$ for resetting the gains on the basis of the steering wheel angle and the steering velocity, both of which serve as factors for reflecting the driver's will.

The gain changing means III$_4$ sets small gains G$_1$ and G$_2$ and a large gain G$_3$ when the steering wheel angle is small. In this case, the gain changing means III$_4$ determines that the driver does not intend to turn the steering wheel. However, when the steering wheel angle is increased, the gain changing means III$_4$ sets large gains G$_1$ and G$_2$ and a small G$_3$. In this case, the gain changing means III$_4$ determines that the driver intends to turn the steering wheel. When the steering velocity is high, the gain changing means III$_4$ determines that the driver wants to abruptly turn the steering wheel. In this case, the gains G$_1$, G$_2$, and G$_3$ are set in the same manner as in the above case wherein the steering wheel angle is large.

When the control means III comprises the above gain changing means III$_4$, the magnitude of the feed forward signal output from the feed forward signal operating means IIII is kept small at a small steering wheel angle. In this case, the magnitude of the feedback signal output from the feedback signal operating means III$_2$ is increased. Therefore, vehicle stability can be further improved since the steering control signal includes the feedback signal as a major component. However, when the steering wheel angle is large and a steering wheel angular velocity is high, the magnitude of the feed forward signal output from the feed forward signal operating means III$_1$ is increased while the feedback signal output from the feedback signal operating means III$_2$ is decreased. The steering control signal has the feed forward signal as a major component, and therefore the response time of the vehicle can be further shortened.

In other words, vehicle stability and vehicle controllability can be improved by the steering wheel angle and the steering velocity, and a better control effect can be obtained.

Sixth Mode

Figure 9:
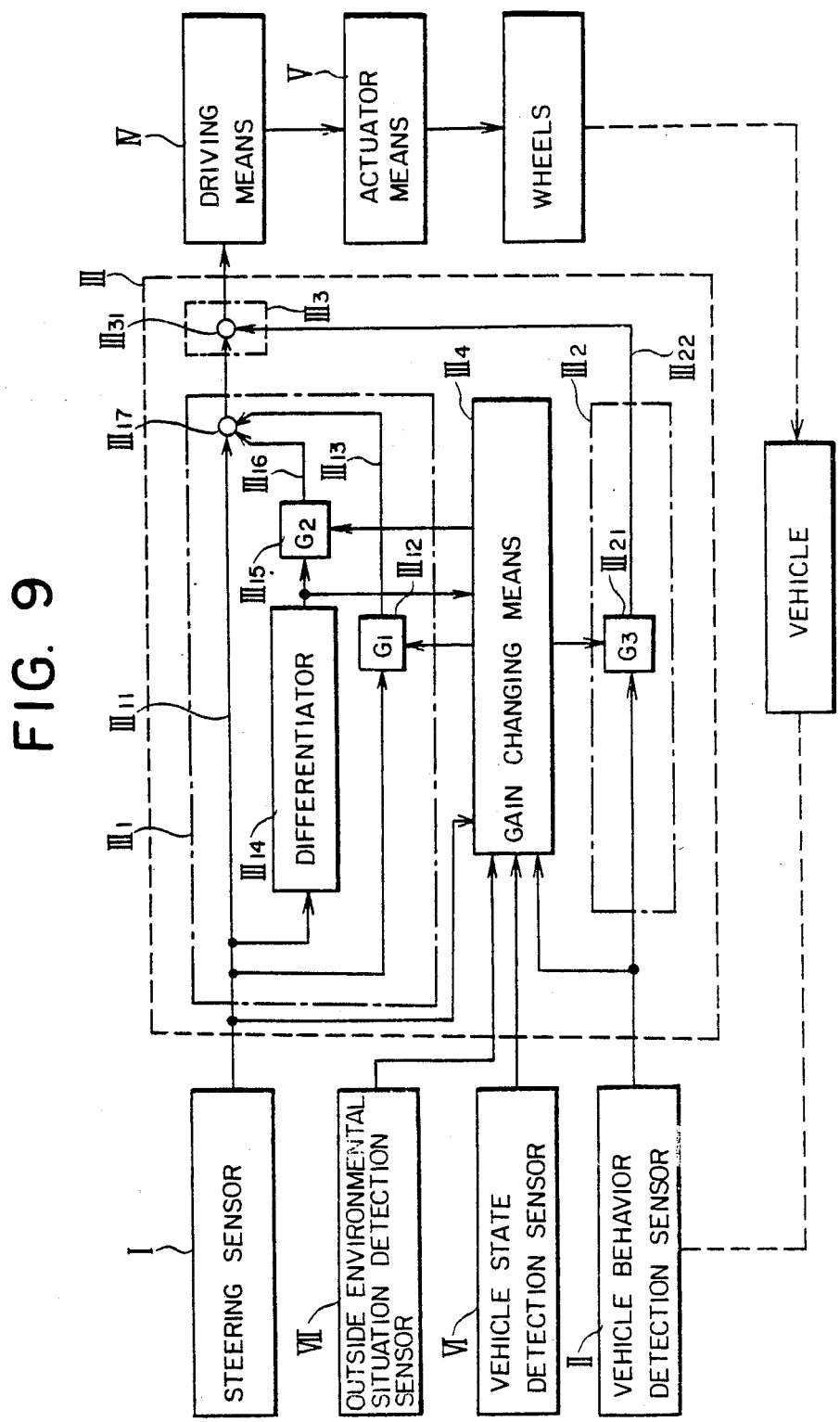
FIG. 9 is a schematic block diagram of an apparatus for controlling steering of wheels of a vehicle according to a sixth mode of the present invention.

The sixth mode of the present invention is shown in the block diagram of FIG. 9. In the fourth mode, a gain changing means III$_4$ is connected to a vehicle state detection sensor VI and/or an outside environmental situation detection sensor VII, a steering sensor I and-/or a steering angular velocity signal operating circuit III$_{16}$, and a vehicle behavior sensor II. Gains (GI to G$_3$) of first to third coefficient circuits can be changed on the basis of the signals for vehicle travel state variable with the vehicle travel and output from the vehicle state detection sensor VI and/or the signals for state variables representing the outside environmental situations and output from the outside environmental situation detection sensor VII, the steering angle signal from the steering sensor I and/or the steering angular velocity signal from the steering angular velocity signal operating circuit III$_{16}$, and the signals for variables representing vehicle behavior and output from the vehicle behavior sensor II.

The function and effect of the sixth mode having the above characteristic feature will be described below.

The control signal based on the vehicle travel state variable with the vehicle travel is calculated by the feed forward signal operating means III$_1$ in the control means III. The control signal based on the variables representing vehicle behavior is calculated by the feedback signal operating means III$_2$ These control signals are processed by the control signal operating means III$_{13}$, thereby generating an optimal steering control signal.

The optimal gains G$_1$ and G$_2$ of the first and second coefficient circuits III$_{12}$ and III$_{15}$ in the feed forward signal operating means III$_1$ and the optimal gain G$_3$ of the third coefficient circuit III$_{21}$ in the feedback signal operating means III$_2$ are set by the gain changing means III$_4$ in the control means III.

When the gains are determined by the steering angular velocity or the vehicle velocity sensor VI, the following problem occurs. For example, when the steering sensor I for detecting the steering angle or the vehicle velocity sensor VI for detecting the steering angular velocity is failed, the control means III does not have a fail-safe function for such a failure. The resultant steering control angle is different from an accurate control angle, which may endanger the driver.

The vehicle behavior which cannot be measured (or estimated) by only the steering angle signal output from the steering sensor I and the steering angular velocity signal are input as information for changing the gains set by the gain changing means III$_4$ More accurate control can be therefore achieved.

By inputting the vehicle travel state variable with the vehicle travel and the vehicle behavior to the gain changing means III$_4$, the control effect can be greatly improved by a relatively simple mechanism for performing complicated control.

Seventh Mode

Figure 10:
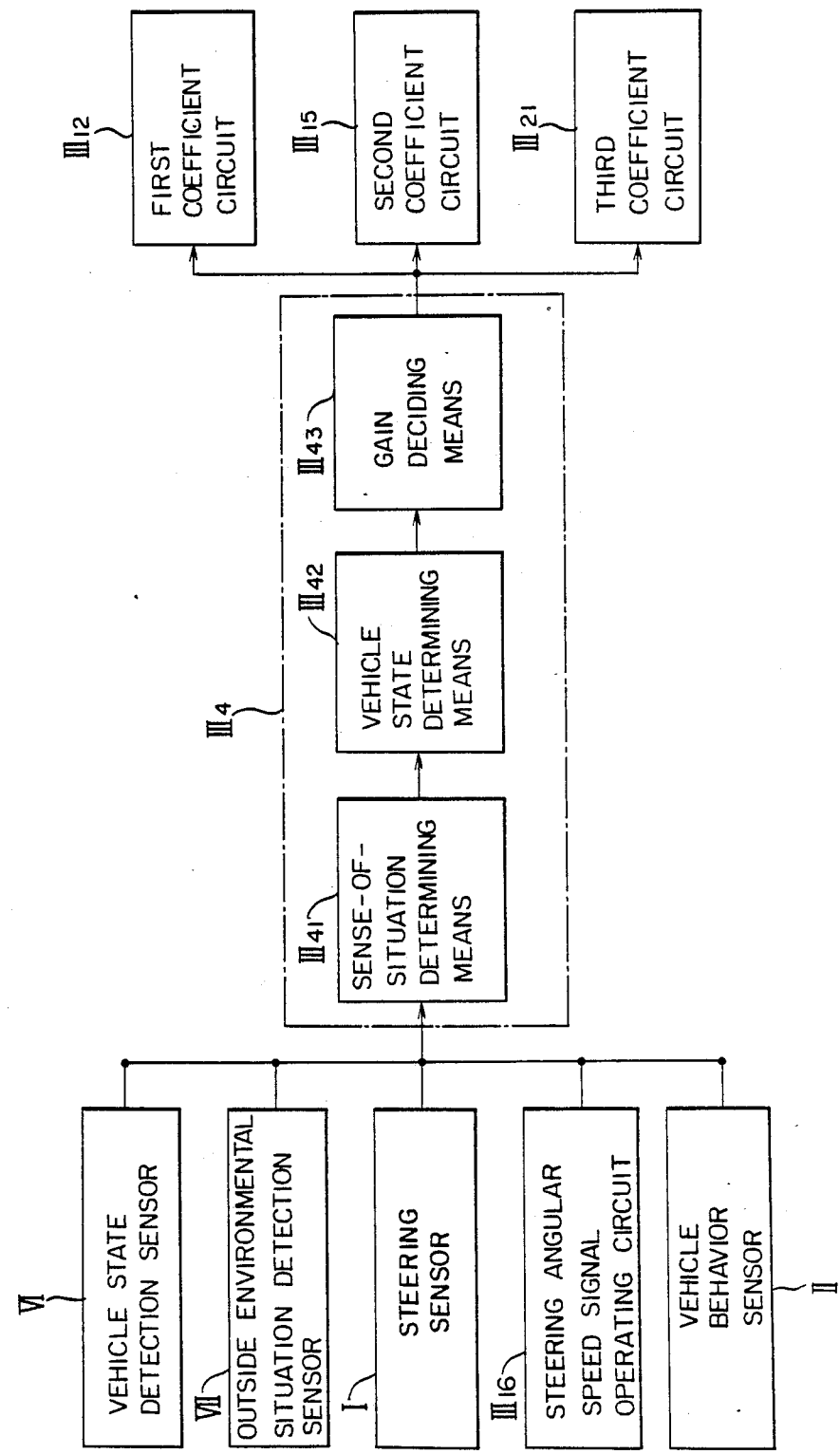
FIG. 10 is a schematic block diagram of an apparatus for controlling steering of wheels of a vehicle according to a seventh mode of the present invention.

The seventh mode of the present invention is shown in the block diagram of FIG. 10. In the arrangement of the second mode, the gain changing means III$_4$ is connected to: at least one of the vehicle state detection sensor VI for detecting the signals for vehicle travel state variable with the vehicle travel such as a vehicle velocity and a vehicle load and/or the outside environmental situation detection sensor VII for detecting the signals for state variables representing the outside environmental situations such as a road surface state, rainfall, and an ambient temperature, and/or the steering sensor I and/or the steering angular velocity signal operating circuit III$_{16}$ and/or the vehicle behavior sensor II; and the first coefficient circuit III$_{12}$, the second coefficient circuit III$_{15}$ and/or the third coefficient circuit III$_{21}$ The gain changing means comprises: a sense-of-situation determining means III$_{41}$ for determining a present situation judged by the human senses on the basis of a signal of at least one of the vehicle state detection sensor VI and/or the outside environmental situation detection sensor VII and/or the steering sensor I and/or the steering angular velocity signal operating circuit III$_{16}$ and/or the vehicle behavior sensor II; a vehicle state determining means III$_{42}$ for determining the required degree of vehicle stability and vehicle controllability on the basis of the determination result from the sense-of-situation determining means III$_{41}$; and a gain deciding means III$_{43}$ for deciding the gains G$_1$ to G$_3$ on the basis of the determination result from the vehicle state determining means III$_{42}$ and outputting the optimal gains to the first coefficient circuit III$_{12}$ and/or the second coefficient circuit III$_{15}$ and/or the third coefficient circuit III$_{21}$.

The function and the effect of the seventh mode having the above characteristic feature will be described below.

The gain changing means III$_4$ receives at least one of the signals for vehicle travel state variable with the vehicle travel such as the vehicle velocity and the vehicle load and output from the vehicle state detection sensor IV, the signals for state variables representing outside environmental situations such as a road surface state, rainfall, and an ambient temperature and output from the outside environmental situation detection sensor VII, the steering angle signal from the steering sensor I, the steering angular velocity signal from the steering angular velocity signal operating circuit $III_{16}$, and the signals for variables representing vehicle behavior and output from the vehicle behavior sensor II.

The sense-of-situation determining means $III_{41}$ determines the current situation, i.e., the degree of the vehicle velocity, the degree of the vehicle load, and the degree of the steering angle, on the basis of the input signal.

A necessary measure M for the vehicle response in units of behavior variables with slight ambiguity given by the situations determined by the vehicle state determining means $III_{42}$ is calculated in accordance with conditions (1) to (8) given as follows:

(1) If the vehicle velocity is high, the response time is prolonged.

(2) If the vehicle load is heavy, the response time is prolonged.

(3) If the road is slippery, the response time is prolonged.

(4) If rainfall is high, the response time is prolonged.

(5) If the ambient temperature is low, the controllability is prolonged.

(6) If the steering angle is large, the controllability is shortened.

7) If the steering angular velocity is high, controllability is shortened.

(8) If the variables representing vehicle behavior are large, the response time is prolonged.

If the detected situation is given according to condition (1), an expression is given such that "if the vehicle velocity is relatively high (i.e., a value corresponding to the situation determined by the sense-of-situation determining means $III_{41}$) the controllability is prolonged accordingly". For example, as shown in FIG. 10, the measure for the degree of vehicle velocity felt by the human senses is determined by the sense-of-situation determining means $III_{41}$ when the actual vehicle velocity is detected by the sensor. The value of the obtained by the sense-of-situation determining means $III_{41}$ is converted into the necessary measure M (the necessary measure for response in this case) by the vehicle state determining means $III_{42}$ provided with a function operation section $III_{421}$.

Gains $G_1$ to $G_3$ suitable for the current situation are decided by the gain deciding means $III_{43}$ on the basis of the necessary measure M. The corresponding gain is supplied to at least one of the first to third coefficient circuits $III_{12}$, $III_{15}$, and $III_{21}$.

By arranging such a gain changing means $III_4$, an accurate control value can be given for any situation which can be hardly expressed (i.e., the degree of the vehicle velocity or the degree of steering angle can be accurately expressed). Therefore, all situations can be controlled, and a better control effect can be obtained.

Eighth Mode

Figure 11:
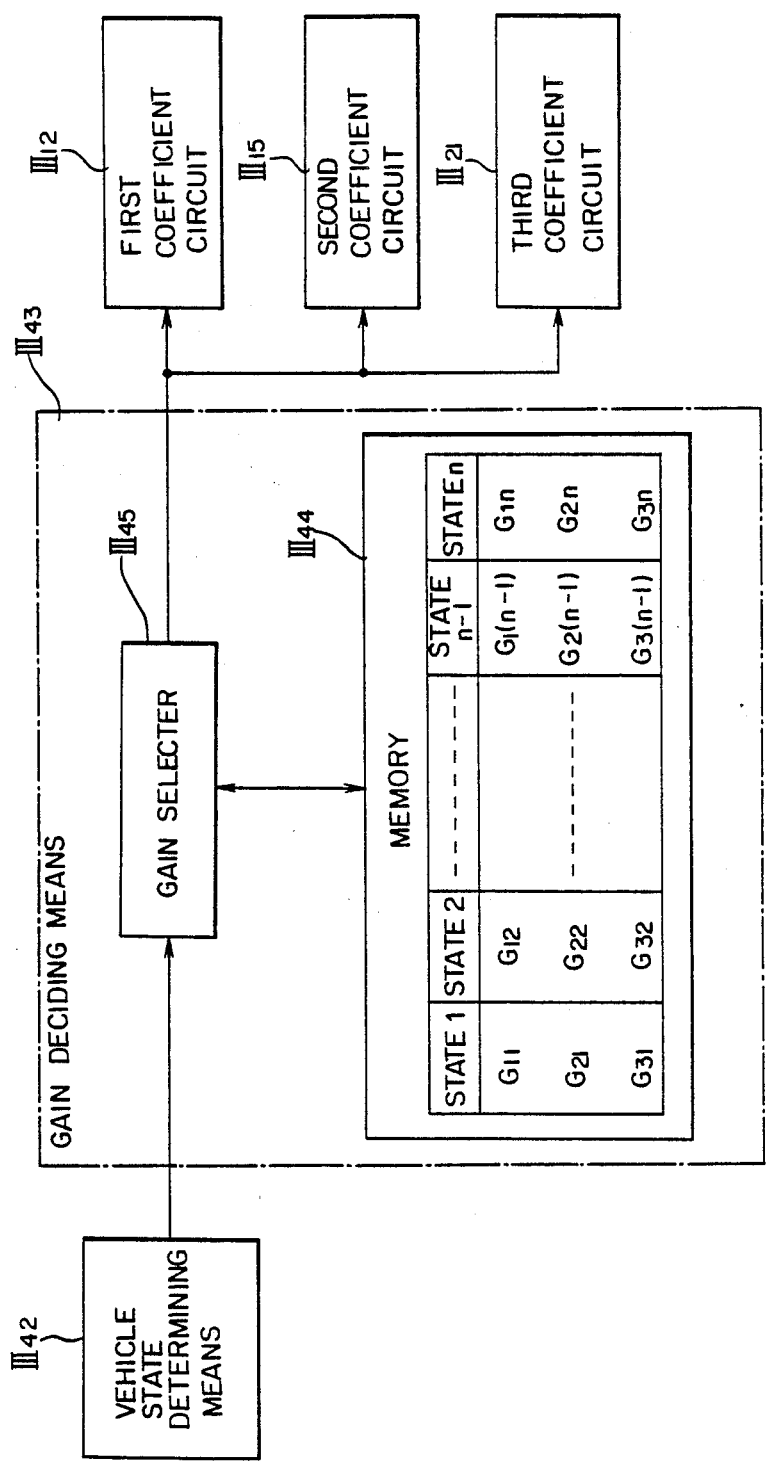
FIG. 11 is a schematic block diagram of an apparatus for controlling steering of wheels of a vehicle according to an eighth mode of the present invention.

The eighth mode of the present invention is shown in the block diagram of FIG. 11. In the seventh mode, the gain deciding means $III_{43}$ included in the gain changing means $III_4$ includes a memory $III_{44}$ for calculating the gains on the basis of the necessary measure for vehicle stability and vehicle response and storing the calculated values, and a gain selector $III_{45}$ for selecting the gain values from the memory $III_{44}$ on the basis of the determination value from the vehicle state determining means $III_{42}$.

The function and effect of the eighth mode having the above characteristic feature will be described below.

The gain deciding means $III_{43}$ receives the necessary measure for vehicle stability and response output from the vehicle state determining means $III_{42}$. The memory $III_{44}$ in the gain deciding means $III_{43}$ prestores gains $G_{1n}$ to $G_{3n}$ (where n is the number of gains corresponding to the necessary measures) corresponding to the calculated necessary measures. The gains $G_{1n}$ to $G_{3n}$ are gain values for achieving optimal dynamic characteristics of the vehicle on the basis of the necessary measures for vehicle stability and response.

The gain selector $III_{45}$ selects the gain values suitable for the current situation on the basis of the input necessary measures. The selected gains are output to the first to third coefficient circuits $III_{12}$, $III_{15}$, and $III_{21}$.

By providing the gain deciding means $III_{43}$ described above, the gain changing means $III_4$ can be obtained wherein the gain values corresponding to the necessary measures for vehicle stability and response can be immediately supplied to the first to third coefficient circuits $III_{12}$, $III_{15}$, and $III_{21}$. As a result, flexible control corresponding to given situations can be achieved.

Ninth Mode

Figure 12:
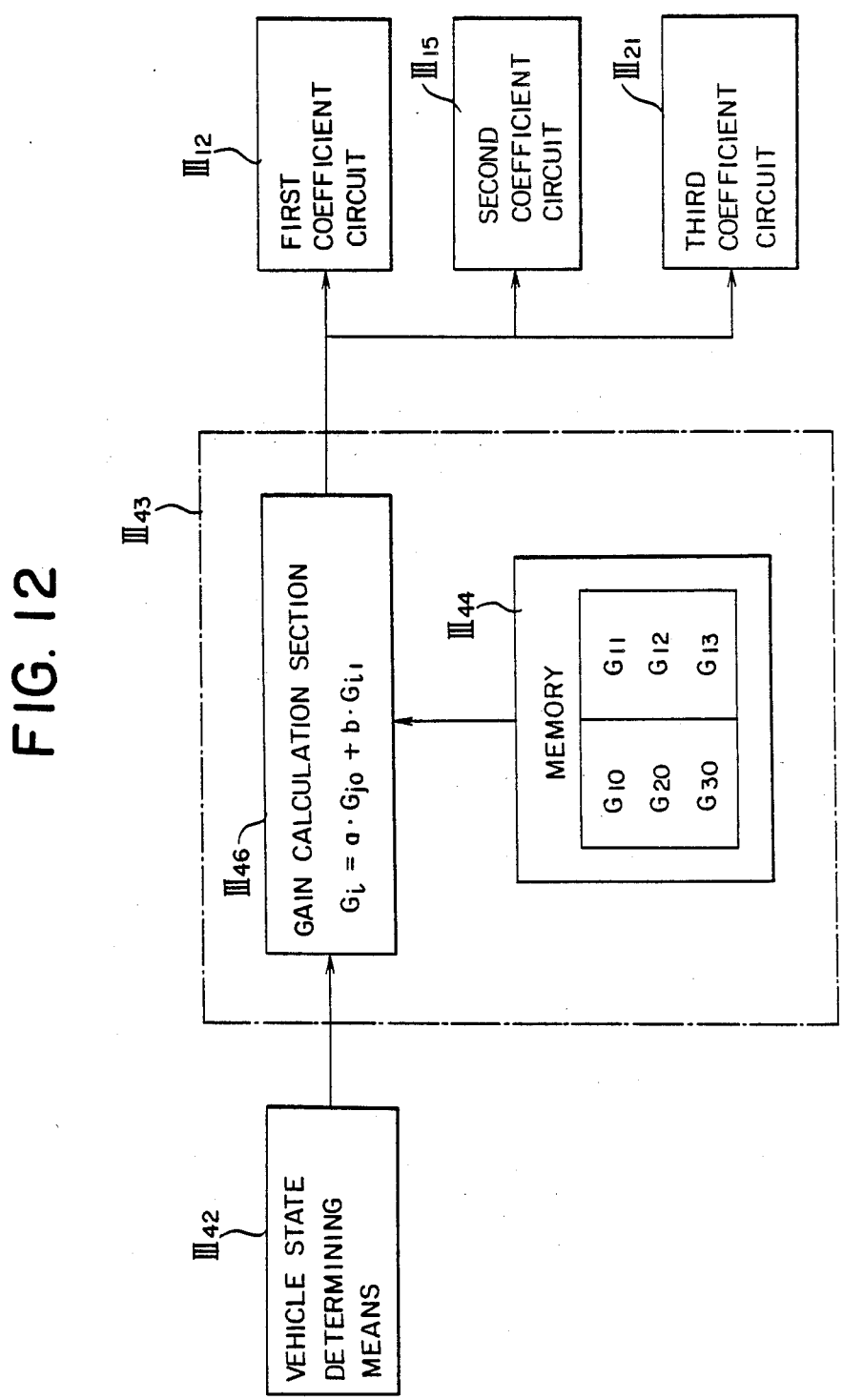
FIG. 12 is a schematic block diagram of an apparatus for controlling steering of wheels of a vehicle according to a ninth mode of the present invention.

The ninth mode of the present invention is shown in the block diagram of FIG. 12. The gain deciding means $III_{43}$ included in the gain changing means $III_4$ includes a memory $III_{44}$ for storing a stability priority gain for maximizing vehicle stability and a response priority gain for maximizing the vehicle response, and a gain calculation section $III_{46}$ for weighting these two gains on the basis of the determination value from a vehicle state determining means $III_{42}$ and calculating gains suitable for the current situation.

The function and effect of the ninth mode having the above characteristic feature will be described below.

The gain deciding means $III_{43}$ receives the necessary measures for vehicle stability and response output from the vehicle state determining means $III_{42}$. Precalculated stability priority gains $G_{10}$ to $G_{30}$ for maximizing vehicle stability and precalculated response priority gains $G_{11}$ to $G_{31}$ for maximizing the vehicle response are stored in the memory $III_{44}$. These priority gains are the basic gains for determining their values.

The gain operation section $III_{46}$ multiplies the stability priority gains $G_{10}$ to $G_{30}$ with weighting coefficients corresponding to the necessary stability measure representing the degree of stability improvement and the response priority gains $G_{11}$ to $G_{33}$ with weighting coefficients corresponding to the necessary response measure. The products are added to calculate gains $G_1$ to $G_3$, and the gains $G_1$ to $G_3$ are respectively output to the first to third coefficient circuits $III_{12}$, $III_{15}$, and $III_{21}$.

When the gain deciding means $III_{43}$ having the arrangement described above is included in the gain changing means $III_4$, the gain changing means $III_4$ can easily supply the gain values corresponding to the necessary stability and response measures to the first to third coefficient circuits $III_{12}$, $III_{15}$, and $III_{21}$. Therefore, flexible control corresponding to given situations can be achieved. A large volume of data need not be stored in the memory $III_{44}$, and the size of the gain changing means $III_4$ can be reduced. Therefore, the overall system arrangement can be compact and inexpensive, thus improving efficiency.

Tenth Mode

Figure 13:
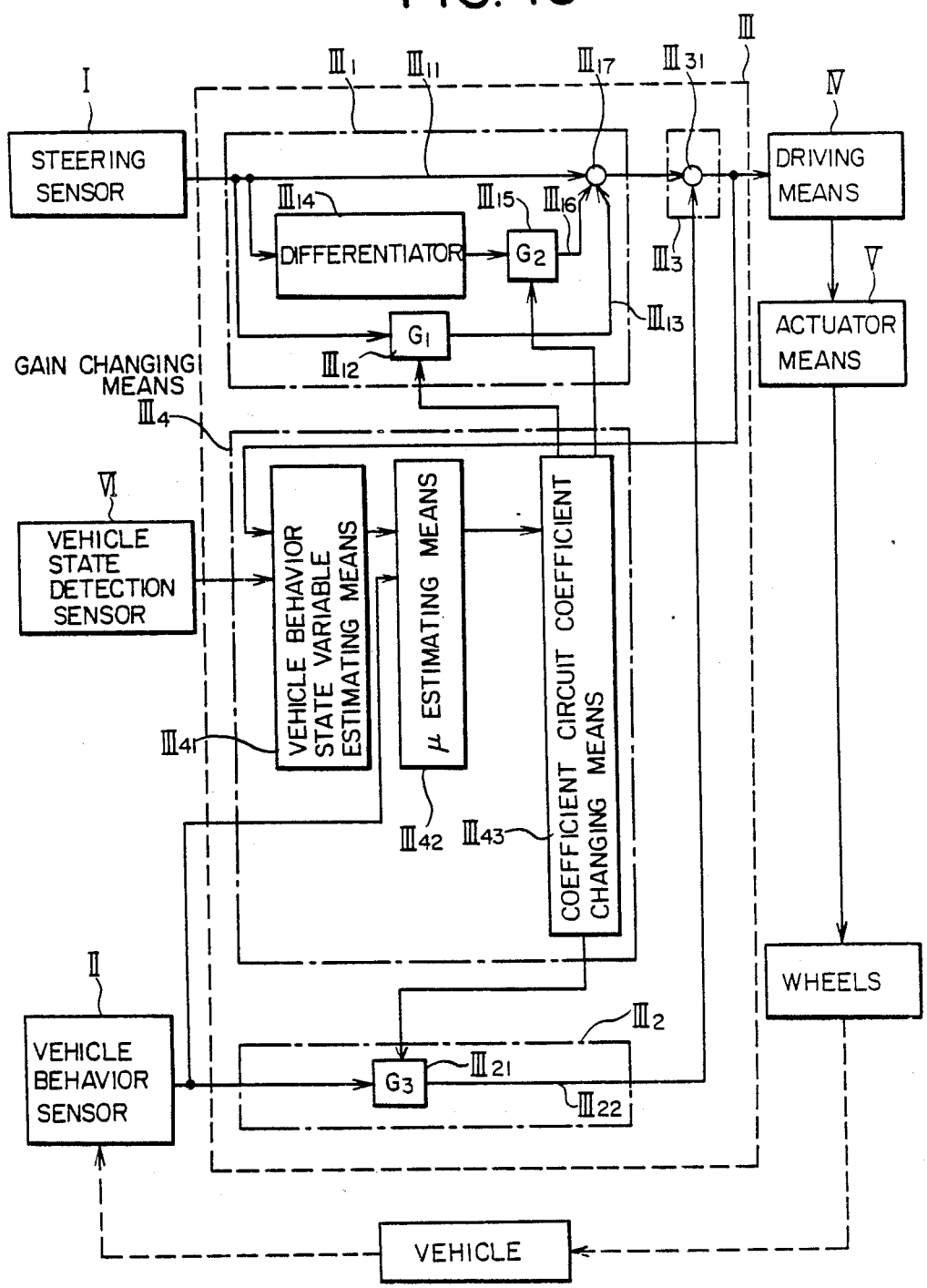
FIG. 13 is a schematic block diagram of an apparatus for controlling steering of wheels of a vehicle according to a tenth mode of the present invention.

The tenth mode of the present invention is shown in the block diagram of FIG. 13. A gain changing means $III_4$ comprises: a vehicle behavior state variable estimating means $III_{41}$ for estimating the variables representing vehicle behavior on the basis of a steering angle signal output from the steering sensor I and signals for vehicle travel state variable with the vehicle travel and output from the vehicle state sensor VI; a $\mu$ estimating means $III_{42}$ for estimating friction ($\mu$) between the road surface and the wheel surfaces on the basis of the vehicle behavior state variable estimation signal output from the vehicle behavior state variable estimating means $III_{41}$ and the signals for variables representing vehicle behavior and output from the vehicle behavior sensor II; and a coefficient circuit coefficient changing means $III_{43}$ for changing the coefficient of at least one of first, second, and third coefficient circuits $III_{12}$, $III_{15}$, and $III_{21}$ on the basis of the $\mu$ estimation signal output from the $\mu$ estimating means $III_{42}$. Therefore, the gain changing means $III_4$ supplies an optimal coefficient to a corresponding coefficient circuit.

The function and effect of the tenth mode having the above characteristic feature will be described below.

The vehicle behavior state variable estimating means $III_{41}$ in the gain changing means $III_4$ estimates the variables representing vehicle behavior on the basis of the steering control signal output from the control signal operating means $III_3$ and the signals for vehicle travel state variables with the vehicle travel and output from the vehicle state detecting sensor VI. The $\mu$ estimating means $III_{42}$ estimates friction ($\mu$) between the road surface and the wheel surfaces on the basis of the vehicle behavior state variable estimation signal output from the vehicle behavior state variable estimating means $III_{41}$ and the signals for variables representing vehicle behavior such as a yaw rate and a lateral acceleration output from the vehicle behavior sensor II. The coefficient circuit coefficient changing means $III_{43}$ changes the coefficient of at least one of the first, second, and third coefficient circuits $III_{12}$, $III_{15}$, and $III_{21}$ on the basis of the $\mu$ estimation signal output from the $\mu$ estimating means $III_{42}$. Therefore, an optimal coefficient corresponding to the current situations of the wheels and/or the road surface is supplied to the corresponding coefficient circuit.

As described above, the coefficients ($G_1$, $G_2$, and $G_3$) are automatically changed on the basis of the $\mu$ estimation value so as to optimally satisfy the current situations of the wheels and/or the road surface. Zig-zag driving or a spin which is caused by oversteering by the driver can be prevented. In addition, even if the driver does not notice a change in $\mu$, safe driving can be assured. Therefore, excellent driving stability can be achieved.

Eleventh Mode

Figure 14:
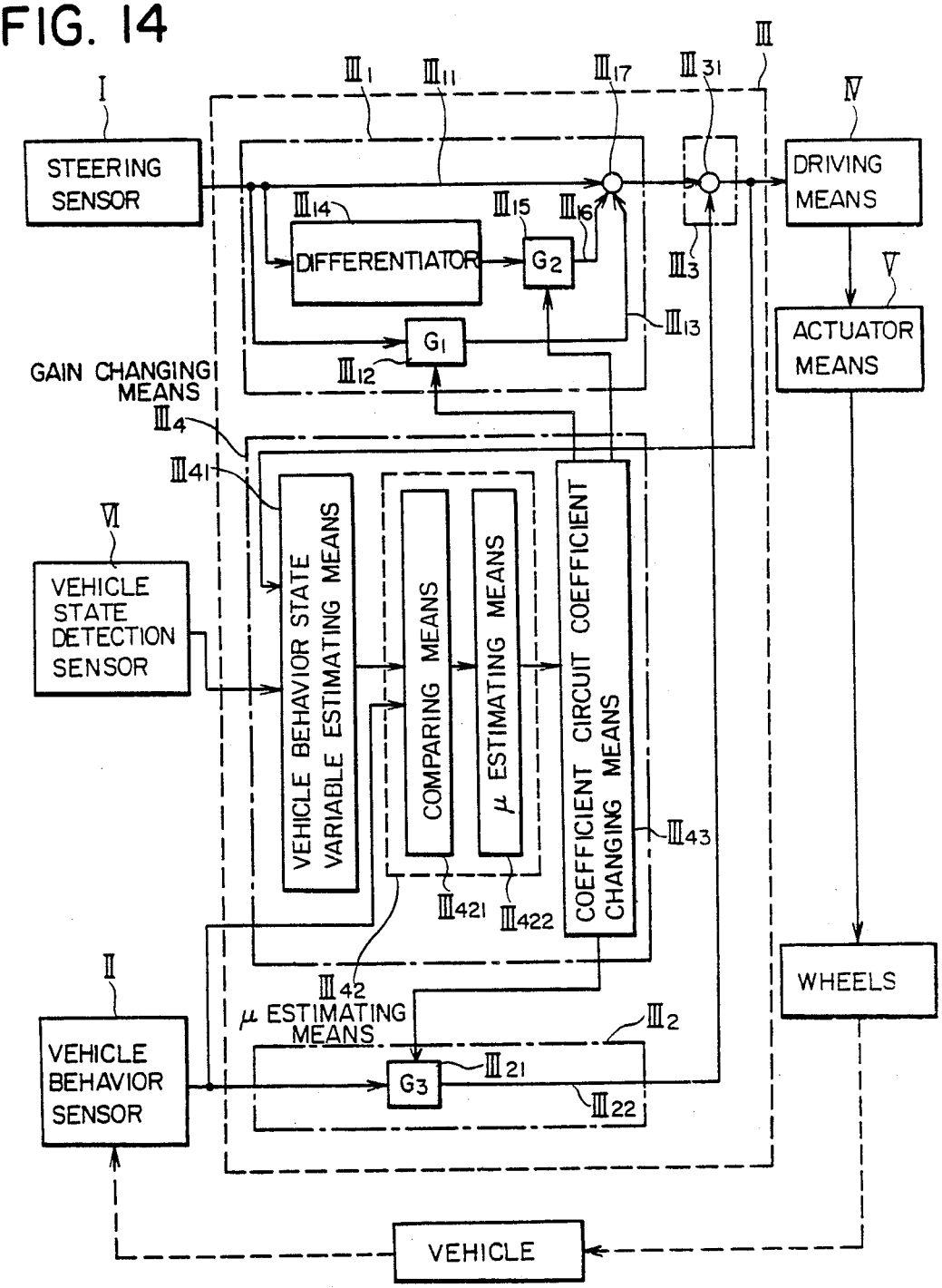
FIG. 14 is a schematic block diagram of an apparatus for controlling steering of wheels of a vehicle according to an eleventh mode of the present invention.

The eleventh mode of the present invention is shown in the block diagram of FIG. 14. A vehicle behavior state variable estimating means $III_{41}$ estimates the variables representing vehicle behavior on the basis of the steering control signal output from the control signal operating means $III_3$ and the signals for vehicle travel state variable with the vehicle travel and output from the vehicle state detection sensor VI. The $\mu$ estimating means $III_{42}$ comprises comparing means $III_{421}$ for comparing the peak value of the vehicle behavior state variable estimation signal output from the vehicle behavior state variable estimating means $III_{41}$ with the peak value of the vehicle behavior state variable signal output from the vehicle behavior sensor II, and a $\mu$ determining means $III_{42}$ for estimating friction $\mu$ on the basis of a comparison result output from the comparing means $III_{421}$.

The above peak value comparison is performed by comparing magnitudes of the peak values of the vehicle behavior state variable estimation signal and the behavior state variable signal and/or a phase difference between their peaks.

The function and effect of the eleventh mode having the above characteristic feature will be described below.

The vehicle behavior state variable estimating means $III_{41}$ estimates the variables representing vehicle behavior on the basis of a vehicle model obtained by mathematically modeling the vehicle behavior on the smooth road by using the steering control signal output from the control signal operating means $III_3$, the signals for vehicle travel state variables with the vehicle travel and output from the vehicle state sensor VI, and the steering control signal output from the control signal operating circuit $III_{31}$.

The comparing means $III_{421}$ in the $\mu$ estimating means $III_{42}$ estimates the vehicle behavior state variable estimation signal output from the vehicle behavior variable estimating means $III_{41}$, e.g., the yaw rate and/or the lateral acceleration generated on the smooth road for the signals representing the current steering angle, the current vehicle travel state variables with the vehicle travels, and the steering control signal, calculates peaks of the signals, calculates a peak value of the signal for variable representing the vehicle behavior such as the yaw rate or the lateral acceleration output from the vehicle behavior sensor II, and compares the calculated peak values. This comparison operation is performed by comparing the magnitude of the peak values and/or the phase difference between their peaks. The $\mu$ determining means $III_{422}$ estimates friction $\mu$ on the basis of the comparison result output from the comparing means $III_{421}$.

Unlike the conventional technique wherein the friction $\mu$ is estimated by the slip ratio of the wheels at the time of stop or start of the vehicle, the friction $\mu$ is estimated by the variables representing the vehicle behaviors according to the present invention. Therefore, the friction $\mu$ for determining the cornering forces of the wheels in the normal dynamic characteristics can be estimated.

The road surface change caused by a change in environmental situation during vehicle traveling can be estimated by the variables representing the vehicle behavior. The coefficients can be set in the coefficient circuits by using the estimated values. Therefore, an excellent adaptive steering control system can be arranged, and stable steering with safety can be provided.

Twelfth Mode

Figure 15:
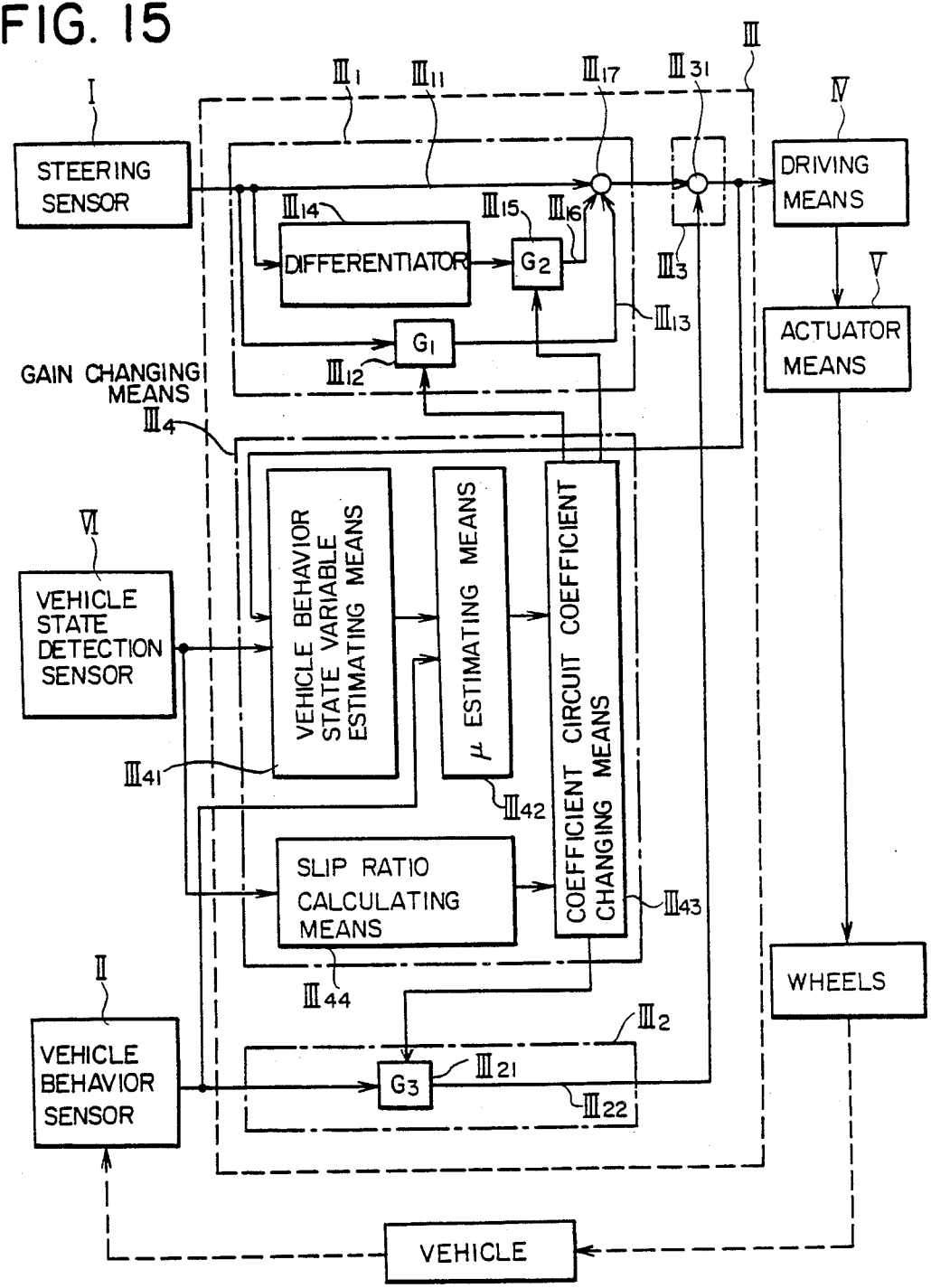
FIG. 15 is a schematic block diagram of an apparatus for controlling steering of wheels of a vehicle according to a twelfth mode of the present invention.

The twelfth mode of the present invention is shown in the block diagram of FIG. 15. A gain changing means $III_4$ comprises: the vehicle behavior state variable estimating means $III_{41}$ for estimating the variables representing the vehicle behavior on the basis of the steering control signal output from the control signal operating means III$_3$ and the signals for vehicle travel state variable with the vehicle travel and output from the vehicle state detection sensor VI; a $\mu$ estimating means III$_{42}$ for estimating friction $\mu$ between the wheels and the road surface on the basis of the vehicle behavior state variable estimation signal output from the vehicle behavior state variable estimating means III$_{41}$ and the vehicle behavior state variable signal output from the vehicle behavior sensor II; slip ratio calculating means III$_{44}$ for calculating a slip ratio of each vehicle wheel on the basis of the signals for vehicle travel state variable with the vehicle travel and output from the vehicle state detection sensor VI; and a coefficient circuit coefficient changing means III$_{43}$ for changing a coefficient of at least one of first, second, and third coefficient circuits III$_{12}$, III$_{15}$, and III$_{21}$ on the basis of the $\mu$ estimation signal output from the $\mu$ estimating means III$_{42}$ and the slip ratio signal output from the slip ratio calculating means III$_{44}$.

The function and the effect of the twelfth mode having the above characteristic feature will be described below.

The vehicle behavior state variable estimating means III$_{41}$ in the gin changing means III$_4$ estimates the variables representing the vehicle behavior on the basis of the steering control signal output from the control signal operating means III$_3$ and the signals for vehicle travel state variables with the vehicle travel and output from the vehicle state detection sensor VI. The $\mu$ estimating means III$_{42}$ estimates friction $\mu$ between each wheel and the road surface on the basis of the vehicle behavior state variable estimation signal output from the vehicle behavior state variable estimating means III$_{41}$ and the behavior state variable signal output from the vehicle behavior sensor II. The slip ratio calculating means III$_{44}$ calculates a slip ratio of each wheel on the basis of the signals for vehicle travel state variables with the vehicle travel and output from the vehicle state detection sensor VI, the vehicle velocity, and the vehicle wheel velocity. The coefficient circuit coefficient changing means III$_{43}$ changes a coefficient of at least one of the first, second, and third coefficient circuits III$_{12}$, III$_{15}$, and III$_{21}$ on the basis of the $\mu$ estimation signal output from the $\mu$ estimating means III$_{42}$ and the slip ratio signal output from the slip ratio calculating means III$_{44}$.

With the above arrangement, the slip ratio is used as a reference for changing the gain. For example, when the gains must be changed to improve stability of the vehicle so as to prevent zig-zag traveling or a spin of the vehicle at the time of start or stop of the vehicle on a road having a low friction value $\mu$ or during abrupt acceleration or deceleration, the gains can be changed prior to changes in variables representing the vehicle behavior.

In addition to steering control corresponding to road surface condition changes caused by changes in outside environmental situations during vehicle traveling, steering control corresponding to vehicle wheel condition changes caused by changes in driving force during an acceleration or deceleration operation upon depression or release of an accelerator pedal can also be performed to improve safety of the vehicle. Therefore, vehicle handling can be further improved.

Thirteenth Mode

Figure 16:
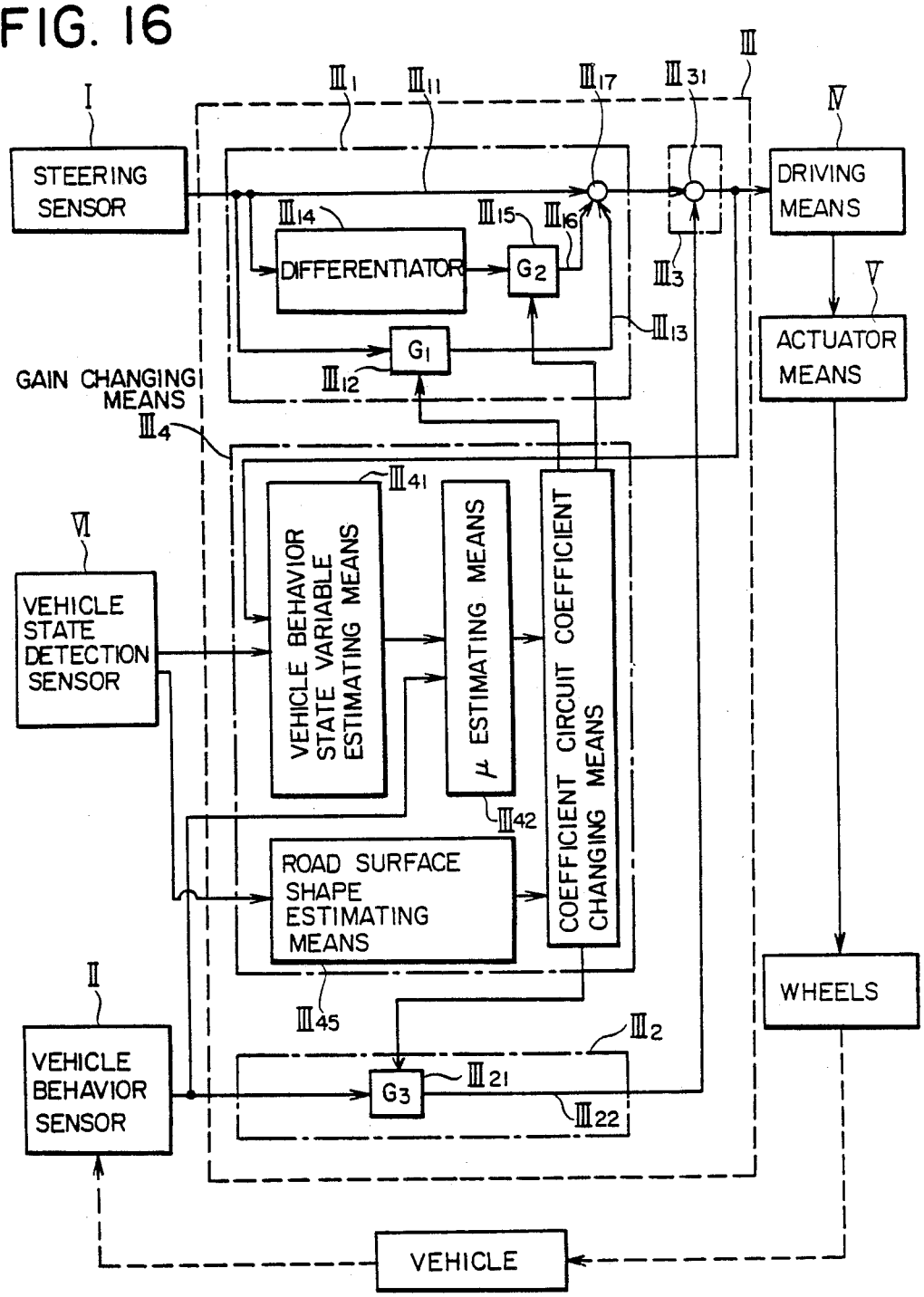
FIG. 16 is a schematic block diagram of an apparatus for controlling steering of wheels of a vehicle according to a thirteenth mode of the present invention.

The thirteenth mode of the present invention is shown in the block diagram of FIG. 16. A gain changing means III$_4$ comprises: a vehicle behavior state variable estimating means III$_{41}$ for estimating the variables representing the vehicle behavior on the basis of the steering control signal output from the control signal operating means III$_3$ and the signals for vehicle travel state variables with the vehicle travel and output from the vehicle state detection sensor VI; a $\mu$ estimating means III$_{42}$ for estimating friction $\mu$ on the basis of the vehicle behavior state variable estimation signal output from the vehicle behavior state variable estimating means III$_{41}$ and the vehicle behavior state variable signal output from the vehicle behavior sensor II; a road surface shape estimating means III$_{45}$ for estimating the shape of the road surface on the basis of the signals for vehicle travel state variable with the vehicle travel and output from the vehicle state detection sensor VI; and a coefficient circuit coefficient changing means III$_{43}$ for changing a coefficient of at least one of first, second, and third coefficient circuits III$_{12}$, III$_{15}$, and III$_{21}$ on the basis of the $\mu$ estimation signal output from the $\mu$ estimating means III$_{42}$ /and the estimated road surface shape signal output from the road surface shape estimating means III$_{45}$.

The function and effect of the thirteenth mode having the above characteristic feature will be described below.

The vehicle behavior state variable estimating means III$_{41}$ in the gain changing means III$_4$ estimates the vehicle travel state variables with the vehicle travel behavior on the basis of the steering control signal output from the control signal operating means III$_3$ and the signals for vehicle travel state variable with the vehicle travel and output from the vehicle state detection sensor VI. The $\mu$ estimating means III$_{42}$ estimates friction $\mu$ on the basis of the vehicle behavior state variable estimation signal output from the vehicle behavior state variable estimating means III$_{41}$ and the signals for variables representing the vehicle behavior and output from the vehicle behavior sensor II. Subsequently, the road surface shape estimating means III$_{45}$ estimates the shape of the road surface which contacts all vehicle wheels on the basis of the vehicle velocity output from the vehicle state detection sensor VI and the signals for state variables representing a suspension displacement of each vehicle wheel and a vehicle velocity. The coefficient circuit coefficient changing means III$_{43}$ changes a coefficient of at least one of the first, second, and third coefficient circuits III$_{12}$, III$_{15}$, and III$_{21}$ on the basis of the $\mu$ estimation signal output from the $\mu$ estimating means III$_{42}$ and the estimated road surface shape signal output from the road surface shape estimating means III$_{45}$.

In a conventional apparatus, vibrations caused by bumps on the road are transmitted to the vehicle body and hence the vehicle behavior sensor. The influenced signal for state variable representing vehicle behavior is used as a steering control signal, thus causing an operation error.

According to the thirteenth mode of the present invention, the estimated road surface shape signal is used as a reference for the gain changing means. Therefore, stability and reliability of the steering control system for the road surface shape can be further improved.

In addition to the vehicle wheel slip state variable changed by changes in outside environmental situations or operations of an accelerator pedal during vehicle traveling, optimal steering control can be provided so as to compensate for the changes in traveling road surface condition. Vehicle safety can be further improved, and vehicle handling can also be improved.

Fourteenth Mode

Figure 17:
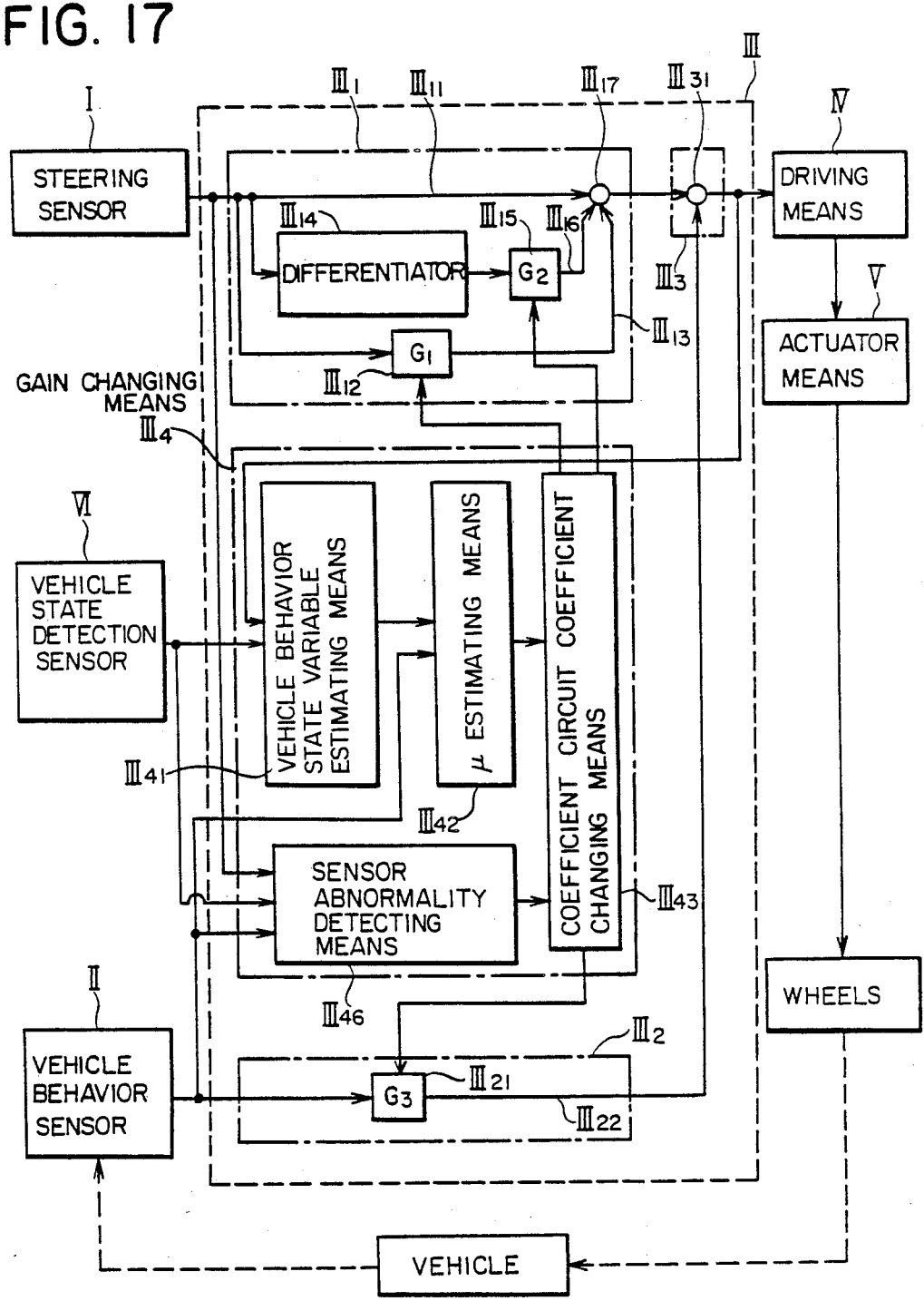
FIG. 17 is a schematic block diagram of an apparatus for controlling steering of wheels of a vehicle according to a fourteenth mode of the present invention.

The fourteenth mode of the present invention is shown in the block diagram of FIG. 17. A gain changing means III$_4$ comprises: a vehicle behavior state variable estimating means III$_{41}$ for estimating the vehicle travel state variables with the vehicle travel behavior on the basis of the steering control signal output from the control signal operating means III$_3$ and the signals for vehicle travel state variable with the vehicle travel and output from the vehicle state detection sensor VI; a $\mu$ estimating means III$_{42}$ for estimating friction $\mu$ between the vehicle wheels and the road surface on the basis of the vehicle behavior state variable estimation signal output from the vehicle behavior state variable estimating means III$_{41}$ and the signals for variables representing the vehicle behaviors and output from the vehicle behavior sensor II; a sensor abnormality detecting means III$_{46}$ for detecting abnormalities of the steering sensor I, the vehicle behavior sensor II, and the vehicle state detection sensor VI; and a coefficient circuit coefficient changing means III$_{43}$ for changing a coefficient of at least one of first, second, and third coefficient circuits III$_{12}$, III$_{15}$, and III$_{21}$ on the basis of the $\mu$ estimation signal output from the $\mu$ estimating means III$_{42}$ and the sensor abnormality detection signal output from the sensor abnormality detecting means III$_{46}$.

The function and effect of the fourteenth mode having the above characteristic feature will be described below.

The vehicle behavior state variable estimating means III$_{41}$ in the gain changing means III$_4$ estimates the vehicle travel state variables with the vehicle travel behavior on the basis of the steering control signal output from the control signal operating means III$_3$ and the signals for vehicle travel state variable with the vehicle travel and output from the vehicle detection sensor VI. The $\mu$ estimating means III$_{42}$ estimates friction $\mu$ between the vehicle wheels and the road surface on the basis of the vehicle behavior state variable estimation signal output from the vehicle behavior state variable estimating means III$_{41}$ and the vehicle behavior state variable signal output from the vehicle behavior sensor II. The sensor abnormality detecting means III$_{46}$ detects abnormalities of the sensors when output values of the steering sensor I, the vehicle behavior sensor II, and the vehicle state detection sensor VI fall outside the allowable range of the preset values in view of the vehicle behavior or when the sensor outputs are compared with each other and comparison results indicate an abnormality. The coefficient circuit coefficient changing means III$_{43}$ changes a coefficient of at least one of the first, second, and third coefficient circuits III$_{12}$, III$_{15}$, and III$_{21}$ on the basis of the $\mu$ estimation signal output from the $\mu$ estimating means III$_{42}$ and the sensor abnormality detection signal output from the sensor abnormality detecting means III$_{46}$.

With the above arrangement, the operation errors of the steering control system which are caused by sensor failures can be prevented to further improve safety and reliability.

When optimal steering control corresponding to changes in outside environmental situations and changes in vehicle travel state variable with the vehicle travel by the driver's operations is required, the vehicle can be constantly kept safe even if the sensors are accidentally malfunction or fail, thereby improving vehicle handling.

Description of Principle of $\mu$ Estimation)

A method of estimating friction $\mu$ between the vehicle wheels and the road surface in an apparatus for controlling steering of wheels of a vehicle according to the present invention will be briefly exemplified.

Equations of motion for translating lateral motion y and yaw motion $\psi$ as follows:

$$m \cdot \ddot{y} = 2(F_f + F_r) \quad (1)$$

$$I_z \cdot \ddot{\psi} = 2(a_f F_f - a_r F_r) \quad (2)$$
$$F_f = -\mu \cdot m_f [\{(\dot{y} - u_0 \cdot \psi + a_f \dot{\psi})/u_0\} - \delta_f - u_f] \quad (3)$$

$$F_r = -\cdot m_r [\{(\dot{y} - u_0 \cdot \psi - a_r \dot{\psi})/u_0\} - u_r] \quad (4)$$

where
  m: the vehicle weight
  $m_f$: the front load of the vehicle
  $m_r$: the rear load of the vehicle
  $\mu$: the friction
  $u_f$: the auxiliary steering angle for the front wheels
  $u_r$: the auxiliary steering angle for the rear wheels
  $I_z$: the yaw inertia moment of the vehicle
  $a_f$: the distance between the front axile of the vehicle and its center of gravity
  $a_r$: the distance between the rear axile of the vehicle and its center of gravity
  $c_f$: the cornering power of the front wheels of the vehicle
  $c_r$: the cornering power of the rear wheels of the the vehicle
  $F_f$: the cornering force of the front wheels of the vehicle
  $F_r$: the cornering force of the rear wheels of the vehicle
  $u_0$: the vehicle velocity
  $\psi$: the yaw angle of the vehicle
  $\dot{\psi}$: the yaw rate of the vehicle
  $\ddot{\psi}$: the yaw angular acceleration of the vehicle
  y: the lateral displacement of the vehicle
  $\dot{y}$: the lateral velocity of the vehicle
  $\ddot{y}$: the lateral acceleration of the vehicle
  $\delta_f$: the front wheel steering angle of the vehicle Equations (1) to (4) are synthesized as follows:

$$\dot{x}|(t) = Ax|(t) + |b_f(\delta_f(t) + u_f(t)) + |b_r u_r(t) \quad (5)$$

wherein $x|t)$, A, $|b_f$, and $|b_r$ are defined as follows:

$$x|(t) = \begin{pmatrix} y(t) \\ \dot{y}(t) \\ \psi(t) \\ \dot{\psi}(t) \end{pmatrix}$$

$$A = \begin{pmatrix} 0 & 1 & 0 & 0 \\ 0 & a_{22} & a_{23} & a_{24} \\ 0 & 0 & 0 & 1 \\ 0 & a_{42} & a_{43} & a_{44} \end{pmatrix}$$

$$|b_f = \begin{pmatrix} 0 \\ b_{f1} \\ 0 \\ b_{f2} \end{pmatrix}$$

$$|b_r = \begin{pmatrix} 0 \\ b_{r1} \\ 0 \\ b_{r2} \end{pmatrix}$$

(6)

Elements in equations (6) are defined as follows:

$$\left.\begin{aligned} a_{22} &= -2\mu(m_f + m_r)/(u_0 \cdot m) \\ a_{23} &= 2\mu(m_f + m_r)/m \\ a_{24} &= 2\mu(a_r \cdot m_r - a_f \cdot m_f)/(u_0 \cdot m) \\ a_{42} &= 2\mu(a_r \cdot m_r - a_f \cdot m_f)/(u_0 \cdot m) \\ a_{43} &= 2\nu(a_f \cdot m_f - a_r \cdot m_r)/I_z \\ a_{44} &= -2\mu(a_f^2 \cdot m_f + a_r^2 \cdot m_r)/(u_0 \cdot I_z) \\ b_{f1} &= 2\mu \cdot m_f/m \\ b_{f2} &= 2\mu \cdot a_f \cdot m_f/m \\ b_{r1} &= 2\mu \cdot m_r/I_z \\ b_{r2} &= -2\mu \cdot a_r \cdot m_r/I_z \end{aligned}\right\} \quad (7)$$

The yaw rate $\dot{\psi}$ and the lateral velocity $\dot{y}$ are expressed below in accordance with equations (5) and (6). In the following equations, S represents a Laplacian operator.

$$\left.\begin{aligned} g_1(S) \cdot \dot{\psi}(S) &= (d_1 \cdot S + d_0) \\ &\quad (\delta_f(S) + u_f(S)) + (c_1 \cdot S + c_0)u_r(S) \\ \text{for} & \\ g_1(S) &= S^2 - (a_{22} + a_{44})S + \\ &\quad (a_{22} \cdot a_{44} - a_{24} \cdot a_{42} - a_{43}) \\ d_1 &= b_{f2} \\ d_0 &= b_{f1} \cdot a_{42} - b_{f2} \cdot a_{22} \\ c_1 &= b_{r2} \\ c_0 &= b_{r1} \cdot a_{42} - b_{r2} \cdot a_{22} \end{aligned}\right\} \quad (8)$$

$$\left.\begin{aligned} g_2(S) \cdot \dot{y}(S) &= (h_2 \cdot S^2 + h_1 \cdot S + h_0) \\ &\quad (\delta_f(S) + u_f(S)) + (k_2 \cdot S^2 + k_1 \cdot S + k_0)u_r(S) \\ \text{for} & \\ g_2(S) &= S \cdot g_1(S) \\ h_2 &= b_{f1} \\ h_1 &= b_{f2} \cdot a_{24} - b_{f1} \cdot a_{44} \\ h_0 &= b_{f2} \cdot a_{23} - b_{f1} \cdot a_{43} \\ k_2 &= b_{r1} \\ k_1 &= b_{r2} \cdot a_{24} - b_{r1} \cdot a_{44} \\ k_0 &= b_{r2} \cdot a_{23} - b_{r1} \cdot a_{43} \end{aligned}\right\} \quad (9)$$

From equations (9), the lateral acceleration $\dot{y}$ can be derived as follows:

$$\left.\begin{aligned} g_1(S) \cdot \dot{y}(S) &= (h_2 \cdot S^2 + h_1 \cdot S + h_0) \\ &\quad (\delta_f(S) + u_f(S)) + \\ &\quad (k_2 \cdot S^2 + k_1 \cdot S + k_0)u_r(S) \end{aligned}\right\} \quad (10)$$

The coefficients of equations (8) and (10) are calculated using the specifications of the vehicle, the vehicle velocity $u_0$, and the front and rear wheel loads $m_f$ and $m_r$ from the vehicle state detection sensor. The calculated coefficients, the driver's steering angle $\delta_f$ and the front and rear wheel steering angles $u_f$ and $u_r$ are used to solve equations (8) and (10), thereby estimating an estimated yaw rate $\dot{\psi}_m$ and an estimated lateral acceleration $\ddot{y}_m$. In this case, friction $\mu$ is given as a value for a smooth road (e.g. 0.8 to 1.0).

Figure 18:
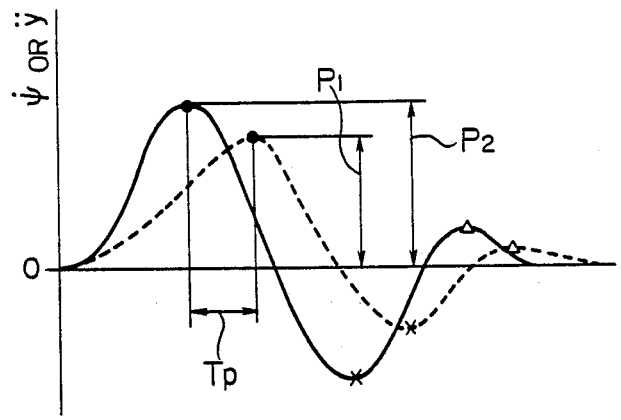
FIG. 18 is a graph for explaining the principle of estimating $\mu$ according to the present invention.

By using the estimated value $\dot{\psi}_m$ of the yaw rate and the estimated value $\ddot{y}_m$ of the lateral acceleration are used to estimate the friction $\mu$ between the vehicle wheels and the road surface in the following manner with reference to FIG. 18.

The controllability of the yaw rate and the lateral acceleration is changed according to different friction values $\mu$ even if identical steering operations are performed. For example, if the friction value $\mu$ is small, the yaw rate and the lateral acceleration are decreased as compared with the case wherein the friction value $\mu$ is large. In addition, the leading edge of the characteristic curves of the yaw rate and the lateral acceleration are moderate. By using this nature, the friction value $\mu$ is estimated. Peak values of the estimated values $\dot{\psi}_m$ and $\ddot{y}_m$ of the ideal yaw rate and the ideal lateral acceleration which are obtained on the smooth road (or an equivalent) and peak values of the detected yaw rate $\dot{\psi}$ and the lateral acceleration $\ddot{y}$ are calculated. The magnitudes of the peak values and/or the phase difference between these peaks is compared to estimate the friction.

In the above estimation method, the friction $\mu$ is actually estimated by the front wheel steering system ($u_r=0$) as follows:

(i) Ratios of magnitudes of the peak values of the frequencies of the friction values $\mu$, the vehicle velocitys, the vehicle travel state variables with the vehicle travel, and steering control signals, and/or phase differences between the peak values are stored as a map. Data associated with these peak values are compared with each other, and the comparison results are subtracted from the data in the map, thereby estimating the friction $\mu$.

(ii) The steady values of the $\dot{\psi}$ and the $\ddot{y}$ are represented as follows:

$$\dot{\psi} = \{d_0(\delta_f + u_f) + C_0 \cdot u_r\}/(a_{22} \cdot a_{44} - a_{24} \cdot a_{42} - a_{43}) \quad (11)$$
$$= s_1/(s_2 - s_3/\mu)$$

$$\ddot{y} = \{h_0(\delta_f + u_f) + k_0 \cdot u_r\}/(a_{22} \cdot a_{44} - a_{24} \cdot a_{42} - a_{43}) \quad (12)$$
$$= s_4/(s_2 - s_3/\mu)$$

for $$\begin{aligned}
s_1 &= \bar{d}_0(\delta_f + u_f) + \bar{C}_0 \cdot u_r \\
s_2 &= \bar{a}_{22} \cdot \bar{a}_{44} - \bar{a}_{24} \cdot \bar{a}_{42} \\
s_3 &= \bar{a}_{43} \\
s_4 &= \bar{h}_0(\delta_f + u_f) + \bar{k}_0 \cdot u_r \\
\bar{d}_0 &= \mu^2(\bar{b}_{f1} \cdot \bar{a}_{42} - \bar{b}_{f2} \cdot \bar{a}_{22}) \\
\bar{C}_0 &= \mu^2(\bar{b}_{r1} \cdot \bar{a}_{42} - \bar{b}_{r2} \cdot \bar{a}_{22}) \\
\bar{h}_0 &= \mu^2(\bar{b}_{f2} \cdot \bar{a}_{23} - \bar{b}_{f1} \cdot \bar{a}_{43}) \\
\bar{k}_0 &= \mu^2(\bar{b}_{r2} \cdot \bar{a}_{23} - \bar{b}_{r1} \cdot \bar{a}_{43}) \\
a_{ij} &= \mu\bar{a}_{ij}(i,j = 1, 2, \ldots 4) \\
b_{ij} &= \mu\bar{b}_{ij}(i = f, r \text{ and } j = 1, 2, \ldots 4)
\end{aligned} \quad (13)$$

The steady values of the estimated values are given in the same manner as in equations (11) and (12) as follows:

$$\dot{\psi}_m = s_1/(s_2 - s_3\mu_m) \quad (14)$$

$$\ddot{y}_m = s_4/(s_2 - s_3/\mu_m) \quad (15)$$

where $\mu_m$ is the friction value $\mu$ between the vehicle wheels and the road surface on the smooth road (e.g., 0.8 to 1.0).

In this case, a ratio of $\dot{\psi}$ to $\dot{\psi}_m$ and a ratio of $\ddot{y}$ to $\ddot{y}_m$ are calculated by equations (11), (12), (14), and (15), and the friction value can be reduced into equation (16) or (17) below:

$$\mu = (\dot{\psi}/\dot{\psi}_m) \cdot S_3/[(\dot{\psi}/\dot{\psi}_m) \cdot S_2 - S_2 + (1/\mu_*) \cdot S_3] \quad (16)$$

$$\mu = (\ddot{y}/\ddot{y}_m) \cdot S_6/[(\dot{\psi}/\dot{\psi}_m) \cdot S_5 - S_5 + (1/\mu_m) \cdot S_6] \quad (17)$$

First Embodiment

An apparatus for controlling steering of wheels of a vehicle according to a first embodiment which belongs to the fifth, seventh, and ninth modes of the present invention will be described with reference to FIGS. 19 to 21.

The apparatus for controlling steering of wheels of a vehicle of this embodiment is applied to an apparatus for front wheels and basically belongs to the fifth mode shown in FIG. 8. The apparatus comprises a steering sensor I, a vehicle behavior sensor II, a control means III, a driving means IV, an actuator means V, a front wheel steering mechanism $V_{10}$, and a vehicle velocity sensor VI.

Figure 19:
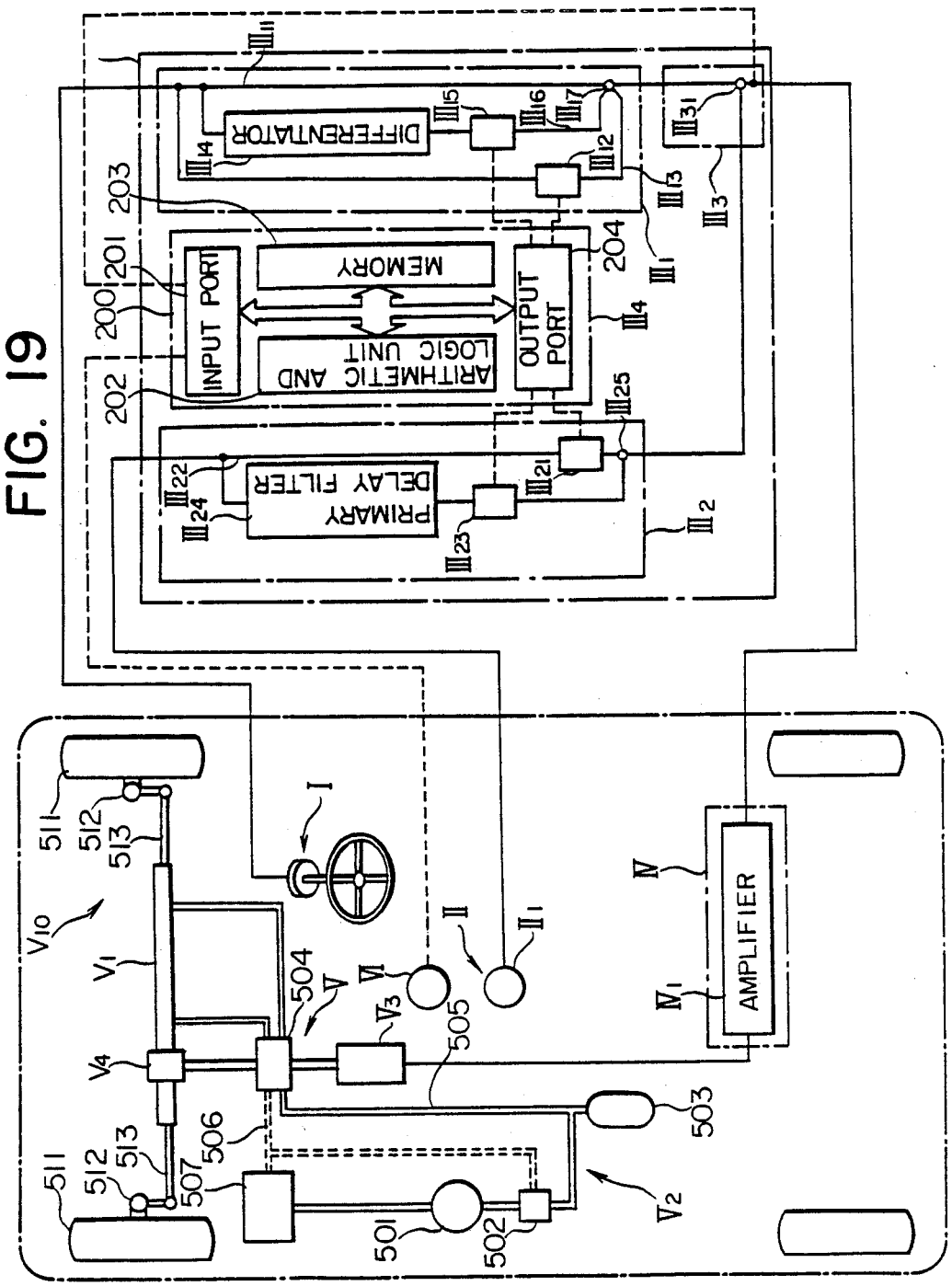
Figure 20:
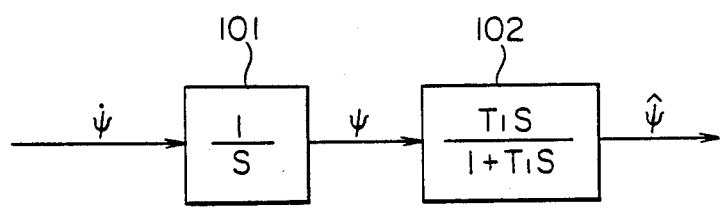
Figure 20:
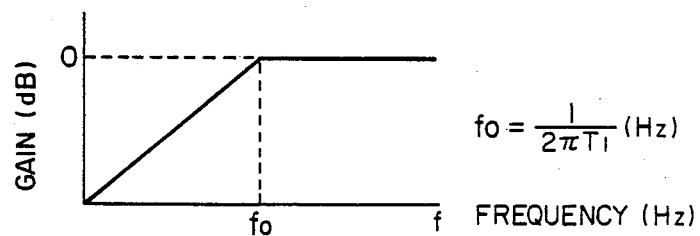
Figure 20:
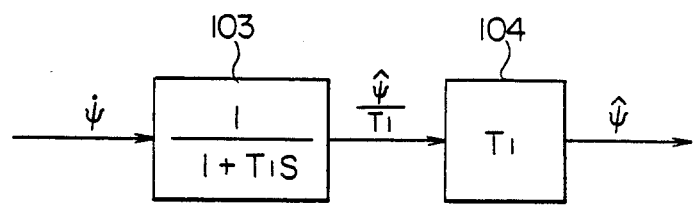

The steering sensor I is coaxial with a steering wheel to measure a steering angle of the steering wheel, as shown in FIG. 19.

The vehicle behavior sensor II is mounted at the center of gravity of the vehicle body and comprises a yaw rate sensor $II_1$ for detecting the yaw rate $\dot{\psi}$ and outputting a signal representing the yaw rate $\dot{\psi}$.

The control means III comprises a feed forward signal operating means $III_1$, a feedback signal operating means $III_2$, a control signal operating means $III_3$, and a gain changing means $III_4$.

The feed forward signal operating means $III_1$ comprises: a steering angle signal circuit $III_{11}$ for transmitting, without modifications, an electrical signal corresponding to a steering angle 6 and output from the steering sensor I; a steering angle signal operation circuit $III_{13}$ provided with a first coefficient circuit $III_{12}$ for multiplying with $G_1$ the signal corresponding to the steering angle $\delta$ and output from the steering sensor I; a steering angular velocity signal operation circuit $III_{16}$ provided with a differentiator $III_{14}$ for calculating a signal corresponding to a steering angular velocity $\dot{\delta}$ on the basis of the signal corresponding to the steering angle $\delta$ and output from the steering sensor I and a second coefficient circuit $III_{15}$ for multiplying with $G_2$ the signal corresponding to the steering angular velocity $\dot{\delta}$ and output from the differentiator $III_{14}$; and an adder $III_{17}$ for adding the signals output from the first and second coefficient circuits $III_{12}$ and $III_{15}$ and the signal output from the steering angle signal circuit $III_{11}$.

The feedback signal operating means $III_2$ comprises a vehicle behavior state variable signal circuit $III_{22}$ provided with two coefficient circuits $III_{21}$ and $III_{23}$, a primary delay filter $III_{24}$, and an adder $III_{25}$ for adding the signals output from the coefficient circuits $III_{21}$ $III_{23}$. The primary delay filter $III_{24}$ outputs a signal representing a pseudo yaw angle $\psi$ corresponding to the yaw angle $\psi$ on the basis of the signal representing the yaw rate $\dot{\psi}$.

As shown in FIG. 20(a), in order to derive the yaw angle $\psi$ from the yaw rate $\dot{\psi}$, the yaw angle signal is integrated by an integrator 101. However, a steady deviation may occur in the yaw angle $\psi$ due to the influence of slight noise in the yaw rate sensor $II_1$. A high-pass filter 102 having an effect shown in FIG. 20(b) is connected to the output of the integrator 101 to eliminate the above-mentioned steady deviation. The arrangement in the block diagram of FIG. 20(a) can be equivalently replaced with a primary delay filter 103 and a coefficient circuit 104 as shown in FIG. 20(c). The integrator 101 and the high-pass filter 102 are replaced with the primary delay filter 103 and the coefficient circuit 104 to obtain the same effect as described above.

The control signal operating means $III_3$ comprises an adder/subtracter $III_{31}$ for calculating a difference or a sum of the feed forward control signal output from the feed forward signal operating means $III_1$ and the feedback signal output from the feedback signal operating means $III_2$.

The gain changing means $III_4$ comprises a microcomputer 200. The microcomputer 200 comprises an input port 201 for receiving a signal corresponding to the steering angle $\delta$, a signal corresponding to the steering angular velocity $\dot{\delta}$, and a signal corresponding to the vehicle velocity $u_0$; an arithmetic and logic unit 202 for calculating an optimal gain; a memory 203 for storing optical gains and algorithms for the arithmetic and logic unit 202; and an output port 204 for outputting an optimal gain selected by the arithmetic and logic unit 202.

The functions of the microcomputer 200 will be described in detail with reference to a flow chart in FIG. 21.

When the driver turns on the ignition key, initialization is performed in program P1. In this initialization routine, the operating states of all sensors are detected to check their abnormalities and set the initial values therein.

When the initialization routine in program P1 is completed, a value of the vehicle velocity $u_0$ is read from the vehicle velocity sensor VI to the microcomputer 200 (P2).

The microcomputer 200 calculates a coefficient $W_1$ from the vehicle velocity value (P3). If the vehicle velocity is low (e.g., $u_0 < 40$ km/h), the coefficient $W_1$ is given as $W_1 = 1$. However, if the vehicle velocity is high (e.g., $u_0 > 120$ km/h), the coefficient $W_1$ is set to be $W_1 = 0$. The intermediate values of the coefficient $W_1$ are successively calculated by using a proper function.

The steering angle $\delta$ is read from the steering sensor I to the microcomputer 200 (P4). The microcomputer 200 calculates a coefficient $W_2$ (P5). If the steering angle is small (e.g., $|\delta| < \delta_1 = 15°$), the coefficient $W_2$ is set to be $W_2 = 0$. However, if the steering angle is large ($|\delta| > \delta_2 = 30°$), the coefficient $W_2$ is set to be $W_2 = 1$. The intermediate values of the coefficient $W_2$ are successively calculated by a proper function. The coefficient $W_2$ may be changed in accordance with changes in vehicle velocity $u_0$. In this case, if the vehicle velocity is low, threshold values $\delta_1$ and $\delta_2$ of the coefficient $W_2$ are set to be large. However, when the vehicle velocity is high, the threshold values $\delta_1$ and $\delta_2$ are set to be small.

The microcomputer 200 then fetches the steering angular velocity $\dot{\delta}$ output from the differentiator III$_{14}$ in the feed forward control means III$_1$ (P6) and calculates a coefficient $W_3$ (P7). The coefficient $W_3$ is determined by the steering angle $\delta$ and the steering angular velocity $\dot{\delta}$ in such a manner that $W_3 = W_{31} \times W_{32}$. $W_{31}$ is determined by the steering angle $\delta$. If the steering angle $\delta$ is small ($|\delta| < \delta_3 = 7.5°$), then $W_{31} = 0$ is established. However, if the steering angle is relatively large ($|\delta| > \delta_4 = 25°$), then $W_{31} = 1$ is established. The intermediate values of the $W_{31}$ are successively calculated by a proper function. Similarly, the coefficient $W_{32}$ is determined by the steering angular velocity $\dot{\delta}$. If the steering angular velocity $\dot{\delta}$ is small ($|\dot{\delta}| < \dot{\delta}_1 = 15°$/sec), then $W_{32} = 0$ is established. However, if the angular velocity $\dot{\delta}$ is large ($|\dot{\delta}| > \dot{\delta}_2 = 30°$/sec) then $W_{32} 1$ is established. The coefficients $W_{31}$ and $W_{32}$ may be changed in accordance with the changes in vehicle velocity in the same manner as in the coefficient $W_2$.

The signals from the above sensors are received and the coefficients $W_1$, $W_2$, and $W_3$ are calculated as described above. Coefficients $M_1$ and $M_2$ are then calculated (P8 and P9). The coefficient $M_1$ is calculated by $M_2 = W_1 \times W_2$; and the coefficient $M_2$ is calculated by $M_2 = W_1 \times W_3$.

A truth value M is calculated using the coefficients $M_1$ and $M_2$ (P10). In this case, a larger one of the coefficients $M_1$ and $M_2$ is used.

Optimal gains $G_1$, $G_2$, $G_3$, and $G_4$ obtained on the basis of the truth value M are output to the coefficient circuits III$_{12}$, III$_{13}$, III$_{21}$, and III$_{22}$ (P11), respectively. The optical gains are calculated as follows:

$$G_i = (1-M) \times G_{i0} + M \times G_{i1}$$

wherein $G_{i0}$ and $G_{i1}$ are optimal gains for $M = 0$ and $M = 1$ where i represents 1, 2, 3, or 4.

After program P11 is executed, the flow returns to program P2, and the above operations are repeated.

The memory 203 stores optimal gains $G_{10}$, $G_{20}$, $G_{30}$, and $G_{40}$ obtained for $M = 0$, optimal gains $G_{11}$, $G_{21}$, $G_{31}$, and $G_{41}$ obtained for $M = 1$, and programs P1 to P11 in addition to the values $\delta_1$, $\delta_2$, $\delta_3$, $\delta_4$, $\dot{\delta}_1$, and $\dot{\delta}_2$.

The driving means IV comprises an amplifier IV$_1$ for receiving the steering control signal output from the control means III, i.e., the signal corresponding to the front wheel steering angle, and converting the steering control signal into an actuator drive signal.

The actuator means V serves to converts the actuator drive signal from the driving means IV into a front wheel steering angle and comprises a hydraulic piston V$_1$, an oil-assisted mechanism V$_2$, a stepping motor V$_3$, and a gear box V$_4$.

The front wheel steering mechanism V$_{10}$ comprises front wheels 511, steering linkages 512, and rods 513.

The oil-assisted mechanism V$_2$ comprises: a hydraulic pump 501; a relief valve 502 for maintaining an oil pressure at a predetermined pressure; an accumulator 503 for suppressing variations in oil pressure in the hydraulic pump 501; a servo valve 504 for determining a direction for supplying an oil to the hydraulic piston V$_1$; an oil supply path 505 for supplying the oil pressure to the hydraulic piston V$_1$; an oil return path 506 for returning the oil discharged from the hydraulic piston V$_1$ and the oil leaking from the releaf valve 502; and an oil tank 507 for storing the oil used in the oil-assisted mechanism.

The front wheels 511 are rotatably supported on the vehicle body through the steering linkages 512, respectively. The steering linkages 512 are coupled through the rods 513 and the hydraulic piston V$_1$. The stepping motor V$_3$ is controlled by a signal corresponding to the front wheel steering angle from the driving means IV. The stepping motor V$_3$ drives the servo valve 504 and also drives the rods 513 through the gear box V$_4$ in the right-and-left direction. By these mechanisms, the stepping motor V$_3$ drives the rods 513 in the right-and-left direction in response to the signal from the driving means IV. At the same time, the stepping motor V$_3$ drives the servo valve 504 to cause it to supply the compressed oil from the oil supply path 505 to one chamber of the hydraulic piston V$_1$. At the same time, the stepping motor V$_3$ causes the other chamber to communicate with the oil tank 507 through the oil return path 506. Therefore, the hydraulic piston V$_1$ is driven to assist the force acting on the stepping motor V$_3$, and the front wheels 511 can be steered in the right or left direction.

The vehicle velocity sensor VI is mounted on an output shaft of a vehicle transmission. The sensor VI detects the vehicle velocity $u_0$ and outputs a signal representing the vehicle velocity $u_0$.

The functions of the first embodiment having the above arrangement will be described below.

The outputs from the steering sensor I for measuring the steering angle of the steering wheel and the vehicle behavior sensor II provided with the yaw rate sensor II$_1$ for outputting the yaw rate $\dot{\psi}$ are input to the feed forward signal operating means III$_1$ and the feedback signal operating means III$_2$ in the control means III.

The feed forward signal operating means III$_1$ classifies the input signals into the signal corresponding to the steering angle $\delta$ and the signal corresponding to the steering angular velocity $\dot{\delta}$ through the differentiator III$_{14}$. These signals are input to the input port 201 in the gain changing means III$_4$ together with the vehicle velocity $u_0$ from the vehicle velocity sensor VI mounted on the transmission.

The feedback signal operating means $III_2$ classifies the input signals into the signal corresponding to the yaw rate $\dot\psi$ and the signal representing the pseudo yaw angle $\hat\psi$ through the primary delay filter $III_{24}$.

The input port 201 in the gain changing means $III_4$ determines the vehicle state on the basis of the inputs. More specifically, the degree of the vehicle velocity $u_0$, the degree of the steering angle $\delta$, and the degree of the steering angular velocity $\dot\delta$ are replaced with the coefficients $W_1$, $W_2$ and $W_3$ which are continuously changed between 0 and 1 so as to correspond to the human evaluation values in accordance with the following logical sequences:

(I) If the vehicle velocity $u_0$ is high, stability is improved.

(II) If the vehicle velocity $u_0$ is not high, the following conditions are applied.

(III) If the absolute value $|\delta|$ of the steering angle is large, the controllability is shortened.

(IV) If the absolute value $|\delta|$ of the steering angle is small, stability is improved.

(V) If the absolute value $|\delta|$ of the steering angle is relatively large and the absolute value $|\dot\delta|$ of the steering angular velocity is also large, the controllability is shortened.

(VI) If the absolute value $|\delta|$ of the steering angle is relatively large and the absolute value $|\dot\delta|$ of the steering angular velocity is small, stability is improved.

The "improvement of stability" here indicates that the vehicle can maintain the proper route even if a disturbance such as a side wind acts on the vehicle. The "shortening of the controllability" here indicates that the vehicle quickly responds to the driver's operation so as to, e.g., immediately change the lane when the driver wants to avoid an obstacle.

The logical sequences (I) to (VI) are performed by calculations $M_1 = W_1 \times W_2$ and $M_2 = W_1 \times W_3$. A contribution index, i.e., the truth value M is determined by using the maximum values of the coefficients $M_1$ and $M_2$. Optimal gain values are then determined in accordance with the truth value M.

The optimal gains $G_{10}$, $G_{20}$, $G_{30}$, and $G_{40}$ for truth value M=0 and the optimal gains $G_{11}$, $G_{21}$, $G_{31}$, and $G_{41}$ for truth value M=1 are prestored in the memory 203. The values of the optimal gains calculated by the arithmetic and logic unit 202 are output at the output port 204.

The optimal gain outputs $G_i$ (i=1 to 4) from the output port 204 in the gain changing means $III_4$ are input to the first coefficient circuit $III_{12}$ and the second coefficient circuit $III_{15}$ in the feed forward signal operating means $III_1$ and the two coefficient circuits $III_{21}$ and $III_{23}$ in the feedback signal operating means $III_2$. Therefore, optimal gains can be provided to the signals $\delta$, $\dot\delta$, $\dot\psi$, and $\hat\omega$.

The adder $III_{17}$ in the feed forward signal operating means $III_1$ adds the steering angle signal $\delta$, a signal $G_1 \cdot \delta$ obtained by multiplying the steering angle signal with the optimal gain $G_1$, and a signal $G_2 \cdot \dot\delta$ obtained by the differential value signal $\dot\delta$ of the steering angle with the optimal gain $G_2$ to output a feed forward signal $\delta + G_1 \cdot \delta + G_2 \cdot \dot\delta$ to the control signal operating means $III_3$.

The adder $III_{25}$ in the feedback signal operating means $III_2$ adds a signal $G_3 \cdot \dot\psi$ obtained by multiplying the yaw rate signal $\dot\psi$ with the optimal gain $G_3$, and a signal $G_4 \cdot \hat\psi$ obtained by multiplying the pseudo yaw angle signal $\hat\psi$ with the optimal gain $G_4$ to output a feedback signal $G_3 \cdot \dot\psi + G_4 \cdot \hat\psi$ to control signal operating means $III_3$.

The driving means IV drives the following operation control signal u to drive the actuator means V:

$$u = \psi + G_1 \cdot \delta + G_2 \cdot \dot\delta + G_3 \cdot \dot\psi + G_4 \cdot \hat\psi$$

Therefore, the front wheel steering mechanism $V_{10}$ is driven to perform predetermined steering control.

With the above operations, the front wheels 511 are steered by a constant multiple (i.e., a gear ratio of the gear box $V_4$) of the steering control signal obtained by adding the feed forward signal derived from the steering wheel steering angle $\delta$ and the steering velocity $\dot\psi$ to the feedback signal derived from the vehicle yaw rate $\dot\psi$.

The vehicle mounted with the apparatus for controlling steering of wheels of the vehicle immediately responds to steering of the steering wheel when the driver quickly turns the steering wheel or turns it with a large steering angle at a relatively low vehicle velocity since the values of the gains $G_1$, $G_2$, $G_3$, and $G_4$ output to the coefficient circuits $III_{12}$, $III_{15}$, $III_{21}$, and $III_{23}$ in the control means III are adjusted to those corresponding to M ÷ 1. When the vehicle velocity is relatively high and an external force caused by a side wind, a rut, a bump, or the like acts on the vehicle, the driver does not instantaneously turn the steering wheel. In this state, since the gains $G_1$, $G_2$, $G_3$, and $G_4$ are controlled by the gain changing means III such that the truth value M is almost zero, vehicle stability can be improved and the front wheels are driven to automatically cancel disturbance.

When the response time is shortened at a relatively high velocity during quick turning of the steering wheel, the driver cannot often control the vehicle. In order to prevent this, the values of the gains $G_1$, $G_2$, $G_3$, and $G_4$ are controlled such that the truth value M is almost zero. Therefore, the vehicle can change direction safely.

In the vehicle mounted with the apparatus of this embodiment, optimal dynamic characteristics of the vehicle are provided for the behavior of the vehicle and steering of the steering wheel by the driver.

Second Embodiment

An apparatus for controlling steering of wheels of a vehicle according to a second embodiment which belongs to the sixth and seventh modes of the present invention will be described with reference to FIGS. 22 and 23.

This apparatus is applied to the one for the front wheels and basically belongs to the sixth mode shown in FIG. 9. The apparatus comprises a steering sensor I, a vehicle behavior sensor II, a control means III, a driving means IV, an actuator means V, a vehicle velocity sensor VI, and a raindrop sensor VII.

Figure 22:
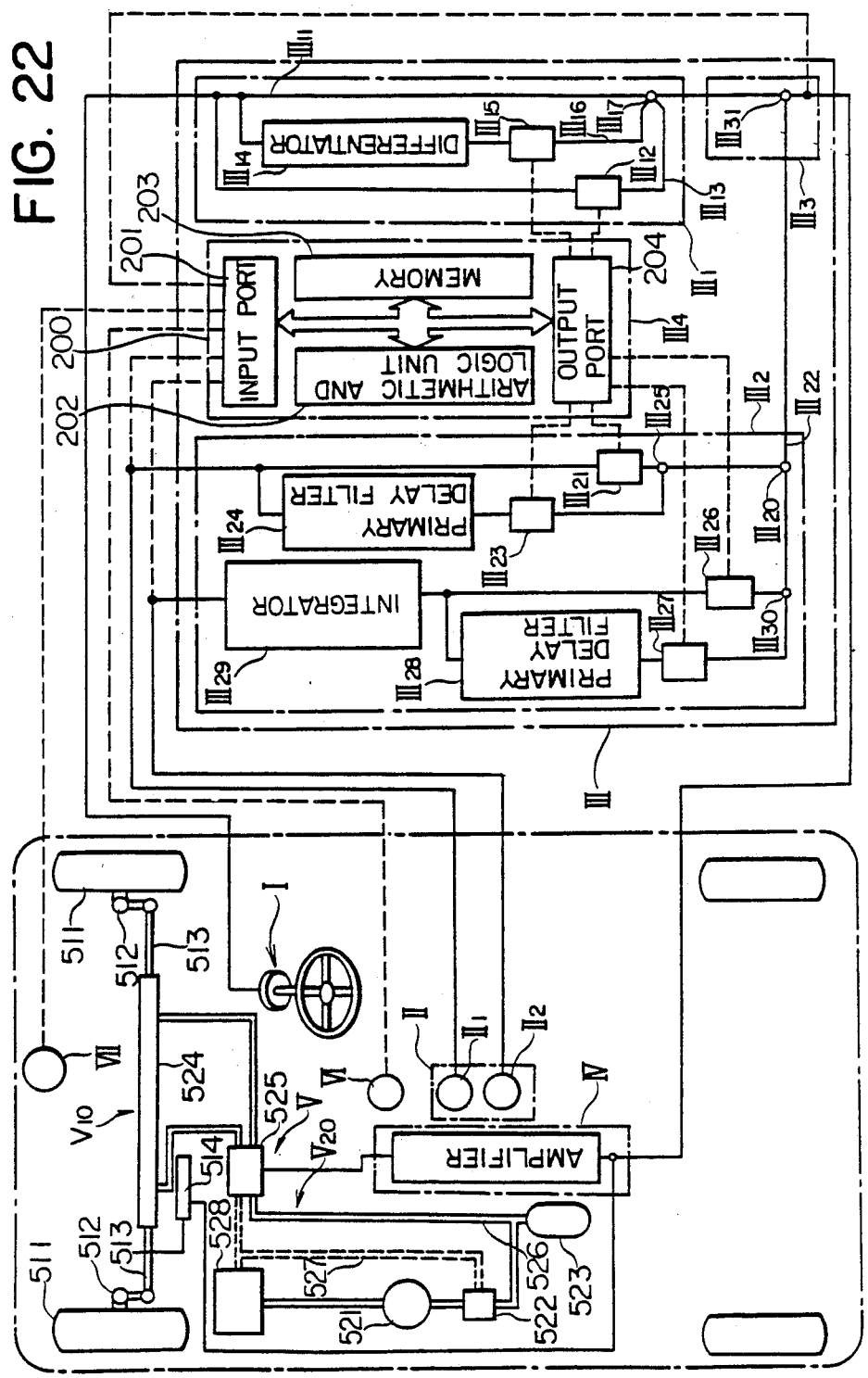
Figure 23:
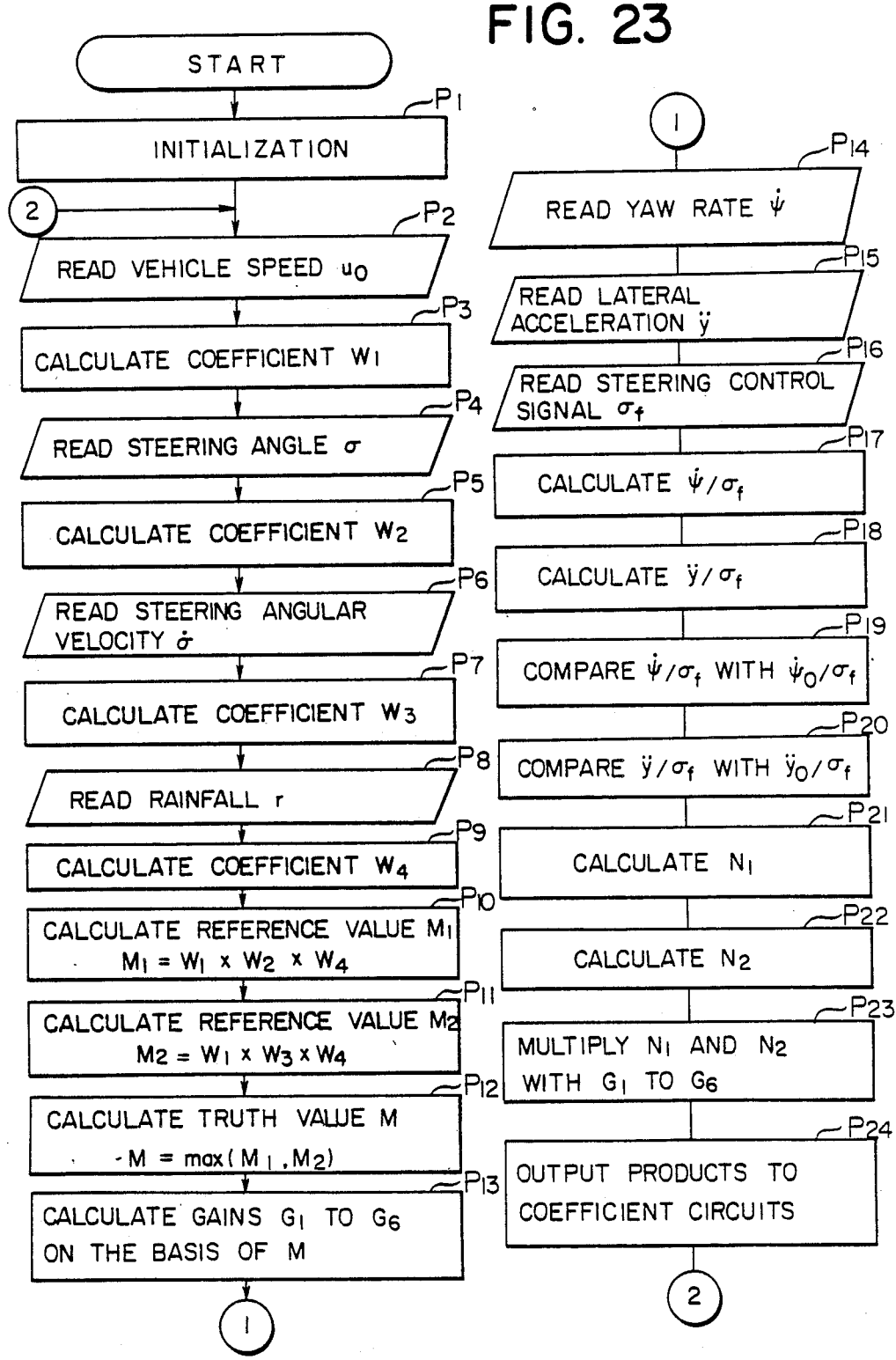

The vehicle behavior sensor II comprises a yaw rate sensor $II_1$ for detecting an angular velocity around the center of the gravity of the vehicle and a lateral acceleration sensor $II_2$ for measuring a lateral acceleration of the vehicle, as shown in FIG. 22.

The control means $II_1$ comprises a feed forward signal operating means $III_1$, a feedback signal operating means $III_2$, a control signal operating means $III_3$, and a gain changing means $III_4$.

The feed forward signal operating means $III_1$ comprises: a steering angle signal circuit $III_{11}$ for transmitting an electrical signal corresponding to a steering angle $\psi$ and output from the steering sensor I; a steering angle signal operation circuit $III_{13}$ provided with a first coefficient circuit $III_{12}$ for multiplying with $G_1$ a signal corresponding to the steering angle $\psi$ and output from the steering sensor I; a steering angular velocity signal operation circuit $III_{16}$ provided with a differentiator $III_{11}$ for calculating a signal corresponding to a steering angular velocity $\delta$ on the basis of the signal corresponding to the steering angle $\delta$ and output from the steering sensor I and a second coefficient circuit $III_{15}$ for multiplying with $G_2$ a signal corresponding to the steering angular velocity $\delta$ and output from the differentiator $III_{11}$; and an adder $III_{17}$ for adding the signals output from the first and second coefficient circuits $III_{12}$ and $III_{15}$ and the signal output from the steering angle signal circuit $III_{11}$.

The feedback signal operating means $III_2$ comprises four coefficient circuits $III_{21}$, $III_{23}$, $III_{26}$, and $III_{27}$, primary delay filters $III_{24}$ and $III_{28}$, an integrator $III_{29}$, and a vehicle behavior state variable signal circuit $III_{22}$ provided with three adders $III_{20}$, $III_{25}$, and $III_{30}$.

The primary delay filter $III_{24}$ outputs a signal representing a pseudo yaw angle $\hat{\psi}$ corresponding to a yaw angle $\psi$ on the basis of the signal representing the yaw rate $\dot{\psi}$. The primary delay filter $III_{28}$ outputs a signal representing a pseudo lateral displacement $\hat{y}$ corresponding to the lateral displacement $y$ on the basis of the signal corresponding to the lateral velocity $\dot{y}$ calculated by the integrator $III_{29}$. The functions and effects of these primary delay filters $III_{24}$ and $III_{28}$ are the same as those in the first embodiment.

The coefficient circuits $III_{21}$, $III_{23}$, $III_{26}$ and $III_{27}$ multiply the corresponding signals with the yaw rate feedback gain $G_3$, the yaw angle feedback gain $G_4$, the lateral velocity feedback gain $G_5$, and the lateral displacement feedback gain $G_6$, respectively. The adders $III_{20}$, $III_{25}$ and $III_{30}$ are used to add signals output from the four coefficient circuits $III_{21}$, $III_{23}$, $III_{26}$ and $III_{27}$.

The control signal operating means $III_3$ comprises an adder/subtracter $III_{31}$ for calculating a difference or a sum of the signal output from the feed forward signal operating means $III_1$ and the signal output from the feedback signal operating means $III_2$.

The gin changing means $III_4$ comprises a microcomputer 200. The microcomputer 200 comprises: an input port 201 for receiving the signal corresponding to the steering angle $\delta$, the signal corresponding to the steering angular velocity $\dot{\psi}$, the signal corresponding to the vehicle velocity $u_0$, the signal corresponding to the yaw rate $\dot{\psi}$, the signal corresponding to the lateral acceleration $\ddot{y}$, and the signal corresponding to the rainfall r; an arithmetic and logic unit 202 for discriminating the state of the vehicle on the basis of the inputs and calculating optimal gains; a memory 203 for storing the optimal gains and an algorithm for the arithmetic and logic unit 202; and an output port 204 for outputting the optimal gains selected by the arithmetic and logic unit 202.

Figure 21:
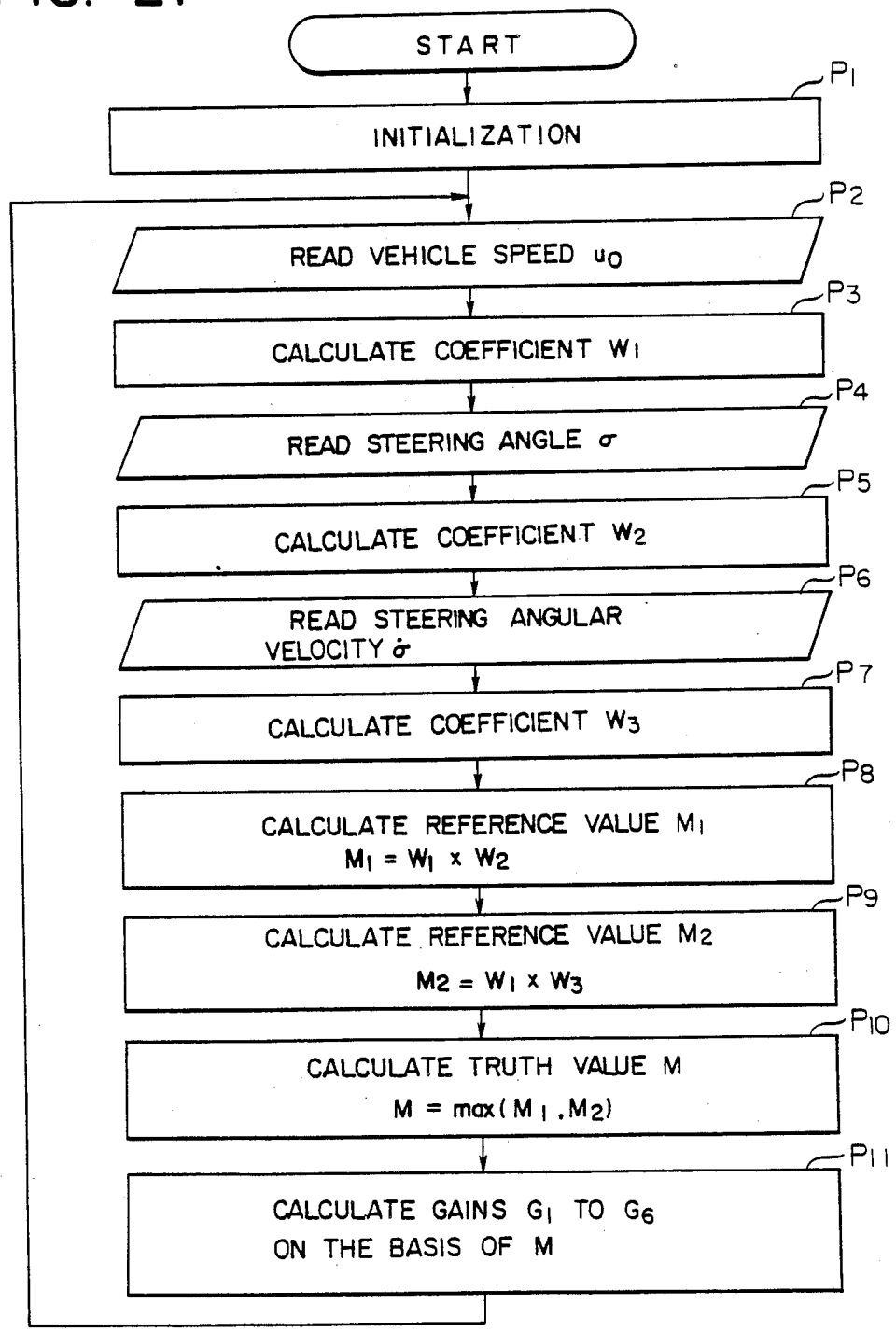

The functions of the microcomputer 200 are substantially the same as those shown in the flow chart of FIG. 21. Differences between the first and second embodiments are concentrated and described with reference to FIG. 23.

Programs P1 to P7 are the same as those in the first embodiment.

In program P8, the microcomputer 200 receivers an output from the raindrop sensor VII and calculates a coefficient $W_4$ (P9). The coefficient $W_4$ is determined by the rainfall r. If the rainfall is small ($r < r_1 = 1$ mm/h), then $W_4 = 1$ is established. However, if the rainfall is large ($r > r_2 = 10$ mm/h), then $W_4 = 0$ is established. The intermediate values of the rainfall are successively calculated by a proper function.

The signals of the above sensors are sent to by the microcomputer 200, and the microcomputer 200 calculates the coefficients $M_1$ and $M_2$ (P10 and P11) after calculating the coefficients $W_1$, $W_2$, $W_3$ and $W_4$. The coefficient $M_1$ is calculated by $M_1 = W_1 \times W_2 \times W_4$; and the coefficient $M_2$ is calculated by $M_2 = W_1 \times W_3 \times W_4$.

The truth value M is calculated using the coefficients $M_1$ and $M_2$ (P12). The larger one of the coefficients $M_1$ and $M_2$ is used for the truth value M.

Optimal gains $G_1$, $G_2$, $G_3$, $G_4$, $G_5$ and $G_6$ obtained in good outside environmental situations such as a smooth road surface are calculated using the resultant truth value M (P13). These optimal gains are calculated by the following algorithm:

$$G_i = (1-M) \times G_{i0} + M \times G_{i1}$$

where $G_{i0}$ and $G_{i1}$ (i = 1 to 6) are optimal gains in good outside environmental situations for M = 0 and M = 1, respectively.

The optimal gains $G_i$ (i = 1 to 6) can be obtained by the following control principle.

Two-degree-of-freedom motion equations of a weight m and yaw inertia moments $I_z$ of the yaw and lateral directions are represented as follows (in this case, the vehicle is given as a two-wheel steer vehicle):

$$m \cdot \ddot{y} = 2(F_f + F_r) \tag{18}$$

$$I_z \cdot \ddot{\psi} = 2(a_f F_f - a_r F_r) \tag{19}$$

for $$F_f = -c_f\{(\dot{y} - u_0\psi + a_f\dot{\psi})/u_0 - \psi_f\}$$

$$F_r = -c_r\{(\dot{y} - u_0\psi + a_r\dot{\psi})/u_0\}$$

where $a_f$: the distance between the front axile of the vehicle and its center of gravity $a_r$: the distance between the rear axile of the vehicle and its center of gravity $c_f$: the cornering power of the front wheels of the vehicle $c_r$: the cornering power of the rear wheels of the vehicle $F_f$: the cornering force of the front wheels of the vehicle $F_r$: the cornering force of the rear wheels of the vehicle $u_0$: the vehicle velocity $\psi$: the yaw angle of the vehicle $\dot{\psi}$: the yaw rate of the vehicle $\ddot{\psi}$: the yaw angular acceleration y: the lateral displacement of the vehicle $\dot{y}$: the lateral velocity of the vehicle $\ddot{y}$: the lateral acceleration of the vehicle $67_f$: the front wheel steering angle of the vehicle The steering pattern of the driver can be given as follows:

$$\delta_4 = f(y, \dot{y}, \psi, \dot{\psi}, \delta_f, \dot{\delta}_f) \tag{20}$$

When equations (18) to (20), i.e., the steering patterns of the driver, and auxiliary steering variable u of the time-serial optimal front wheel steering angle signal applied to the front wheel steering system are taken into consideration, the equations of motion are given as follows:

$$m \cdot \ddot{y} = 2(F_f + F_r + u \cdot c_f) \quad (21)$$

$$I_z \cdot \ddot{\psi} = 2(a_f F_f - a_r F_r + u \cdot a_f c_f) \quad (22)$$

$$\dot{\delta}_f = f(y, \dot{y}, \psi, \dot{\psi}, \delta_f, \dot{\delta}_f, u) \quad (23)$$

The auxiliary steering angle is given as:

$$u = \sum_{i=1}^{6} g_i \cdot x_i$$
$$= g(y, \dot{y}, \psi, \dot{\psi}, \delta_f, \dot{\delta}_f)$$

where $g_i$ is a contribution coefficient for giving the optimal auxiliary steering angle u, and $x_i$ represent all possible vehicle travel state variables with the vehicle travel and the vehicle behaviors which express the motion of the vehicle. These variables include the vehicle lateral displacement, the vehicle lateral velocity, the yaw angle, the yaw rate, the steering angle of the steering wheel turned by the driver, and its steering angular velocity.

Output values from the yaw rate sensor $II_1$ and the lateral acceleration sensor $II_2$, i.e., the yaw rate $\dot{\psi}$ the lateral acceleration $\ddot{y}$ are received by the microcomputer 200 (P14 and P15). The microcomputer 200 then receives a steering control signal $\delta_f$(P16). The yaw rate $\dot{\delta}$ and the lateral acceleration $\ddot{y}$ are divided by the steering control signal $\delta_f$(P17 and P18), and the quotients are then compared with the steady vehicle steering gains of the actual steering angle and yaw rat and the measured lateral acceleration (P19 and P20), thus outputting coefficients $N_1$ and $N_2$ (P21 and P22). The coefficients $N_1$ and $N_2$ are inverse numbers obtained by dividing the quotients by the steady vehicle steering gains. If each coefficient $N_1$ or $N_2$ exceeds 1.5, it is set to be 1.5. The coefficients $N_1$ and $N_2$ are multiplied with the gains $G_1$ to $G_6$ and the products are respectively output to the coefficient circuits $III_{12}$, $III_{13}$, $III_{21}$, $III_{22}$, $III_{23}$, and $III_{24}$ (P23 and P24).

After program P24 is executed, the flow returns to program P2, and the above operations are repeated.

Optimal gains $G_{10}$, $G_{20}$, $G_{30}$, $G_{40}$, $G_{50}$ and $G_{60}$ for M=0, optimal gains $G_{11}$, $G_{21}$, $G_{31}$, $G_{41}$, $G_{51}$ and $G_{61}$ for M=1, and programs P1 to P22 are stored in the memory 203 in addition to the signals $\delta_1$, $\delta_2$, $\delta_3$, $\delta_4$, $\dot{\delta}_1$, $\dot{\delta}_2$, $r_1$, $r_2$, the measured steering angle, the yaw rate, and the steady vehicle steering gains of the measured steering angle and the measured lateral acceleration.

The driving means IV comprises a subtractor $IV_1$ for calculating a difference between the steering control signal output from the control means III, i.e., the signal corresponding to the front wheel steering angle, and a signal output from a rod displacement meter 514 included in the actuator means V, and an amplifier $IV_2$ for converting the signal output from the subtracter $IV_1$ into a signal to be supplied to the servo valve 525 include in the actuator means V.

The actuator means V converts the signal from the driving means IV into a front wheel steering angle and comprises a front wheel steering mechanism $V_{10}$ and an electrohydraulic control mechanism $V_{20}$.

The front wheel steering mechanism $V_{10}$ comprises front wheels 511, steering linkages 512, rods 513, and the rod displacement meter 514.

The electrohydraulic control mechanism $V_{20}$ comprises a hydraulic pump 521, a releaf valve 522 for maintaining an oil pressure at a predetermined pressure, an accumulator 523 for suppressing variations in oil pressure in the hydraulic pump 521, a hydraulic piston 524, a servo valve 525 for determining a direction for supplying oil to the hydraulic piston 524, an oil supply path 526 for supplying the oil pressure to the hydraulic piston 524, an oil return path 527 for returning the oil discharged from the hydraulic piston 524 and the oil leaking from the relief valve 522, and an oil tank 528 for storing the oil to be used in the electrohydraulic control mechanism $V_{20}$.

The front wheels 511 are rotatably supported on the vehicle body through steering linkages 512. The steering linkages 512 are coupled through the rods 513 and the hydraulic piston 524. The servo valve 525 is controlled by a difference between the front wheel steering angle signal from the driving means IV and the output from the control means III. In other words, the servo valve 525 is controlled by a signal corresponding to the front wheel steering angle deviation. The compressed oil, which is controlled at a predetermined pressure by the hydraulic pump 521, the relief valve 522, and the accumulator 523 is supplied to one chamber of the hydraulic piston 524 through the oil supply path 526 by the servo valve. The other chamber communicates with the oil tank 528 through the oil return path 527, thereby driving the hydraulic piston 524. Therefore, the front wheels 511 can be steered in the right or left direction through the rods 513 and the steering linkages 512.

The vehicle velocity sensor VI is mounted on the output shaft of the transmission. This sensor VI detects the vehicle velocity $u_0$ and outputs a signal representing the vehicle velocity $u_0$.

The raindrop sensor VII is located in the front portion of the vehicle body. This sensor VII detects raindrops or a humidity and outputs a signal representing whether the road is slippery.

The function and the effect of this embodiment having the above arrangement will be described below.

The steering sensor I and the yaw rate sensor $II_1$ included in the vehicle behavior sensor II are substantially the same as those in the first embodiment. However, the vehicle behavior sensor II also includes a lateral acceleration sensor $II_2$ in addition to the yaw rate sensor $II_1$. The lateral acceleration sensor $II_2$ is used to measure a lateral acceleration of the vehicle.

The input port 201 in the gain changing means $III_4$ receives a signal corresponding to the yaw rate $\dot{\psi}$ and output from the yaw rate sensor $II_1$ in the vehicle behavior sensor II, a signal corresponding to the lateral acceleration y and output from the lateral acceleration sensor $II_2$ in the vehicle behavior sensor II, and a signal corresponding to the rainfall r and output from the raindrop sensor VII, in addition to the signals used in the first embodiment, i.e., the signal corresponding to the steering angle $\delta$, the signal corresponding to the steering angular velocity $\dot{\delta}$, and the signal corresponding to the vehicle velocity $u_0$.

The feedback signal operating means $III_2$ divides the input data into the signal corresponding to the yaw rate $\dot{\psi}$, a signal representing a pseudo yaw angle $\psi$ through the primary delay filter $III_{24}$, a signal representing the lateral velocity $\dot{y}$ through the integrator $III_{29}$ on the basis of the signal corresponding to the lateral acceleration $\ddot{y}$, and a signal representing a pseudo lateral displacement $\hat{y}$ through the primary delay filter $III_{28}$.

The input port 201 of the gain changing means $III_4$ determines the state of the vehicle on the basis of the input signals. The input port 201 replaces the input signals into the coefficients $W_1$, $W_2$, $W_3$, and $W_4$ which continuously change between 0 and 1 so as to correspond to human evaluation values representing the degree of the vehicle velocity $u_0$, the degree of the steering angle $\delta$, the degree of the steering angular velocity $\dot{\delta}$, and the degree of the rainfall r in the following logical sequences:

(I) If the vehicle velocity $u_0$ is high or the rainfall r is large, stability is improved.

(II) If the vehicle velocity $u_0$ is not high and the rainfall r is small, the following rules are applied.

(III) If the absolute value $|\delta|$ of the steering angle is large, the response time is shortened.

(IV) If the absolute value $|\delta|$ of the steering angle is small, stability is improved.

(V) If the absolute value $|\delta|$ of the steering angle is relatively large and the absolute value $|\dot{\delta}|$ of the steering angular velocity is large, the response time is shortened.

(VI) If the absolute value $|\delta|$ of the steering angle is relatively large and the absolute value $|\dot{\delta}|$ of the steering angular velocity is small, stability is improved.

The "improvement of stability" here indicates that the vehicle can maintain the proper route even if disturbance such as a side wind acts on the vehicle. The "shortening of the response time" here indicates that the vehicle quickly responds to the driver's operation so as to, e.g., immediately change the lane when the driver wants to avoid an obstacle.

The logical sequences (I) to (VI) are performed by calculations $M_1 = W_1 \times W_2 \times W_4$ and $M_2 = W_1 \times W_3 \times W_4$. A contribution index, i.e., the truth value M is determined by using the maximum values of the coefficients $M_1$ and $M_2$. Optimal gain values are then determined in accordance with the truth value M.

The optimal gains $G_{10}$, $G_{20}$, $G_{30}$, $G_{40}$, $G_{50}$ and $G_{60}$ for truth value $M=0$ and the optimal gains $G_{11}$, $G_{21}$, $G_{31}$, $G_{41}$, $G_{51}$ and $G_{61}$ for truth value $M=1$ are prestored in the memory 203. The optimal gain values are calculated by the arithmetic and logic unit 202.

The coefficients $N_1$ and $N_2$ are calculated to weight the optimal gain values calculated by the arithmetic and logic unit 202 so as to set the response characteristics of the vehicle for the variables representing constant vehicle behaviors. The coefficients $N_1$ and $N_2$ are multiplied with the calculated optimal gain values to keep the vehicle response time for the steering wheel angle constant.

The calculated optimal gain values as the optical gain outputs $G_i$ (i=1 to 6) from the output port 204 in the gain changing means $III_4$ are input to the first and second coefficient circuits $III_{12}$ and $III_{15}$ in the feed forward signal operating means $III_1$ and the four coefficient circuits $III_{21}$, $III_{23}$, $III_{26}$ and $III_{27}$ in the feedback signal operating means $III_2$. The coefficient circuits provides optimal gains for the signals $\dot{\delta}$, $\delta$, $\dot{\psi}$, $\psi$, $\dot{y}$ and $y$, respectively.

The feed forward signal operating means $III_1$ outputs the feed forward signal $\delta + G_1 \cdot \delta + G_2 \cdot \dot{\delta}$ to the control signal operating means $III_3$ in the same manner as in the first embodiment.

The adder $III_{25}$ in the feedback signal operating means $III_2$ adds a signal $G_3 \cdot \dot{\psi}$ obtained by multiplying the yaw rate signal $\dot{\psi}$ with the optimal gain $G_3$, a signal $G_4 \cdot \psi$ obtained by multiplying the pseudo yaw angle signal $\psi$ with the optimal gain $G_4$, a signal $G_5 \cdot \ddot{y}$ obtained by multiplying the lateral acceleration signal $\ddot{y}$ and the optimal gain $G_5$, and a signal $G_6 \cdot \hat{y}$ obtained by multiplying the pseudo lateral displacement signal $\hat{y}$ with the optimal gain $G_6$ and outputs the feedback signal $G_3 \cdot \dot{\psi} + G_4 \cdot \psi + G_5 \cdot y + G_6 \cdot \hat{y}$ to the control signal operating means $III_3$.

The driving means IV drives the actuator V in accordance with the signal $\delta_f$ from the control signal operating means $III_3$:

$$\delta_f = \delta + G_1 \cdot \delta + G_2 \cdot \dot{\delta} + G_3 \cdot \dot{\psi} + G_4 \cdot \psi + G_5 \cdot \ddot{y} + G_6 \cdot \hat{y}$$

The actuator V drives the front wheel steering mechanism $V_1$ to perform predetermined steering control.

The variables representing the vehicle travel and the vehicle behavior are instantaneously detected to provide optimal front wheel steering control angle $\delta_f$ and the coefficients $g_i$ are determined by contribution degrees. An instantaneous state feedback control system including the factors of the driver can be provided. Therefore, the driver can perform optimal steering wheel angle control.

Since signals input to the control means include the rainfall r from the raindrop sensor VII, the yaw rate $\dot{\psi}$, and the lateral acceleration $\ddot{y}$. When the road is slippery, an auxiliary steering angle may be added to the above value. The response and stability characteristics of the vehicle can be adjusted without imposing a mental load on the driver, and optimal steering angle control can be performed so as to satisfy the weather and road conditions. and optimal steering angle control can be performed so as to satisfy the weather and road conditions.

Modification

The apparatuses for controlling steering of wheels of a vehicle are applied to the apparatuses for controlling steering of front wheels of the vehicle in the first and second embodiments. However, an apparatus for controlling steering of wheels of a vehicle may be applied to an apparatus for controlling steering of rear wheels of a vehicle.

Figure 24:
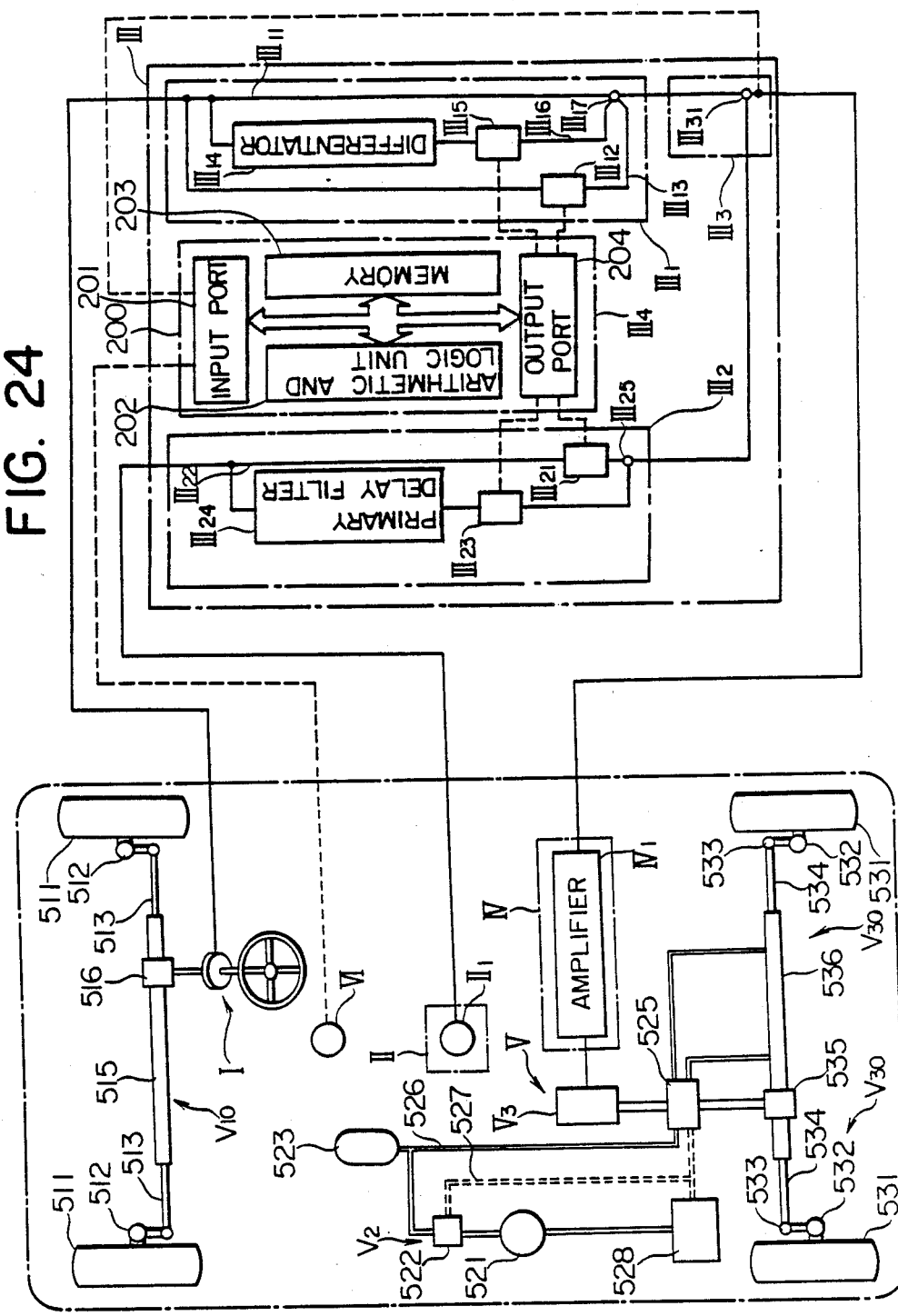
FIG. 24 is a system diagram showing a modification of the first embodiment of the present invention.

The apparatus for controlling steering of wheels of a vehicle according to the first embodiment which belongs to the fifth and seventh modes is applied to an apparatus for controlling steering of rear wheels of a vehicle. This modification will be described with reference to FIG. 24.

Differences between the modification and the first embodiment are concentrated.

A driving means IV comprises an amplifier $IV_1$ for receiving the steering control signal output from the control means III, i.e., a signal corresponding to a rear wheel steering angle, and for converting it into an actuator drive signal.

An actuator means V converts the signal output from the driving means IV into a rear wheel steering angle and comprises a rear wheel steering mechanism $V_{30}$, an oil-assisted mechanism $V_2$, and a stepping motor $V_3$.

The rear wheel steering mechanism $V_{30}$ comprises rear wheels 531, knuckles 532, knuckle arms 533, rods 534, a gear box 535 and a hydraulic piston 536.

The oil-assisted mechanism $V_2$ comprises a hydraulic pump 521, a relief valve 522 for maintaining an oil pressure at a predetermined pressure, an accumulator 523 for suppressing variations in oil pressure in the hydraulic pump 521, a servo valve 525 for determining a direction for supplying oil to the hydraulic piston 536, an oil supply path 526 for supplying the oil under pressure to the hydraulic piston 536, an oil return path 527 for returning the oil discharged from the hydraulic piston 536 and the oil leaking from the relief valve 522, and an oil tank 528 for storing the oil to be used in the oil-assisted mechanism.

The rear wheels 531 are rotatably supported on the vehicle body through knuckles 532 The knuckle arms 533 are coupled through the rods 534 and the hydraulic piston 536. The stepping motor $V_3$ is operated by a signal corresponding to the rear wheel steering angle and output from the driving means IV. The stepping motor $V_3$ drives the servo valve 525 and also drives the rods 534 through the gear box 535 in the right-and-left direction. By these mechanisms, the stepping motor $V_3$ drives the rods 534 in the right or left direction in response to the signal from the driving means IV. The compressed oil from the oil supply path 526 is supplied to one chamber of the hydraulic piston 536 upon operation of the servo valve 525. The other chamber communicates with the oil tank 528 through the oil return path 527. The hydraulic piston 536 is driven to assist the power acting on the stepping motor $V_3$. Therefore, the rear wheels 531 can be steered in the right or left direction.

A front wheel steering mechanism $V_{10}$ comprises front wheels 511, steering linkages 512, rods 513, a rack 515, and a pinion 516. The front wheels 511 are rotatably supported on the vehicle body through the steering linkages 512. The steering linkages 512 are coupled through the rods 513 and the rack 515. When the driver turns the steering wheel, the pinion 516 is rotated. The rotational movement of the pinion 516 is converted into linear movement by the rack 515. The rods 513 can be moved in the right or left direction, thereby steering the front wheels 511 through the steering linkages 512 in the right or left direction.

The vehicle velocity sensor VI is mounted on the output shaft of the transmission. This sensor VI detects the vehicle velocity $u_0$ and outputs a signal representing the vehicle velocity $u_0$.

With the above operations, the rear wheels 511 are steered in accordance with a steering control signal obtained by calculating a difference or a sum of the feed forward signal derived from the steering angle $\delta$ and the steering angular velocity $\dot{\delta}$, and the feedback signal derived from the vehicle yaw rate $\dot{\psi}$.

In the apparatus for controlling steering of the rear wheels of the vehicle, gains $G_{10}$, $G_{20}$, and $G_{30}$ for $M=0$ and gains $G_{11}$, $G_{21}$, and $G_{31}$ for $M=1$, which are stored in the microcomputer 200 in the control means III, are different from those in the first embodiment. However, the same algorithms can be used, and optimal rear wheel steering angles corresponding to various states can be generated.

Similarly, the apparatus of the second embodiment can also be applied to an apparatus for controlling steering of rear wheels of a vehicle.

The apparatus may be used for both the front and rear wheels, although such an application is not described above.

If four-wheel drive control is performed, two sets of gain values for the front and rear wheels must be stored in the microcomputer 200 in the control means III, and the apparatus of the first or second embodiment is combined with that of the modification.

Third Embodiment

An apparatus for controlling steering of wheels of a vehicle according to a third embodiment which belongs to the eleventh mode of the present invention will be described with reference to FIGS. 25 and 26.

An apparatus for controlling steering of wheels of a vehicle according to this embodiment is applied to an apparatus for controlling steering of front wheels of the vehicle. This apparatus basically belongs to the eleventh mode shown in FIG. 14 and comprises a steering sensor I, a vehicle behavior sensor II, a control means III, a driving means IV, an actuator means V, and a vehicle state detection sensor VI.

Figure 25:
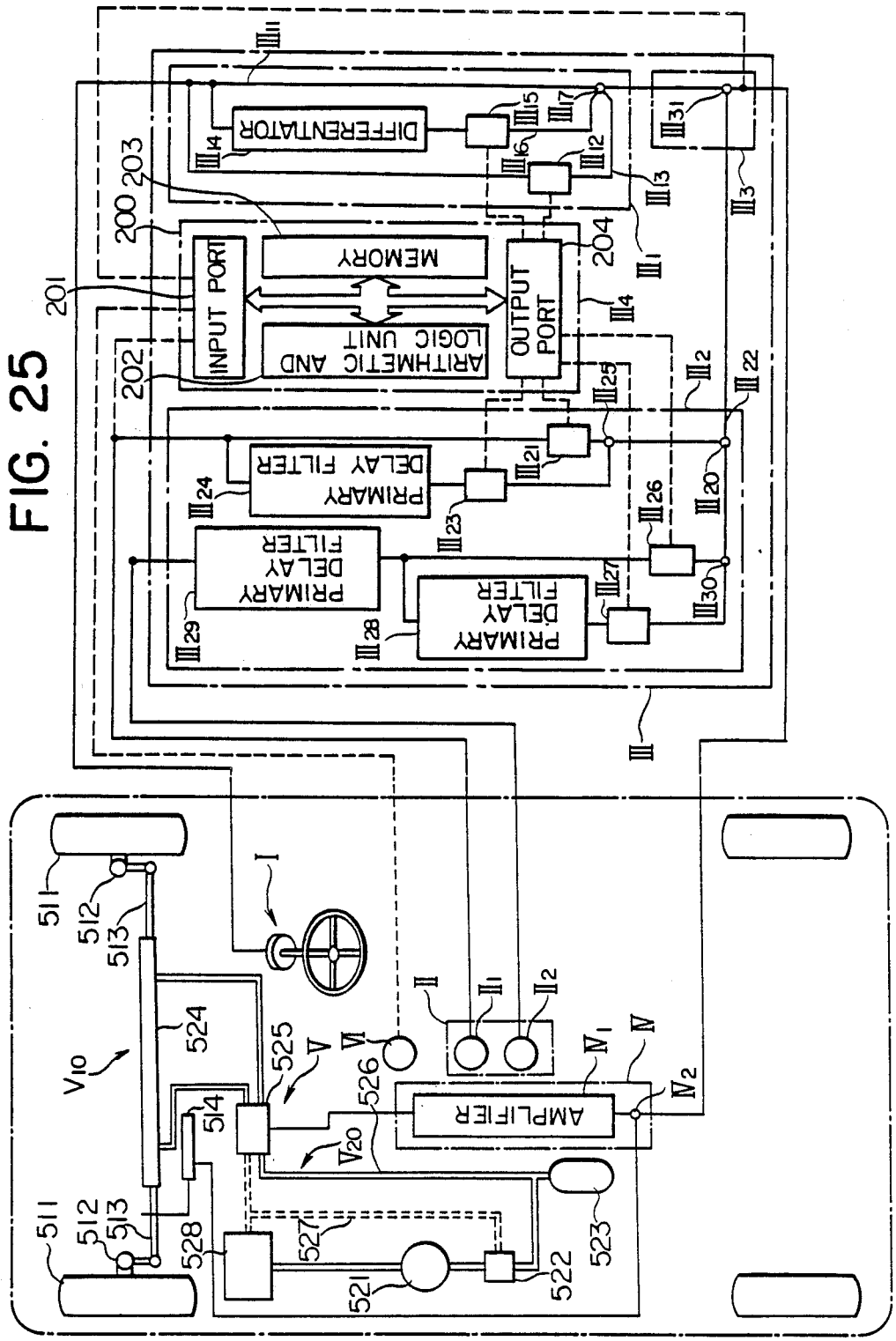
Figure 26:
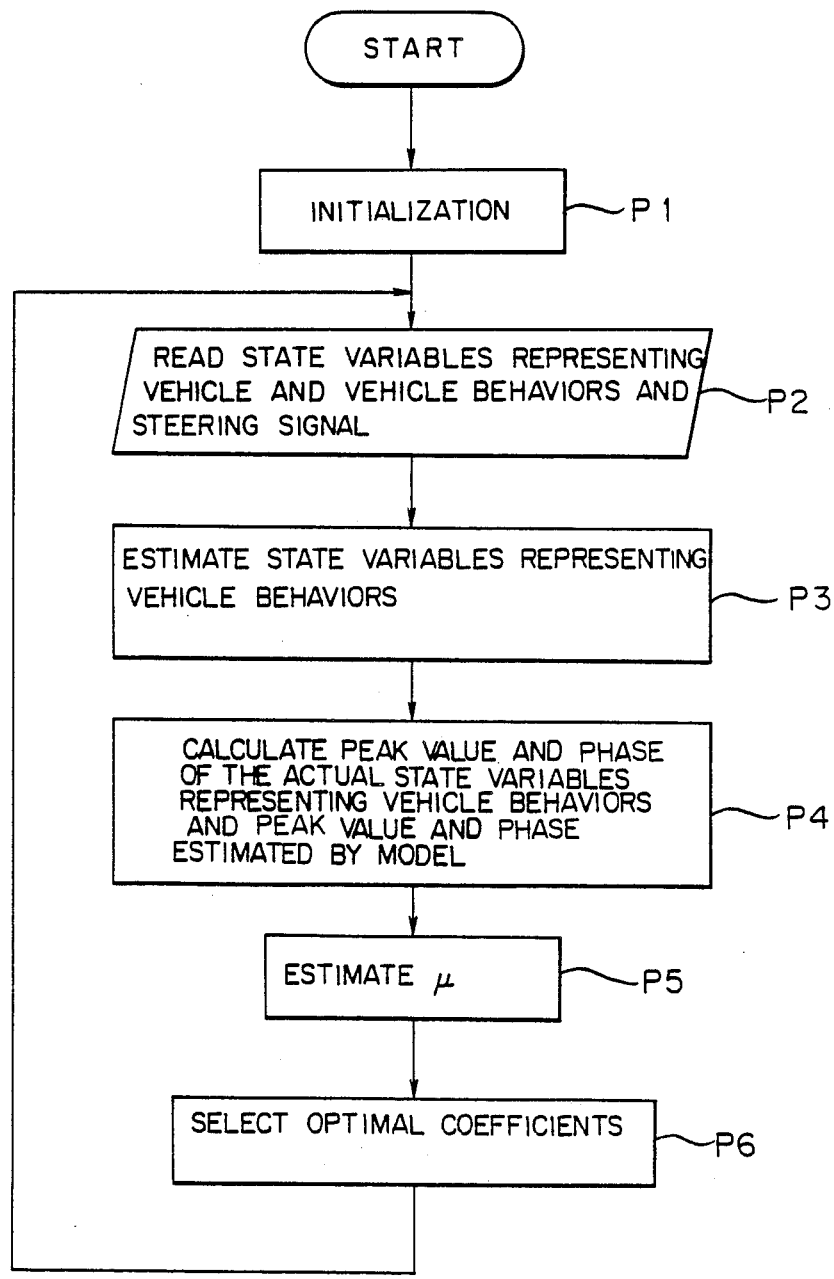

The steering sensor I is coaxial with the steering wheel to measure a steering angle of the steering wheel, as shown in FIG. 25.

The vehicle behavior sensor II comprises a yaw rate sensor II1 for detecting a yaw rate $\dot{\psi}$ of the vehicle and outputting a signal representing the yaw rate $\dot{\psi}$, and a lateral acceleration sensor II2 for detecting a lateral acceleration $\ddot{y}$ of the vehicle and outputting a signal representing the lateral acceleration $\ddot{y}$. The vehicle behavior sensor II is mounted at the center of gravity of the vehicle.

The control means III comprises a feed forward signal operating means III1, a feedback signal operating means III2, a control signal operating means III3, and a gain changing means III4.

The feed forward signal operating means III1 comprises: a steering angle signal circuit III11 for transmitting, without modifications, an electrical signal corresponding to the steering angle $\delta$ and output from the steering sensor I; a steering angle signal operating circuit III13 provided with a first coefficient circuit III12 for multiplying with $G_1$ the signal corresponding to the steering angle $\delta$ and output from the steering sensor I; a steering angular velocity signal operating circuit III16 provided with a differentiator III14 for calculating a signal corresponding to a steering angular velocity $\dot{\delta}$ on the basis of the signal corresponding to the steering angle $\delta$ and output from the steering sensor I and a second coefficient circuit III15 for multiplying with $G_2$ the signal corresponding to the steering angular velocity $\dot{\delta}$ and output from the differentiator III14; and an adder III17 for adding the signals output from the first and second coefficient circuits III12 and III15 and the signal output from the steering angle signal circuit III11.

The feedback signal operating means III2 comprises a vehicle behavior state variable signal circuit III22 provided with four coefficient circuits III21, III23, III26, and III27, primary delay filters III24, III28, and III29, an adder III25 for adding the signals output from the coefficient circuits III21 and III23, an adder III30 for adding the signals output from the coefficient circuits III26 and III27, and an adder III20 for adding the signals output from the adders III25 and III30.

The primary delay filter III24 outputs a pseudo yaw angle $\hat{\psi}$ corresponding to a yaw angle signal $\psi$ on the basis of the yaw rate signal $\dot{\psi}$ from the yaw rate sensor II1. The primary delay filter III29 outputs a pseudo lateral velocity $\hat{y}$ corresponding to the lateral velocity $\dot{y}$ on the basis of the lateral acceleration signal from the lateral acceleration sensor II$_2$. The primary delay filter III$_{28}$ outputs a pseudo lateral displacement $\hat{y}$ corresponding to the lateral displacement y on the basis of the pseudo lateral velocity signal $\hat{\dot{y}}$.

The control signal operating means III$_3$ comprises an adder/subtracter III$_{31}$ for calculating a difference or a sum of a fee forward control signal output from the feed forward signal operating means III$_1$ and a feedback signal output from the feedback signal operating means III$_2$.

The gain changing means III$_4$ comprises a microcomputer 200. The microcomputer 200 comprises: an input port 201 for receiving the signal corresponding to the yaw rate $\dot{\psi}$, the signal corresponding to the vehicle velocity u$_0$, and the signal corresponding to the steering control signal as an output from the adder/subtracter III$_{31}$; an arithmetic and logic unit 202 for estimating the variables representing the vehicle behavior and friction between the vehicle wheels and the road surface and for calculating optimal gains as a result of estimation; a memory 203 for storing algorithms for and operation results of the arithmetic and logic unit 202 and vehicle specifications; and an output port 204 for outputting optimal gains selected by the arithmetic and logic unit 202.

The functions of the microcomputer 200 will be described in detail with reference to a flow chart in FIG. 26.

When the driver turns on the ignition key, the programs in the microcomputer 200 are started, and initialization is performed (P1). In the initialization routine P1, hardware such as an A/D converter and a D/A converter and software such as control parameters are initialized.

When initialization routine P1 is completed, the yaw rate $\dot{\psi}$ from the vehicle behavior sensor II$_1$, the steering control signal as an output from the adder/subtracter III$_{31}$, and the vehicle velocity u$_0$ from the vehicle state detection sensor VI are fetched by the microcomputer 200 through the A/D converter (P2).

Coefficients (equations (7) and (8)) of a yaw rate estimation model, i.e., equation (8) are obtained on the basis of the vehicle velocity u$_0$ and the vehicle specifications. The coefficients and the steering control signal as an output from the adder/subtracter III$_{31}$ are used to solve equation (8), thereby obtaining an estimated value $\dot{\psi}_m$ of the yaw rate (P3).

The microcomputer 200 calculates the change points (e.g., the peak values of the signals and their phases) of the corresponding signals $\dot{\psi}$ and $\dot{\psi}_m$ which are respectively the yaw rate $\dot{\psi}$ input from the A/D converter and the estimated yaw rate value $\dot{\psi}_m$ obtained in program P3 (these signals are generated by the given steering control signal) (P4).

The friction value $\mu$ is estimated by program P5 by the peak value phase difference obtained in program P4. More specifically, the peak value phase difference obtained in program P4 exceeds a given threshold value (e.g., 90°), the friction value $\mu$ is determined to be small, and the flow advances to the next step. However, the peak value phase difference is smaller than the threshold value, a peak ratio $\dot{\psi}/\dot{\psi}_m$ is calculated. The coefficients of the $\mu$ estimation equation (16) are estimated by equations (7) and (13) using the vehicle specifications and the vehicle velocity u$_0$. Equation (16) is solved using the coefficients and the peak ratio to estimate $\mu$.

Optimal coefficients for the $\mu$ value estimated in program P5 and the vehicle velocity u$_0$ are determined and are output to the coefficient circuits III$_{12}$, III$_{15}$, III$_{21}$, III$_{23}$, III$_{26}$, and III$_{27}$ (P6). The flow then returns to program P2.

The driving means IV comprises a subtractor IV$_1$ for calculating a difference between the steering control signal output from the control means III, i.e., the signal corresponding to the front wheel steering angle and the signal output from a rod displacement meter 514 included in the actuator means V, and an amplifier IV$_2$ for converting the difference signal into a signal to be output to the servo valve 525 included in the actuator means V.

The actuator means V changes the signal from the driving means IV into a front wheel steering angle and comprises a front wheel steering mechanism V$_{10}$ and an electrohydraulic control mechanism V$_{20}$.

The front wheel steering mechanism V$_{10}$ comprises front wheels 511, steering linkages 512, rods 513, and the rod displacement meter 514.

The electrohydraulic control mechanism V$_{20}$ comprises a hydraulic pump 521, a relief valve 522 for maintaining an oil pressure at a predetermined pressure, an accumulator 523 for suppressing variations in oil pressure in the hydraulic pump 521, a hydraulic piston 524, a servo valve 525 for determining a direction for supplying oil to the hydraulic piston 524, an oil supply path 526 for supplying the oil under pressure to the hydraulic piston 524, an oil return path 527 for returning the oil discharged from the hydraulic piston 524 and the oil leaking from the releaf valve 522, and an oil tank 528 for storing the oil to be used in the electrohydraulic control mechanism V$_{20}$.

The front wheels 511 are rotatably supported on the vehicle body through the steering linkages 512. The steering linkages 512 are coupled through the rods 513 and the hydraulic piston 524. The servo valve 525 is controlled by a signal corresponding to a difference between the front wheel steering angle signal from the driving means IV and the output from the control means III. In other words, the servo valve 525 is controlled by the front wheel steering angle deviation signal. The compressed oil, which is controlled at a predetermined pressure by the hydraulic pump 521, the relief valve 522, and the accumulator 523 is supplied to one chamber of the hydraulic piston 524 through the oil supply path 526 by the servo valve. The other chamber communicates with the oil tank 528 through the oil return path 527 to drive the hydraulic piston 524. The front wheels 511 can be steered in the right or left direction through the rods 513 and the steering linkages 512.

The vehicle state detection sensor VI comprises a vehicle velocity sensor mounted on the output shaft of the transmission. The vehicle velocity sensor detects the vehicle velocity u$_0$ and outputs a signal representing the vehicle velocity u$_0$.

The function and the effect of this embodiment having the above arrangement will be described below.

The outputs from the steering sensor I for measuring the steering angle of the steering wheel and the vehicle behavior sensor II provided with the yaw rate sensor for outputting the yaw rate $\dot{\psi}$ and the lateral acceleration sensor II$_2$ for measuring a lateral acceleration of the vehicle are input to the feed forward signal operating means III$_1$ and the feedback signal operating means III$_2$ in the control means III.

The feed forward signal operating means III$_1$ divides the input signals into the signal corresponding to the steering angle $\delta$, and the signal corresponding to the steering angular velocity $\dot{\delta}$ through the differentiator III$_{14}$.

The feedback signal operating means III$_2$ divides the input signals into the signal corresponding to the yaw rate $\dot{\psi}$, a signal representing a pseudo yaw angle $\hat{\psi}$ through the primary delay filter III$_{24}$, a signal representing a pseudo lateral velocity $\hat{y}$ through the primary delay filter III$_{29}$ on the basis of the signal corresponding to the lateral acceleration $\ddot{y}$, and a signal representing a pseudo lateral displacement $\hat{y}$ through the primary delay filter III$_{28}$.

The input port 201 in the gain changing means III$_4$ receives the signal corresponding to the yaw rate $\dot{\psi}$ and output from the yaw rate sensor II$_1$ in the vehicle behavior sensor and the signal corresponding to the lateral acceleration $\ddot{y}$ and output from the lateral acceleration sensor II$_2$ in addition to the signal corresponding to the steering control signal and output from the adder/subtractor III$_{31}$ and the signal corresponding to the vehicle velocity u$_0$.

The gain changing means III$_4$ estimates the yaw rate of the vehicle on the basis of the input signals, compares the estimated value with the peak value of the actual yaw rate to estimate $\mu$, and calculates optimal gains corresponding to the current vehicle states by using the estimated $\mu$ value and the vehicle velocity u$_0$.

The calculated optimal gain values as the optimal gain outputs G$_i$ (i=1 to 6) from the output port 204 in the gain changing means III$_4$ are input to the first and second coefficient circuits III$_{12}$ and III$_{15}$ in the feed forward signal operating means III$_1$ and the four coefficient circuits III$_{21}$, III$_{23}$, III$_{26}$, and III$_{27}$ in the feedback signal operating means III$_2$. Therefore, the optimal gains for the signals $\delta$, $\dot{\delta}$, $\dot{\psi}$, $\hat{\psi}$, $\hat{y}$, and $\hat{y}$ can be provided.

The adder III$_{17}$ in the feed forward signal operating means III$_1$ adds a signal G$_1 \cdot \delta$ obtained by multiplying the steering angle signal $\delta$ with the optimal gain G$_1$ and a signal G$_2 \cdot \dot{\delta}$ obtained by multiplying the differential value signal $\dot{\delta}$ of the steering angle with the optimal gain G$_2$ and outputs a feed forward signal $\delta + G_1 \cdot \delta + G_2 \cdot \dot{\delta}$ to the control signal operating means III$_3$.

The adder III$_{25}$ in the feedback signal operating means III$_2$ adds a signal G$_3 \cdot \dot{\psi}$ obtained by multiplying the yaw rate signal $\dot{\psi}$ with the optimal gain G$_3$, a signal G$_4 \cdot \hat{\psi}$ obtained by multiplying the pseudo yaw angle signal $\hat{\psi}$ with the optimal gain G$_4$, a signal G$_5 \cdot \hat{y}$ obtained by multiplying the pseudo lateral velocity signal $\hat{y}$ with the optimal gain G$_5$, and a signal G$_6 \cdot \hat{y}$ obtained by multiplying the pseudo lateral displacement signal $\hat{y}$ with the optimal gain G$_6$ and outputs a feedback signal G$_3 \cdot \dot{\psi} + G_4 \cdot \hat{\psi} + G_5 \cdot \hat{y} + G_6 \cdot \hat{y}$ to the control signal operating means III$_3$.

The driving means IV drives the actuator means V in accordance with the steering control signal $\delta_f$ from the control signal operating means III$_3$:

$$\delta_f = \delta + G_1 \cdot \delta + G_2 \cdot \dot{\delta} + G_3 \cdot \dot{\psi} + G_4 \cdot \hat{\psi} G_5 \cdot \hat{y} + G_6 \cdot \hat{y}$$

The actuator V drives the front wheel steering mechanism V$_{10}$ to perform predetermined steering control.

The optimal front wheel steering control angles $\delta_f$ instantaneously detect the variables representing the vehicle travel and the vehicle behaviors to determine coefficients G$_i$ according to the degrees of contribution. A feedback control system for instantaneous states including the factors of the driver can be arranged to perform optimal steering angle control for the vehicle driven by the driver. At the same time, the coefficients G$_1$ (i=1, 2 to 6) are determined by the estimated $\mu$ value and the vehicle velocity u$_0$ after the friction value $\mu$ between the vehicle wheels and the road surface is estimated during steady traveling of the vehicle. For this reason, an auxiliary steering angle may be added in an abnormal state, for example, a slippery road. Even if the driver does not notice changes in vehicle wheels or the road surface, vehicle controllability and stability can be automatically controlled, thereby achieving optimal steering angle control corresponding to given weather and road conditions.

Fourth Embodiment

An apparatus for controlling steering of wheels of a vehicle according to a fourth embodiment which belongs to the twelfth mode of the present invention will be described with reference to FIGS. 27 to 34. Differences between the third and fourth embodiments are concentrated.

The apparatus for controlling steering of wheels of a vehicle according to the fourth embodiment is applied to an apparatus for controlling steering of front wheels of a vehicle. This apparatus basically belongs to the twelfth mode shown in FIG. 15 and comprises a steering sensor I, a vehicle behavior sensor II, a control means III, a driving means IV, an actuator means V, and vehicle state detection sensors VI.

Figure 27:
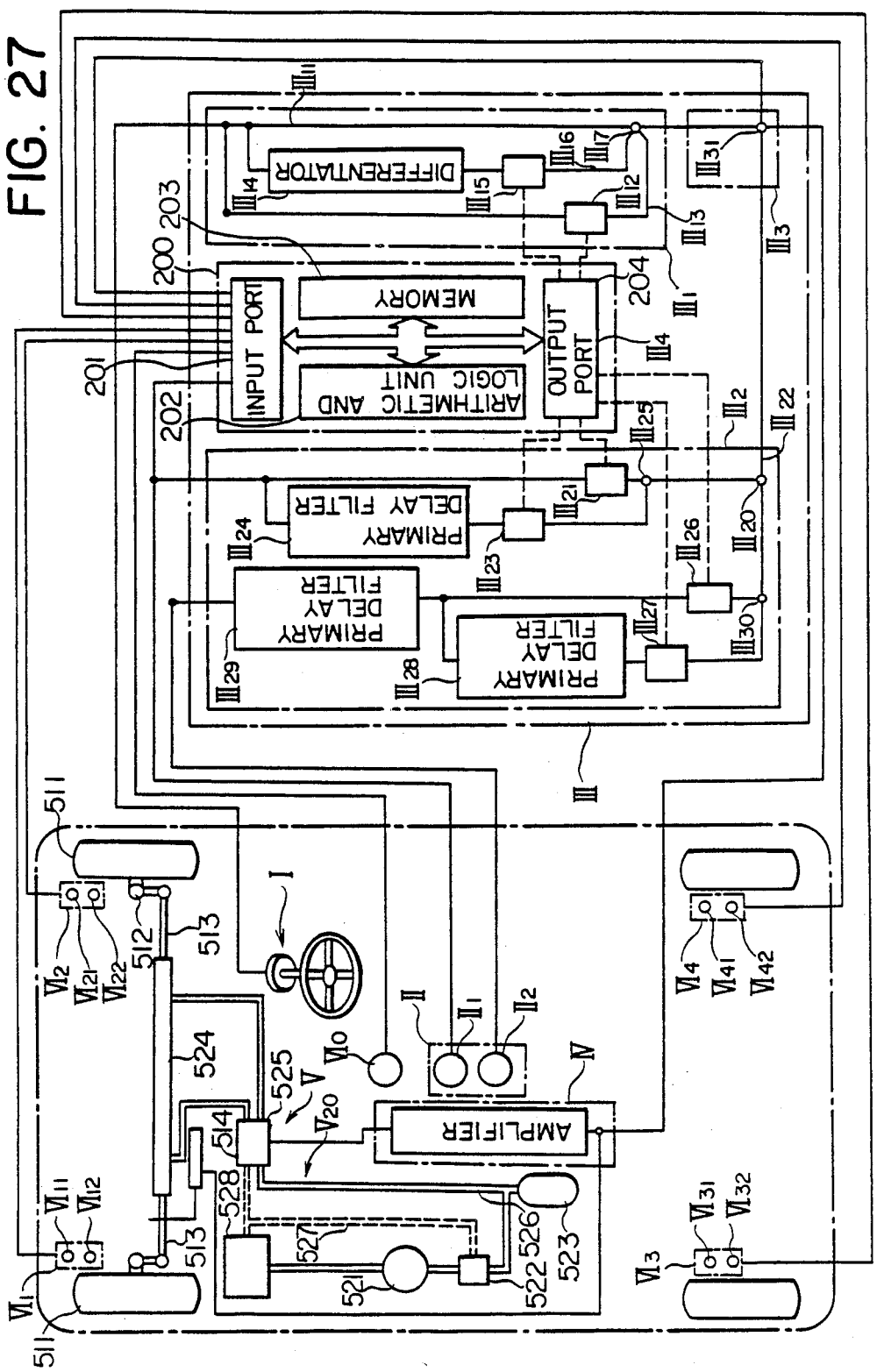

The vehicle behavior sensor II comprises a yaw rate sensor II$_1$ for detecting an angular velocity around the center of gravity of the vehicle and a lateral acceleration sensor II$_2$ for measuring a lateral acceleration of the vehicle, as shown in FIG. 27.

The sensor VI for detecting the vehicle travel state variables with the vehicle travel comprises a vehicle velocity sensor VI$_0$ mounted on the output shaft of the transmission to detect the vehicle velocity u$_0$ and output a signal representing the vehicle velocity u$_0$, vehicle wheel angular velocity sensors VI$_{i1}$ (i=1, 2, 3, 4) for measuring angular velocities of the respective vehicle wheels, and load sensors VI$_{i2}$ (i=1, 2, 3, 4) for measuring loads acting on the respective vehicle wheels.

The control means III comprises a feed forward signal operating means III$_1$, a feedback signal operating means III$_2$, a control signal operating means III$_3$, and a gain changing means III$_4$.

The coefficient circuits III$_{21}$, III$_{23}$, III$_{26}$ and III$_{27}$ multiply the corresponding signals with a yaw rate feedback gain G$_3$, a yaw angle feedback gain G$_4$, a lateral velocity feedback gain G$_5$ and a lateral displacement feedback gain G$_6$, respectively. The adders III$_{20}$, III$_{25}$ and III$_{30}$ are used to add the signals output from the four coefficient circuits III$_{21}$, III$_{23}$, III$_{26}$ and III$_{27}$.

The control signal operating means III$_3$ comprises an adder/subtracter III$_{31}$ for calculating a difference or a sum of the signal output from the feed forward signal operating means III$_1$ and the signal output from the feedback signal operating means III$_2$.

The gain changing means III$_4$ comprises a microcomputer 200. The microcomputer 200 comprises: an input port 201 for receiving the signal corresponding to the yaw rate $\dot{\psi}$, the signal corresponding to the vehicle velocity u$_0$, the signal corresponding to each vehicle wheel angular velocity, the signal corresponding to each vehicle wheel load, and the signal corresponding to the steering control signal as an output from the adder/subtracter III$_{31}$; an arithmetic and logic unit 202 for estimating signals for variables representing vehicle behaviors and the $\mu$ value between the vehicle wheels and the road surface, for calculating the slip ratios of the wheels on the basis of the respective input signals, and for calculating optimal gains as a result of the above estimation operations; a memory 203 for storing vehicle specifications, and algorithms and operation results of the arithmetic and logic unit 202; and an output port 204 for outputting the optimal gains selected by the arithmetic and logic unit 202.

Figure 28:
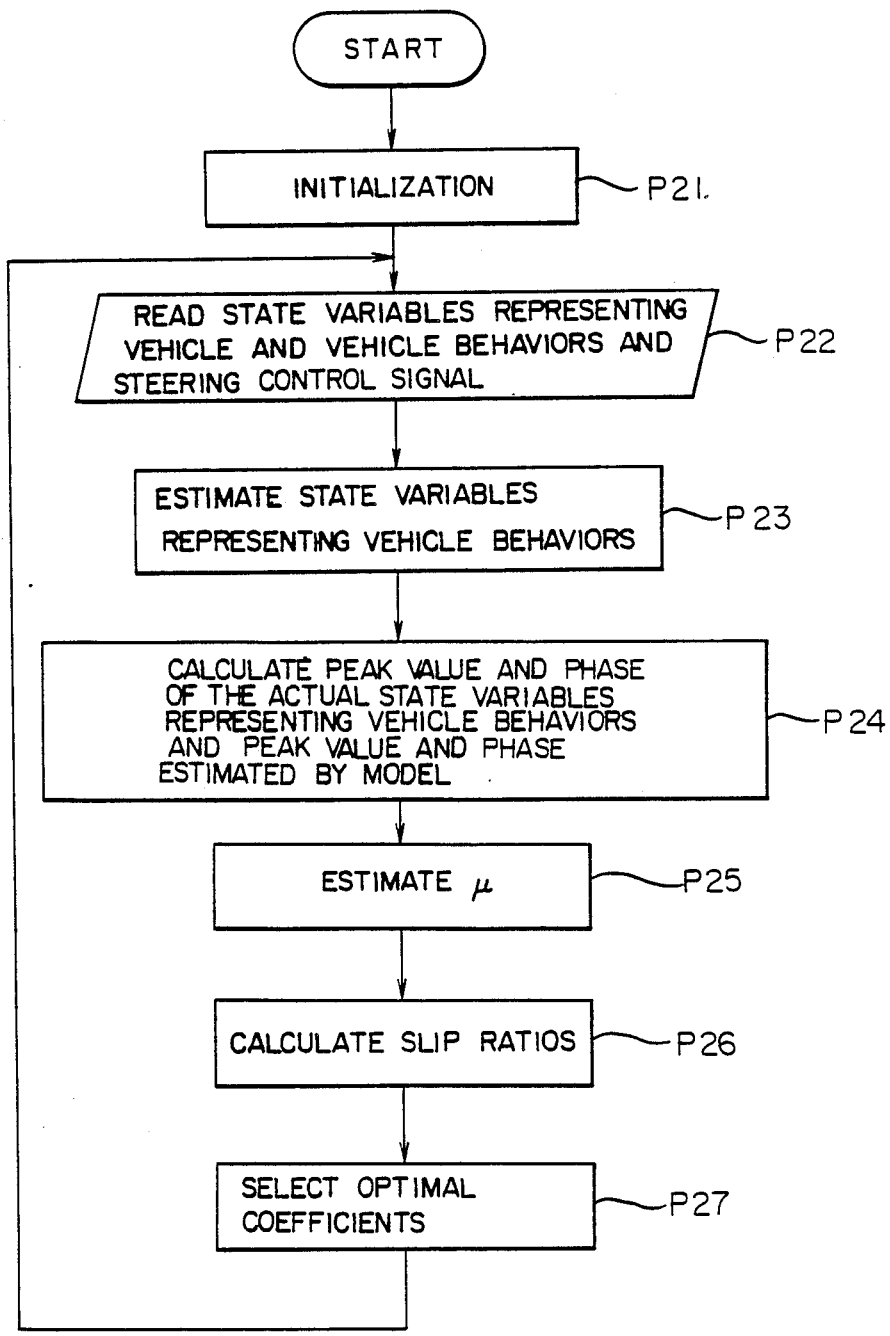

The functions of the microcomputer 200 will be described with reference to a flow chart in FIG. 28.

When the driver turns on the ignition key, the programs in the microcomputer 200 are started, and initialization is performed (P21). In initialization routine P21, hardware such as an A/D converter and a D/A converter and software such as control parameters are initialized.

When initialization routine P21 is completed, the microcomputer 200 fetches the yaw rate $\dot{\psi}$ from the vehicle behavior sensor, the vehicle velocity $u_0$ from the vehicle velocity sensor $VI_0$, the respective vehicle wheel angular velocities from the vehicle wheel angular velocity sensors $VI_{i1}$ (i=1, 2, 3, 4), and the respective vehicle wheel loads from the load sensors $VI_{i2}$ (i=1, 2, 3, 4), and the steering control angle $\delta_f$ as an output from the adder/subtracter $III_{31}$ through the A/D converter (P22).

The coefficients (equations (7) and (8)) of yaw rate estimation model (8) are calculated on the basis of the vehicle velocity $u_0$ and the vehicle specifications. The resultant coefficients and the steering control signal as an output from the adder/subtracter $III_{31}$ are used to solve equation (8) to obtain an estimated value $\dot{\psi}_m$ of the vehicle yaw rate (P23).

The corresponding signal change points (i.e., the peak values and their peak phase values) of the yaw rate $\dot{\psi}$ input from the A/D converter and the estimated value $\dot{\psi}_m$ obtained in program P23 are calculated (P24).

The friction value $\mu$ is estimated by the peak value phase difference obtained in program P24 (P25). More specifically, when the peak value phase difference obtained in program P24 exceeds a given threshold value (e.g., 90°), the microcomputer 200 determines that the friction value $\mu$ is small. In this case, the flow advances to the next step. However, if the peak value phase difference is smaller than the threshold value, a peak ratio $\dot{\psi}/\dot{\psi}_m$ is calculated. The coefficient of $\mu$ estimation equation (16) is calculated by equations (7) and (13) using the vehicle specifications and the vehicle velocity $u_0$. The resultant value and the peak ratio are used to solve equation (16) to estimate $\mu$.

The slip ratio is calculated on the basis of the vehicle velocity $u_0$ read in program P22 and the respective vehicle wheel angular velocities (P26).

Optimal coefficients are selected from the map for the estimated $\mu$ values obtained in P25, the slip ratios calculated in P26, and the vehicle velocity $u_0$. The selected optimal coefficients are output to the coefficient circuits $III_{12}$, $III_{15}$, $III_{21}$, $III_{23}$, $III_{26}$, and $III_{27}$ (P27), respectively. The flow returns to P22.

Figure 29:
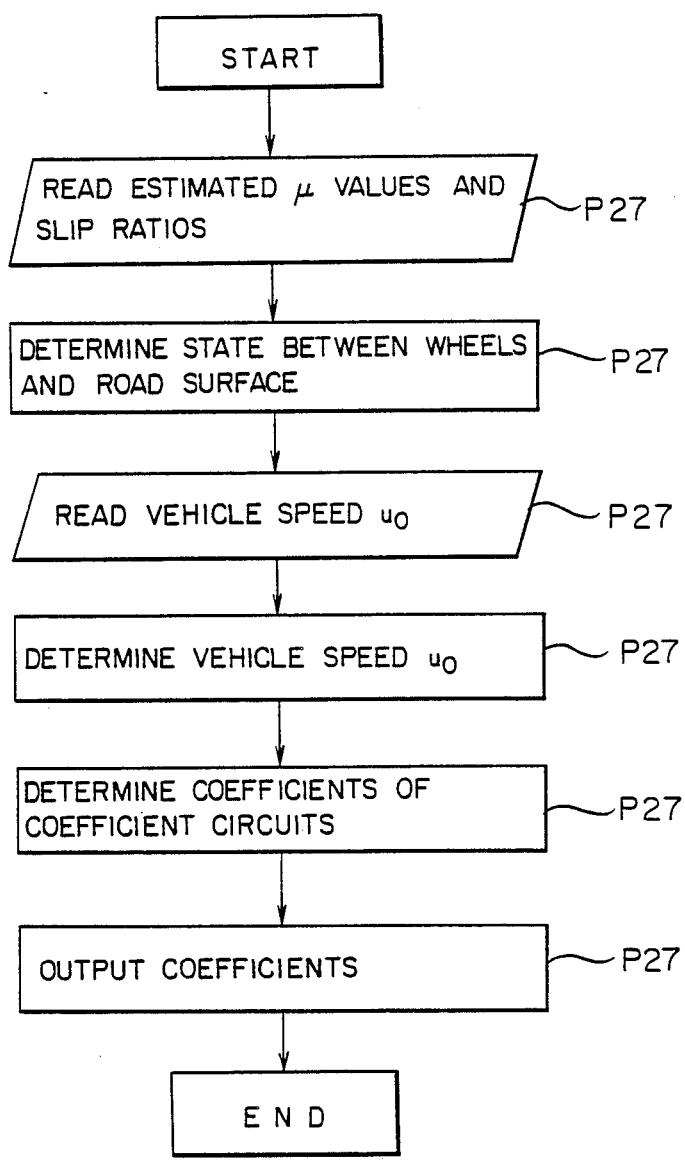
Figure 30:
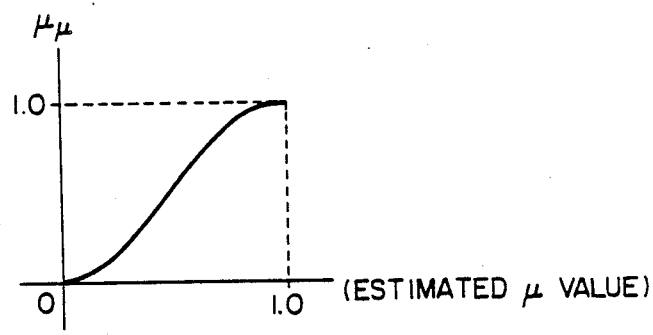
Figure 31:
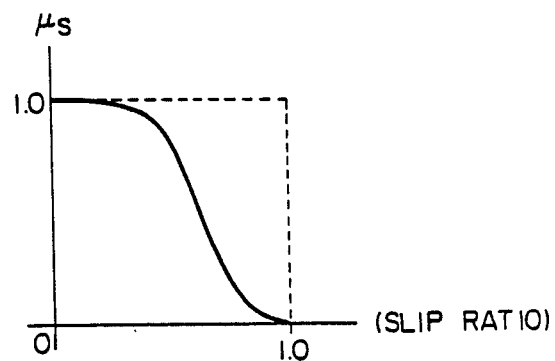
Figure 32:
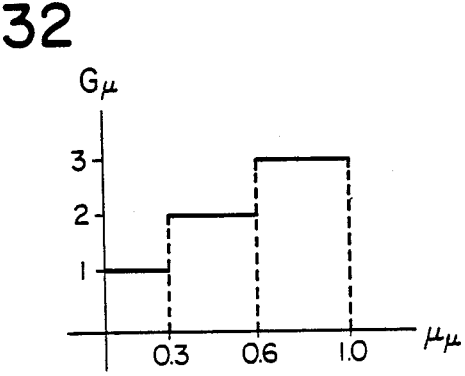
Figure 33:
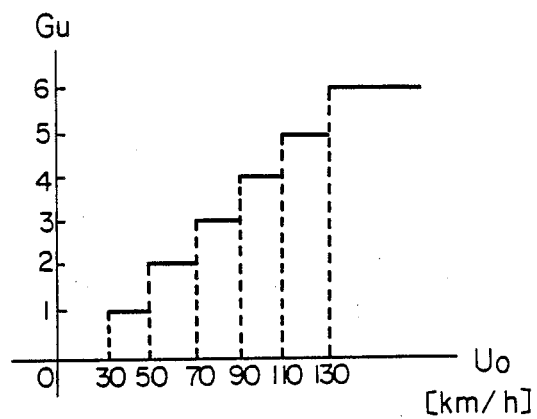
Figure 34:
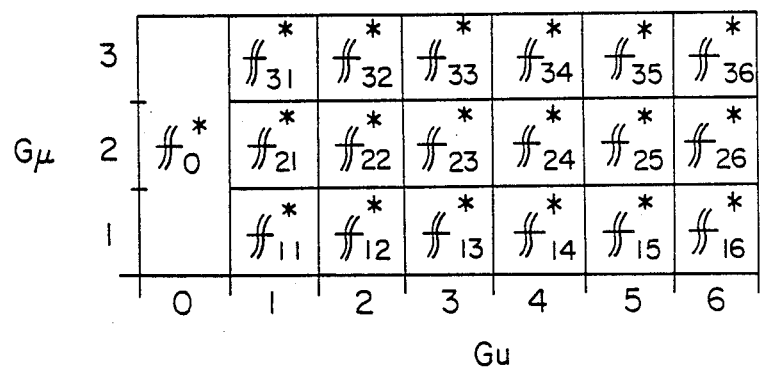

The contents of P27 will be described in more detail with reference to a flow chart in FIG. 29.

When the driver turns on the ignition key, program P27 is started and various initial values are set (P271).

The estimated $\mu$ value and the slip ratios are read (P272).

The state between the wheels and the road surface is determined (P273). More specifically, the estimated $\mu$ value is corrected and weighted (e.g., FIG. 30), and the corrected value is classified (e.g., FIG. 31). The slip ratios are corrected and weighted (e.g., FIG. 32). A smaller one of the resultant values is used as a decision value $G\mu$ between the wheels and the road surface.

The vehicle velocity $u_0$ is read (P274).

The vehicle velocity $u_0$ is classified (e.g., FIG. 33), and the resultant value serves as $G_u$ (P275).

The coefficients of the coefficient circuits are determined (P276). The signal $G\mu$ as an output in P273 and the signal $G_u$ as an output in P275 are used to calculate the coefficients with reference to the map shown in FIG. 34.

The resultant optimal coefficients are output to the corresponding coefficient circuits (P277). In this embodiment, abrupt changes in coefficients decided in P276 are prevented as follows. If a difference between the current coefficient and the updated coefficient is smaller than a maximum value of a predetermined coefficient change value, the current coefficient is replaced with the updated coefficient. However, the above difference exceeds the maximum value, the coefficient updating range corresponds to the maximum value. In this case, the current coefficient converges stepwise to an optimal coefficient. Alternatively, the updated coefficient is filtered through a stable primary delay filter which has the current coefficient as the initial value, thereby further updating the updated coefficient.

The arrangements of the driving means IV, the actuator means V, and the front wheel steering mechanism $V_{10}$ are the same as those of the third embodiment.

The function and the effect of the fourth embodiment having the above arrangement will be described below.

The input port 201 in the gain changing means $III_4$ receives the signal corresponding to the yaw rate $\dot{\psi}$ and output from the yaw rate sensor $II_1$ in the vehicle behavior sensor, the signals corresponding to the vehicle wheel angular velocities and output from the vehicle wheel angular velocity sensors $VI_{i1}$ (i=1, 2, 3, 4) and the signals corresponding to the vehicle wheel loads and output from the load sensors $VI_{i2}$ (i=1, 2, 3, 4) in addition to the signal corresponding to the steering control signal as an output from the adder/subtracter $III_{31}$ and the signal corresponding to the vehicle velocity $u_0$.

The gain changing means $III_4$ estimates the yaw rate of the vehicle on the basis of the input signals, compares the estimated value with the peak value of the actual yaw rate to estimate $\mu$, and calculates optimal gains corresponding to the current vehicle state on the basis of the estimated $\mu$ value and the vehicle velocity $u_0$.

The calculated optimal gain values as the optimal gain outputs $G_i$ (i=1 to 6) from the output port 204 in the gain changing means $III_4$ are input to the first and second coefficient circuits $III_{12}$ and $III_{15}$ in the feed forward signal operating means $III_1$ and the four coefficient circuits $III_{21}$, $III_{23}$, $III_{26}$, and $III_{27}$ in the feedback signal operating means $III_2$. These optimal gains serve as those for the signals $\dot{\delta}$, $\delta$, $\dot{\psi}$, $\psi$, and $\hat{y}$, respectively.

The adder $III_{17}$ in the feed forward signal operating means $III_1$ adds a signal $G_1 \cdot \delta$ obtained by multiplying the steering angle signal $\delta$ with the optimal gain $G_1$ and a signal $G_2 \cdot \dot{\delta}$ obtained by multiplying the differential value signal $\dot{\delta}$ of the steering angle with the optimal gain $G_2$ and outputs a feed forward signal $\delta + G_1 \cdot \delta + G_2 \cdot \dot{\delta}$ to the control signal operating means $III_3$.

The adder $III_{25}$ in the feedback signal operating means $III_2$ adds a signal $G_3 \cdot \dot{\psi}$ obtained by multiplying the yaw rate signal $\dot{\psi}$ with the optimal gain $G_3$, a signal $G_4 \cdot \dot{\psi}$ obtained by multiplying the pseudo yaw angle signal $\dot{\psi}$ with the optimal gain $G_4$, a signal $G_5 \cdot \dot{y}$ obtained by multiplying the pseudo lateral velocity signal $\dot{y}$ with the optimal gain $G_5$, and a signal $G_6 \cdot \hat{y}$ obtained by multiplying the pseudo lateral displacement signal $\hat{y}$ with the optimal gain $G_6$ and outputs a feedback signal $G_3 \psi + G_4 \cdot \dot{\psi} + G_5 \cdot \dot{y} + G_6 \cdot \hat{y}$ to the control signal operating means $III_3$.

The driving means IV drives the actuator means V in accordance with the operation control signal $\delta_f$ from the control signal operating means $III_3$:

$$\delta_f = \delta + G_1 \cdot \delta + G_2 \cdot \dot{\delta} + G_3 \cdot \psi + G_4 \cdot \dot{\psi} + G_5 \cdot \dot{y} + G_6 \cdot \hat{y}$$

The actuator means V drives the front wheel steering mechanism $V_{10}$ to perform predetermined steering control.

The optimal front wheel steering control angles $\delta_f$ instantaneously detect the variables representing the vehicle and the vehicle behavior and give the coefficients $G_i$ according to the degrees of contribution, thereby constituting a feedback control system for controlling instantaneous states including the factors of the driver. Therefore, optimal steering angle control can be performed for the vehicle driven by the driver. At the same time, the coefficients $G_i$ ($i=1, 2$ to 6) are determined by the estimated $\mu$ value during steady traveling and the slip ratio of each vehicle wheel and the vehicle velocity $u_0$. In this case, the estimated $\mu$ value is determined such that the estimated value of the yaw rate generated on the smooth road is compared with the actual yaw rate. When the vehicle travels in an abnormal state, e.g., on a slippery road, an auxiliary steering angle can be added. Zig-zag traveling or a spin caused by slipping during straight driving free from the yaw rate can be prevented. When the driver does not notice changes in vehicle wheel and road surface conditions, or at the time of rapid start or stop, the dynamic characteristics of the vehicle can be automatically controlled, and optimal steering angle control corresponding to given weather and road conditions can be performed.

Fifth Embodiment

An apparatus for controlling steering of wheels of a vehicle according to a fifth embodiment which belongs to the eleventh, twelfth, thirteenth, and fourteenth modes of the present invention will be described in detail with reference to FIGS. 35 and 36. Differences between the fifth and fourth embodiments are concentrated.

The apparatus of this embodiment is applied to an apparatus for controlling steering of front wheels of the vehicle. The apparatus belongs to the eleven mode shown in FIG. 4 and comprises a steering sensor I, a vehicle behavior sensor II, a control means III, a driving means IV, an actuator means V, and a vehicle state detection sensor VI.

Figure 35:
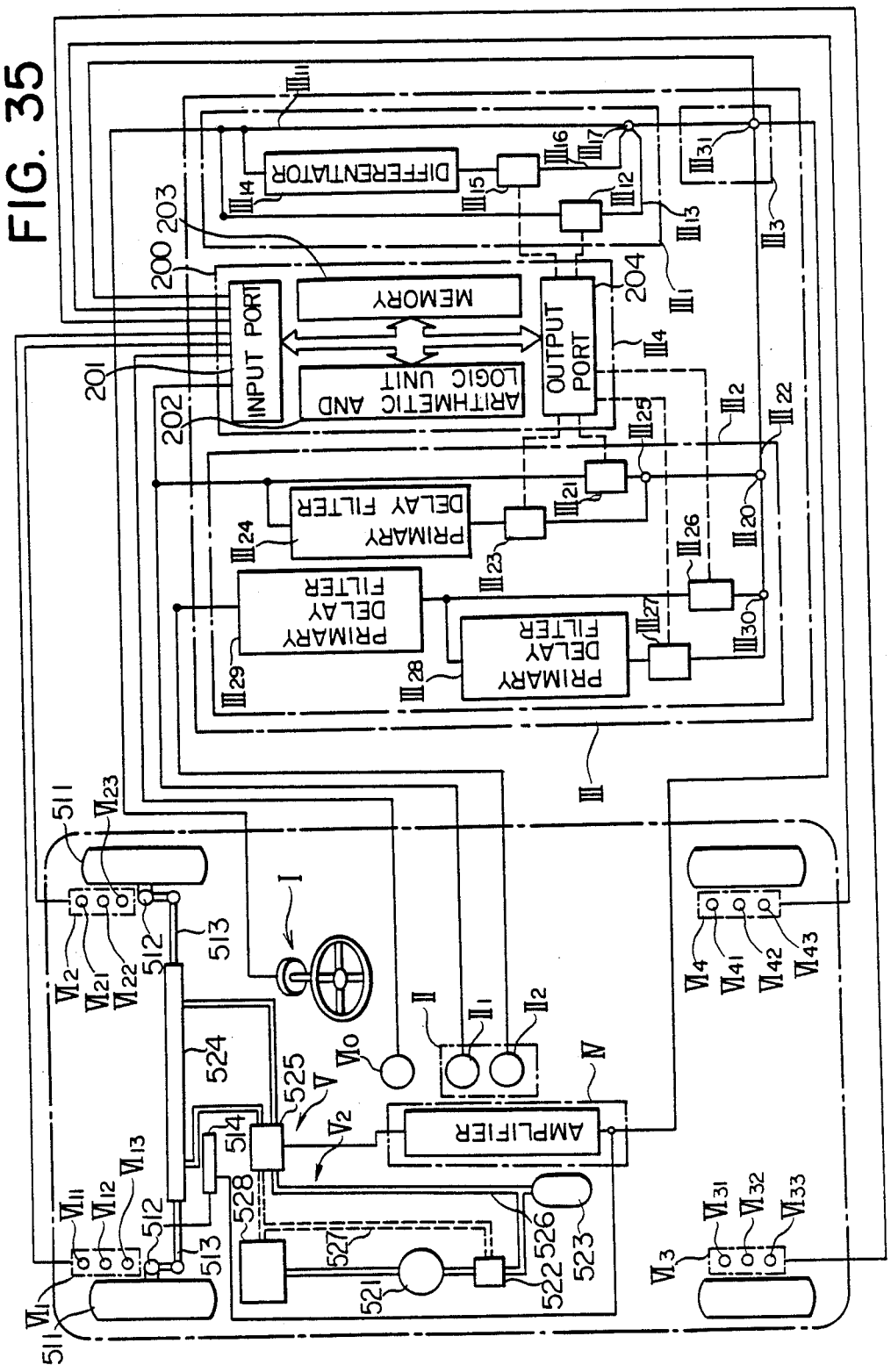
Figure 36:
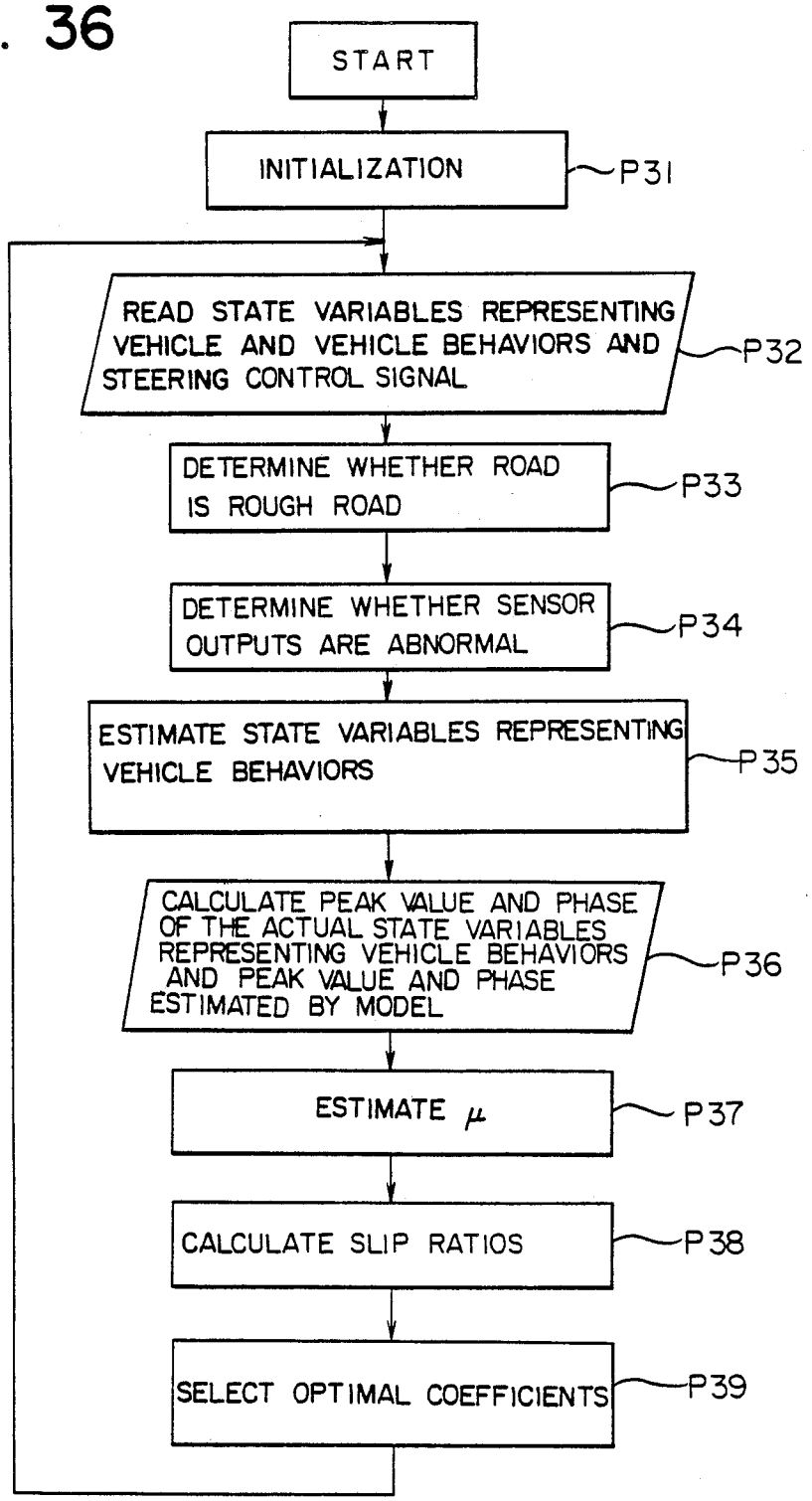

The vehicle state detection sensor VI comprises a vehicle velocity sensor $VI_0$, vehicle wheel angular velocity sensors $VI_{i1}$ ($i=1, 2, 3, 4$) for measuring the respective vehicle wheel angular velocities, load sensors $VI_{i2}$ ($i=1, 2, 3, 4$) for measuring the respective vehicle wheel loads, and road surface shape sensors $VI_{i3}$ ($i=1, 2, 3, 4$), as shown in FIG. 35.

The gain changing means $III_4$ comprises a microcomputer 200. The microcomputer 200 comprises: an input port 201 for receiving a signal corresponding to a yaw rate $\psi$, a signal corresponding to a vehicle velocity $u_0$, a signal corresponding to a steering control signal as an output from an adder/subtractor $III_{31}$, signals corresponding to the vehicle wheel angular velocities, signals corresponding to the vehicle wheel loads, and signals corresponding to the road surface shapes; an arithmetic and logic unit 202 for estimating vehicle behavior variables, a friction value $\mu$ between each wheel and the road surface, calculating a slip ratio of each vehicle wheel, and determining the road surface shapes and abnormalities of the sensors on the basis of the input signals, and for calculating optimal gains of the above operations; a memory 203 for storing vehicle specifications and the algorithm for and operation results of the arithmetic and logic unit 202, and an output port 204 for outputting the optimal gains selected from the arithmetic and logic unit 202.

The functions of the microcomputer 200 will be described in detail with reference to a flow chart in FIG. 36.

When the driver turns on the ignition key, the programs in the microcomputer 200 are started and initialization (P31) is performed. In initialization routine P31, hardware such as an A/D converter and a D/A converter and software such as control parameters are initialized.

When initialization routine P31 is completed, the microcomputer 200 receives the yaw rate $\dot{\psi}$ from the yaw rate sensor $II_1$, the steering control signal as an output from the adder/subtractor $III_{31}$, the vehicle velocity $u_0$ from the sensor VI, and the vehicle wheel angular velocity and load signals and road surface shape signals or signal like road surface shape (e.g., sprung relative displacements and velocities) through the A/D converter (P32).

When all signals are received in P32, the microcomputer 200 determines the road surface shapes on the basis of the outputs from the road surface shape sensors $VI_{i3}$ ($i=1, 2, 3, 4$) (P33). If the road surface is determined to be a rough road surface, the flow advances to program P39 without executing the following routine.

If the road surface is determined in P33 not to be a rough road surface, the microcomputer 200 determines whether output values from the steering angle sensor and the vehicle behavior sensor are abnormal (P34). In this case, the following operations are performed to determine: (i) whether the sensor output values exceed a predetermined value which is the upper limit for possible vehicle motion; and (ii) whether the sensor output values do not contradict with other conditions. If the above conditions are satisfied and the sensor outputs are determined to be abnormal, the flow advances to program P39 without executing the following routine.

The coefficients of vehicle yaw rate estimation model (8) (equations (7) and (8)) are calculated on the basis of the vehicle velocity $u_0$, the vehicle wheel loads, and the vehicle specifications. The resultant coefficient values and the steering control signal as an output from the adder/subtractor $III_{31}$ are used to solve equation (8) to obtain an estimated value $\dot{\psi}_m$ of the vehicle yaw rate (P35).

The corresponding signal change points (i.e., the peak values and peak phase values) of the yaw rate $\dot{\psi}$ input from the A/D converter and the estimated value $\dot{\psi}_m$ obtained in P35 are calculated (P36).

The friction value $\mu$ is estimated by the peak value obtained in P36 (P37). More specifically, if the peak value phase difference obtained in P36 exceeds a threshold value (e.g., 90°), the microcomputer 200 determines that the friction value $\mu$ is small and the flow advances to the next step. However, the peak value phase difference is smaller than the threshold value, a peak ratio $\dot{\psi}/\dot{\psi}_m$ is calculated. The coefficient of the $\mu$ estimation equation (16) is calculated by equations (7) and (13) using vehicle specifications and the vehicle velocity $u_0$. The resultant coefficient value and the peak ratio are used to solve equation (16) to estimate $\mu$.

The slip ratios are calculated using the vehicle velocity $u_0$ read in P32 and the respective vehicle wheel angular velocities (P38).

Optimal coefficients are selected for the estimated $\mu$ values estimated in P37, the slip ratios calculated in P38, the vehicle velocity $u_0$, the rough road determination result, and the sensor abnormality determination result and are output to the coefficient circuits $III_{12}$, $III_{15}$, $III_{21}$, $III_{23}$, $III_{26}$, and $III_{27}$ (P39). Thereafter, the flow returns to P32.

The driving means IV, the actuator means V, and the vehicle velocity detection sensor $VI_0$ have the same arrangements as in the fourth embodiment.

The function and the effect of the fifth embodiment having the above arrangement will be described below.

The input port 201 in the gain changing means $III_4$ receives the signal corresponding to the yaw rate $\dot{\psi}$ and output from the yaw rate sensor $II_1$ in the vehicle behavior sensor II, the vehicle wheel angular velocity signals output from the vehicle wheel angular velocity sensors $VI_{i1}$ (i=1, 2, 3, 4), the vehicle wheel load signals output from the load sensors $VI_{i2}$ (i=1, 2, 3, 4), and the road surface shape signals from the road surface shape sensors $VI_{i3}$ (i=1, 2, 3, 4) in addition to the signal corresponding to the steering control signals as an output from the adder/subtractor $III_{31}$ and the signal corresponding to the vehicle velocity $u_0$.

The gain changing means $III_4$ calculates optimal gains on the basis of the input signals in the same manner as in the third embodiment. The optimal gain outputs $G_i$ (i=1 to 6) appear at the output port 204 in the gain changing mean $III_4$ to the first and second coefficient circuits $III_{12}$ and $III_{15}$ in the feed forward signal operating means $III_1$ and the four coefficient circuits $III_{21}$, $III_{23}$, $III_{26}$, and $III_{27}$ in the feedback signal operating means $III_2$ and serve as those for the signals $\delta$, $\dot{\delta}$, $\psi$, $\dot{\psi}$, y, and $\dot{y}$, respectively.

Unlike the conventional control system drawback caused by using as feedback and feed forward signals the signals obtained by multiplying the signals for variables representing vehicle behaviors and the steering angle signals with coefficients after the road conditions and sensor operating states are detected, the following operation errors can be prevented according to the present invention. These errors occur as follows. The vehicle behavior detection sensor erroneously detects that vehicle vibrations are not caused by vehicle motion but by the bumps or the like of the road surface. However, the vibration detection signal is used as if it is generated by vehicle motion, and therefore, the detection signal is used for feed forward or feedback control. In addition, an abnormal signal generated by sensor failures or the like is used for feed forward or feedback control to cause the operation errors in the steering control system. The above drawbacks can be completely eliminated from the apparatus of this embodiment. In addition to the steering control effect of the fourth embodiment, the apparatus of the fifth embodiment can perform a safer and more reliable control operation.

What is claimed is:

1. An apparatus for controlling steering of wheels of a vehicle, comprising:
   a steering sensor for detecting a steering angle of a steering wheel;
   a vehicle behavior sensor for detecting variables representing vehicle behavior;
   control means comprising
      feed forward signal operating means including
         a steering angle signal circuit for transmitting, without modification, a steering angle signal output from said steering sensor,
         a steering angle signal operating circuit including a first coefficient circuit for multiplying the steering angle signal with a coefficient to correct the magnitude of the detected steering angle.
         a steering angular velocity signal operating circuit including a differentiator for calculating a steering angular velocity signal from the steering angle signal and a second coefficient circuit for multiplying the steering angular velocity signal with a coefficient, and
         an adder for adding signals output from said steering angle signal circuit, said steering angle signal operating circuit, and said steering angular velocity signal operating circuit to output a sum signal,
         the sum signal being output as a feed forward signal,
      feedback signal operating means comprising a vehicle behavior state variable signal operating circuit including a third coefficient circuit for multiplying with a coefficient the signals for variables representing vehicle behavior output from said vehicles behavior sensor, said vehicle behavior state variable signal operating circuit outputting a signal as a feedback signal, and
      control signal operating means including an adder/subtractor for calculating a difference or a sum of signals output from said feed forward signal operating means and said feedback signal operating means and for outputting a steering control signal; driving means for amplifying the steering control signal output from said control means;
   driving means for amplifying the steering control signal output from said control means; and
   actuator means for applying an optimal steering angle of either front or rear wheels or both on the basis of an output from said driving means.

2. An apparatus according to claim 1, further comprising a vehicle state detection sensor for detecting vehicle travel state variable with the vehicle travel, said control means comprising gain changing means, connected to said vehicle state detection sensor and said first coefficient circuit, for changing the coefficient of said first coefficient circuit on the basis of the signals for vehicle travel state variable with the vehicle travel output from said vehicle state detection sensor.

3. An apparatus according to claim 2, further comprising an outside environmental situation detection sensor for detecting state variables representing outside environmental situations, said control means comprising gain changing means, connected to said vehicle state detection sensor and/or said outside environmental situation detection sensor and said first coefficient circuit, for changing the coefficient of said first coefficient circuit on the basis of the signals for vehicle travel state variables with the vehicle travel and output from said vehicle state detection sensor and/or signals for state variables representing outside environmental situations and output from said outside environmental situation detection sensor.

4. An apparatus according to claim 3, wherein said gain changing means comprises gain changing means, connected to said first and second coefficient circuits, for changing the coefficients of said first and second coefficient circuits on the basis of the signals for vehicle travel state variable with the vehicle travel and output from said vehicle state detection sensor and/or the signals for state variables representing the outside environmental situations and output from said outside environmental situation detection sensor.

5. An apparatus according to claim 4, wherein said gain changing means comprises gain changing means, connected to said first, second, and third coefficient circuits, for changing the coefficients of said first, second, and third coefficient circuits on the basis of the signals for vehicle travel state variable with the vehicle travel and output from said vehicle state detection sensor and/or the signals for state variables representing the outside environmental situations and output from said outside environmental situation detection sensor.

6. An apparatus according to claim 5, wherein said gain changing means comprises gain changing means, connected to said vehicle state detection sensor and/or said outside environmental situation detection sensor and said steering sensor and/or said steering angular velocity signal operating circuit, for changing the coefficient of at least one of said coeficient circuits on the basis of signals for vehicle travel state variable with the vehicle travel and output from said vehicle state detection sensor and/or the signals for state variables representing the outside environmental situations and output from said outside environmental state detection sensor and the steering angle signal from said steering sensor and/or the steering angular velocity signal output from said steering angular velocity signal operating circuit.

7. An apparatus according to claim 5, wherein said gain changing means comprises gain changing means, connected to said vehicle state detection sensor and/or said outside environmental situation sensor, said steering sensor and/or said steering angular velocity signal operating circuit, and said vehicle behavior sensor, for changing the coefficient of at least one of said coefficient circuits on the basis of the signals for vehicle travel state variable with the vehicle travel and output from said vehicle state detection sensor and/or the signals for state variable representing outside environmental situations, the steering angle signal from said steering sensor and/or the steering angular velocity signal from said steering angular velocity signal operating circuit, and the signals for variables representing the vehicle behaviors and output from said vehicle behavior sensor.

8. An apparatus according to claim 3, wherein said gain changing means comprises:
sense-of-situation determining means for determining a current level of a vehicle situation with reference to human senses on the basis of at least one of the signals for vehicle travel state variable with the vehicle travel and output from said vehicle state detection sensor, the signals for state variables representing the outside environmental situations and output from said outside environmental situation detection sensor, the steering angle signal output from said steering sensor, the steering angular velocity signal output from said steering angular velocity signal circuit, and the signals for variables representing the vehicle behaviors and output from said vehicle behavior sensor;
vehicle state determining means for determining necessity of stability and controllability by using functions for replacing outputs from said sense-of-situation determining means into the necessity of stability and controllability; and
gain deciding means for deciding gains from output values from said vehicle state determining means and outputting the gains to said coefficient circuits.

9. An apparatus according to claim 8, wherein said gain deciding means in said gain changing means comprises:
a memory for calculating gain values for optimizing vehicle motion in a state of the necessity of stability and controllability and for storing calculated results; and
a gain selector for selecting the gains by selecting the gain values calculated in the state of the necessity of stability and controllability from said memory, on the basis of the determination result from said vehicle state determining means.

10. An apparatus according to claim 8, wherein said gain deciding means in said gain changing means comprises a memory for storing a stability priority gain for increasing vehicle stability and a response priority gain for increasing the vehicle response, and a gain calculation section for weighting these two gains on the basis of the determination value from said vehicle state determining means and calculating gains suitable for the current situation.

11. An apparatus according to claim 2, wherein said gain changing means comprises:
vehicle behavior state variable estimating means for estimating the variables representing vehicle behaviors on the basis of the steering angle signal output from said steering sensor and the signals for vehicle travel state variable with the vehicle travel and output from said vehicle state detection sensor;
$\mu$ estimating means for estimating a friction value ($\mu$) between the vehicle wheels and the road surface on the basis of a vehicle behavior state variable estimation signal output from said vehicle behavior state variable estimating means and the signals for variables representing the vehicle behaviors and output from said vehicle behavior sensor; and
coefficient circuit coefficient changing means for changing the coefficient of at least one of said first, second, and third coefficient circuits on the basis of an estimated $\mu$ signal output from said $\mu$ estimating means,
an optimal gain being supplied to said at least one of said first, second, and third coefficient circuits.

12. An apparatus according to claim 11, wherein
said vehicle behavior state variable estimating means estimates the state variables representing the vehicle behaviors on the basis of the steering control signal output from said control signal operating means and the signals for vehicle travel state variable with the vehicle travel and output from said vehicle state detection sensor, and
said $\mu$ estimating means comprises comparing means for comparing peak values of signals for estimating the variables representing the vehicle behaviors, the signals for estimating the state variables being output from said vehicle behavior state variable estimating means with peak values of the signals for variables representing the vehicle behaviors, and μ determining means for estimating the friction value μ on the basis of a result of an output from said comparing means.

13. An apparatus according to claim 11, wherein said gain changing means comprises:
means for estimating the variables representing the vehicle behaviors on the basis of the steering control signal output from said control signal operating means and the signals for vehicle travel state variable with the vehicle travel and output from said vehicle state detection sensor;
μ estimating means for estimating a friction value on the basis of the signals for estimating the state variables being output from said vehicle behavior state variable estimating means, and the signals for variables representing vehicle behaviors and output from said vehicle behavior sensor;
slip ratio calculating means for calculating slip ratios of the vehicle wheels on the basis of the signals for vehicle travel state variable with the vehicle travel and output from said vehicle state detection sensor and vehicle wheel velocities; and
coefficient circuit coefficient changing means for changing the coefficient of at least one of said first, second, and third coefficient circuits on the basis of an estimated μ signal output from said μ estimating means and slip ratio signals output from said slip ratio calculating means.

14. An apparatus according to claim 11, wherein said gain hanging means comprises:
means for estimating the variables representing the vehicle behaviors on the basis of the steering control signal output from said control signal operating means and the signals for vehicle travel state variable with the vehicle travel and output from said vehicle state detection sensor;
μ estimating means for estimating a friction value on the basis of the signals for estimating the state variables being output from said vehicle behavior state variable estimating means, and the signals for variables representing vehicle behaviors and output from said vehicle behavior sensor;
road surface shape estimating means for estimating road surface shapes on the basis of the signals for vehicle travel state variable with the vehicle travel and output from said vehicle state detection sensor; and
coefficient circuit coefficient changing means for changing the coefficient of at least one of said first, second, and third coefficient circuits on the basis of an estimated μ signal output from said μ estimating means and road surface shape signals output from said road surface shape estimating means.

15. An apparatus according to claim 11, wherein said gain changing means comprises:
means for estimating the variables representing the vehicle behaviors on the basis of the steering control signal output from said control signal operating means and the signals for vehicle travel state variable with the vehicle travel and output from said vehicle state detection sensor;
μ estimating means for estimating a friction value on the basis of the signals for estimating the state variables being output from said vehicle behavior state variable estimating means, and the signals for variables representing vehicle behaviors and output from said vehicle behavior sensor;
sensor abnormality detecting means for detecting abnormalities of said steering sensor, said vehicle behavior sensor, and said vehicle state detection sensor; and
coefficient circuit coefficient changing means for changing the coefficient of at least one of said first, second, and third coefficient circuits on the basis of an estimated μ signal output from said μ estimating means and sensor abnormality detection signals output from said sensor abnormality detecting means.

16. An apparatus according to claim 6, wherein said gain changing means is connected to said vehicle state detection sensor and/or said outside environmental situation detection sensor, said steering sensor and/or said steering angular velocity signal operating circuit, and said vehicle behavior sensor, said gain changing means comprises: sense-of-situation determining means for determining a current level of a vehicle situation with reference to human senses on the bases of at least one of the signals for state variables representing the vehicle and output from said vehicle state detection sensor and/or the signals for state variables representing the outside environmental situations and output from said outside environmental situation detection sensor, the steering angle signal output from said steering sensor and/or the steering angular velocity signal output from said steering angular velocity signal operating circuit, and the signals for state variables representing the vehicle behaviors and output from said vehicle behavior sensor, vehicle state determining means for determining necessary vehicle stability and controllability by using functions for replacing outputs from said sense-of-situation determining means into the necessary vehicle stability and controllability; and
gain deciding means comprising a memory for storing a stability priority gain for increasing vehicle stability and a response priority gain for increasing the vehicle response, and a gain calculation section for weighting these two gains on the basis of the determination value from said vehicle state determining means and calculating gains suitable for the current situations.

17. An apparatus according to claim 7, wherein said gain changing means comprises:
sense-of-situation determining means for determining a current level of a vehicle situation with reference to human senses on the basis of at least one of the signals for vehicle travel variable with the vehicle travel and output from said vehicle state detection sensor, the signals for state variables representing the outside environmental situations and output from said outside environmental situation detection sensor, the steering angle signal output from said steering sensor, the steering angular velocity signal output from said steering angular velocity signal operating circuit, and the signals for variables representing the vehicle behaviors and output from said vehicle behavior sensor;
vehicle state determining means for determining necessary stability and response measures by using functions for replacing outputs from said sense-of-situation determining means into the necessity of stability and controllability; and
gain deciding means for deciding gains from output values from said vehicle state determining means and outputting the gains to said coefficient circuits.

18. An apparatus according to claim 12, wherein said gain changing means comprises:
- $\mu$ estimating means for estimating friction values ($\mu$) on the basis of a vehicle behavior state variable estimation signal output from vehicle behavior state variable estimating means and the signals for variables representing the vehicle behaviors and output from said vehicle behavior sensor;
- slip ratio calculating means for calculating slip ratios of the vehicle wheels on the basis of the signals for state variables representing the vehicle and output from said vehicle state detection sensor and vehicle wheel speeds;
- road surface shape estimating means for estimating a road surface shape on the basis of the signals for vehicle travel state variable with the vehicle travel and output from said vehicle state detection sensor;
- sensor abnormality detecting means for detecting abnormalities of said steering sensor, said vehicle behavior sensor, and said vehicle state detection sensor; and
- coefficient circuit coefficient changing means for performing one of changing operations, the changing operations being an operation for changing the coefficient of at least one of said first, second, and third coefficient circuits on the basis of an estimated $\mu$ signal output from said $\mu$ estimating means and slip ratio signals output from said slip ratio calculating means, an operation for changing the coefficient of at least one of said first, second, and third coefficient circuits on the basis of the estimated $\mu$ signal output from said $\mu$ estimating means and an estimated road surface shape signal output from said road surface shape estimating means, and an operation for changing the coefficient of at least one of said first, second, and third coefficient circuits on the basis of the estimated $\mu$ signal output from said $\mu$ estimating means and sensor abnormality detection signals output from said sensor abnormality detecting means.

* * * * *